United States Patent
Tsunashima et al.

(10) Patent No.: US 11,263,780 B2
(45) Date of Patent: Mar. 1, 2022

(54) APPARATUS, METHOD, AND PROGRAM WITH VERIFICATION OF DETECTED POSITION INFORMATION USING ADDITIONAL PHYSICAL CHARACTERISTIC POINTS

(71) Applicant: Sony Group Corporation, Tokyo (JP)

(72) Inventors: Nobuhiro Tsunashima, Kanagawa (JP); Daisuke Tahara, San Jose, CA (US)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/524,458

(22) Filed: Jul. 29, 2019

(65) Prior Publication Data
US 2020/0226788 A1 Jul. 16, 2020

Related U.S. Application Data

(60) Provisional application No. 62/791,998, filed on Jan. 14, 2019.

(51) Int. Cl.
*G06T 7/80* (2017.01)
*G06T 7/73* (2017.01)

(52) U.S. Cl.
CPC ............. *G06T 7/80* (2017.01); *G06T 7/73* (2017.01); *G06T 2207/30196* (2013.01)

(58) Field of Classification Search
CPC ... G06T 7/80; G06T 7/73; G06T 2207/30196; G06T 2207/20084; G06T 2207/20088; G06T 2207/30244; G06T 7/30; G06T 7/70; H04N 17/002; H04N 2213/002; H04N 2213/003
See application file for complete search history.

(56) References Cited

U.S. PATENT DOCUMENTS 6,970,591 B1* 11/2005 Lyons .................. G06K 9/209
345/419
2008/0148581 A1* 6/2008 Boni .................. G01B 11/2755
33/288

(Continued)

FOREIGN PATENT DOCUMENTS

JP 2011-215082 A 10/2011

OTHER PUBLICATIONS

International Search Report (PCT/ISA/210), International Application No. PCT/JP2019/051402, dated Mar. 27, 2020.

(Continued)

*Primary Examiner* — John W Miller
*Assistant Examiner* — Humam M Satti
(74) *Attorney, Agent, or Firm* — Michael Best & Friedrich LLP

(57) ABSTRACT

Provided is a position detection unit configured to detect position information of a first imaging device and a second imaging device on the basis of corresponding characteristic points from a first characteristic point detected as a physical characteristic point regarding a subject imaged by the first imaging device, and a second characteristic point detected as a physical characteristic point regarding the subject imaged by the second imaging device. The present technology can be applied to an information processing apparatus that specifies positions of a plurality of imaging devices.

19 Claims, 30 Drawing Sheets

(56) References Cited

U.S. PATENT DOCUMENTS

| | | | | |
|---|---|---|---|---|
| 2010/0134601 | A1* | 6/2010 | Lefevre | G06T 7/75 348/51 |
| 2010/0201810 | A1* | 8/2010 | Shimazaki | G06T 7/73 348/135 |
| 2011/0178108 | A1* | 7/2011 | Jiang | C07C 311/44 514/269 |
| 2013/0114851 | A1* | 5/2013 | Foote | G06T 7/77 382/103 |
| 2014/0267245 | A1* | 9/2014 | Tanger | G06T 7/596 345/419 |
| 2017/0132807 | A1* | 5/2017 | Shivaram | B25J 9/1697 |
| 2017/0140229 | A1* | 5/2017 | Ogata | B60W 30/0956 |
| 2018/0167553 | A1* | 6/2018 | Yee | G06T 7/292 |
| 2018/0213218 | A1* | 7/2018 | Yu | H04N 17/002 |
| 2018/0253861 | A1* | 9/2018 | Moteki | G06T 7/174 |
| 2018/0288401 | A1* | 10/2018 | Eshima | H04N 7/18 |
| 2018/0336733 | A1* | 11/2018 | Koga | G06T 19/006 |
| 2019/0012804 | A1* | 1/2019 | Wang | G06T 3/4038 |
| 2019/0364206 | A1* | 11/2019 | Dal Mutto | H04N 17/002 |

OTHER PUBLICATIONS

Notification of Transmittal of the International Search Report and the Written Opinion of the International Searching Authority, or the Declaration (PCT/ISA/220), International Application No. PCT/JP2019/051402, dated Mar. 27, 2020.

Written Opinion of the International Search Authority (PCT/ISA/237), International Application No. PCT/JP2019/051402, dated Mar. 27, 2020.

Takahashi Kosuke et al: "Human Pose as Calibration Pattern: 3D Human Pose Estimation with Multiple Unsynchronized and Uncalibrated Cameras," 2018 IEEE/CVF Conference On Computer Vision and Pattern Recognition Workshops (CVPRW), IEEE, Jun. 18, 2018 (Jun. 18, 2018), pp. 1856-18567.

Gregorij Kuri Llo et al.: "Wide-area external multi-camera calibration using vision graphs and virtual calibration object," Distributed Smart Cameras, 2008. ICDSC 2008. Second ACM/IEEE International Conference On, Sep. 2008 (Sep. 2008), pp. 1-9, XP055551092, Piscataway, NJ, USA.

Hodlmoser Michael et al: "Multiple Camera Self-calibration and 3D Reconstruction Using Pedestrians," Dec. 2010 (Dec. 2010), International Conference On Financial Cryptography and Data Security; [Lecture Notes in Computer Science; Lect.Notes Computer], Springer, Berlin, Heidelberg, pp. 1-10, XP047441607, ISBN: 978-3-642-17318-9 abstract sections 1-3.

Jens Puwein: "Joint Camera Pose Estimation and 3D Human Pose Estimation in a Multi-camera Setup," Lecture Notes in Computer Science, vol. 9004, Jan. 2015 (Jan. 2015), XP055672685, Berlin, Heidelberg ISSN: 0302-9743 ISBN: 978-3-642-39453-9 sections 1-3.

Takahashi Kosuke et al, "Easy Extrinsic Calibration of VR System and Multi-camera Based Marker-Less Motion Capture System," 2019 IEEE International Symposium On Mixed and Augmented Reality Adjunct (ISMAR-Adjunct), IEEE, Oct. 10, 2019 (Oct. 10, 2019), pp. 83-88, XP033688613.

* cited by examiner

FIG. 7
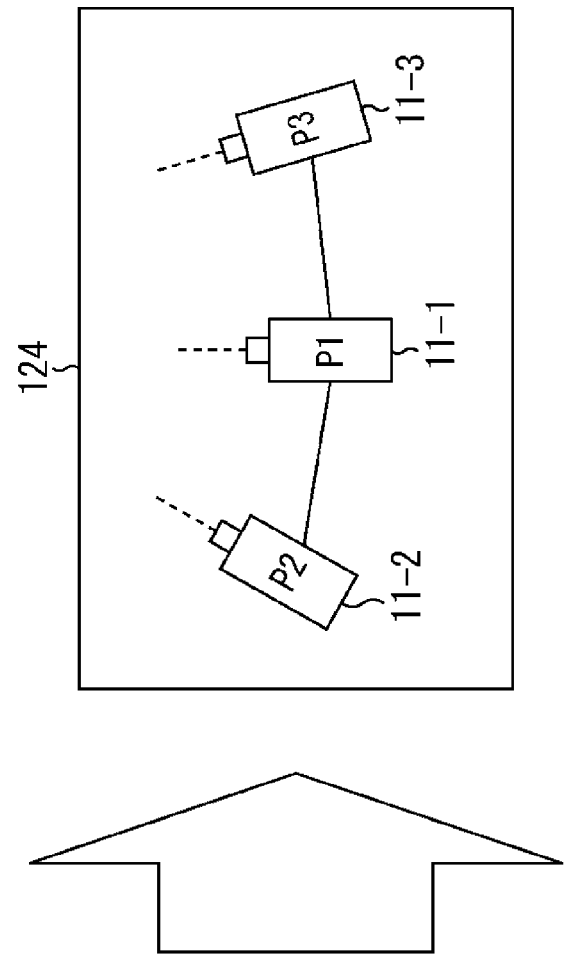
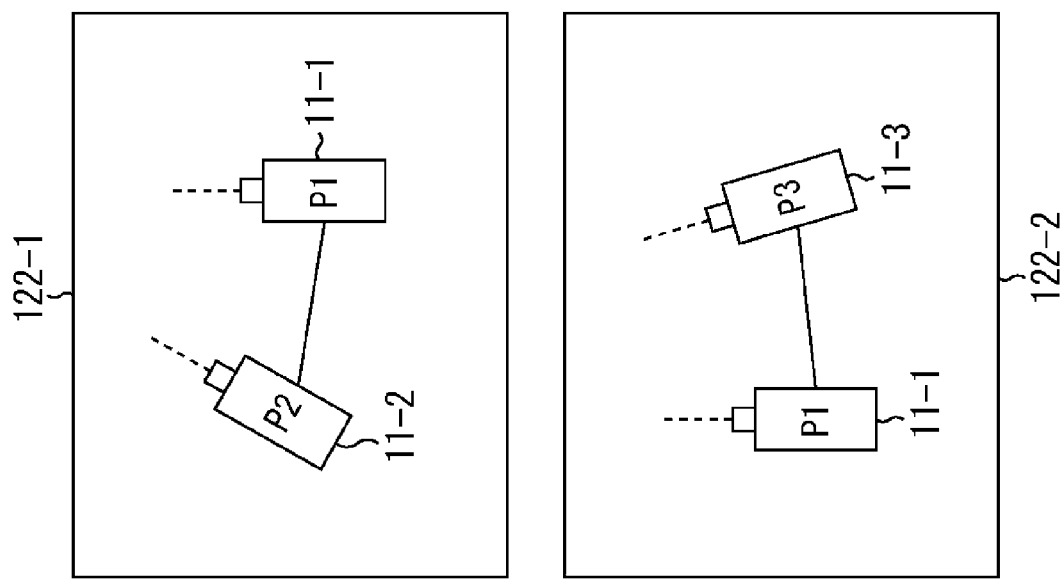

FIG. 11
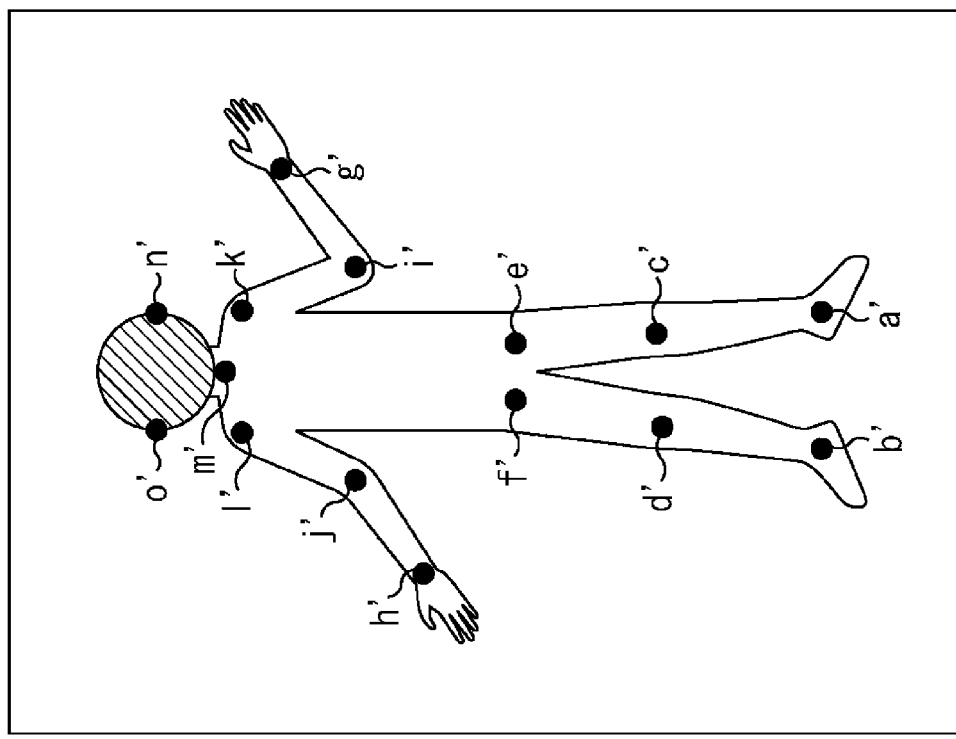
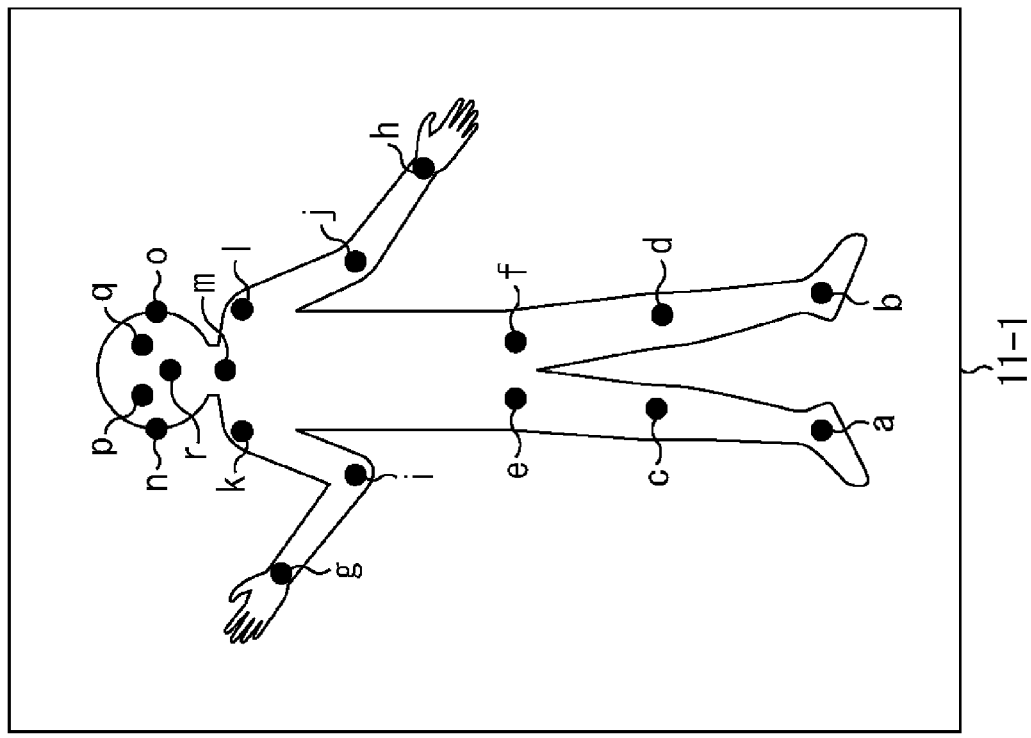

FIG. 25A
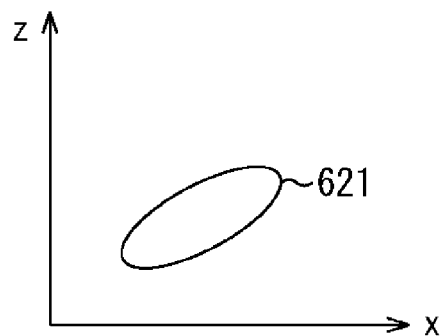
FIG. 25B
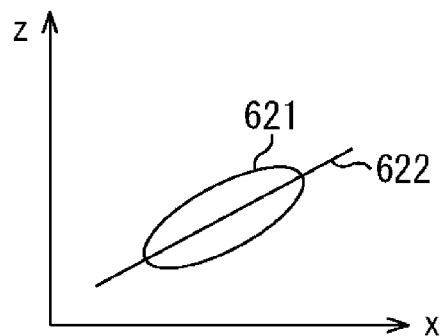
FIG. 25C
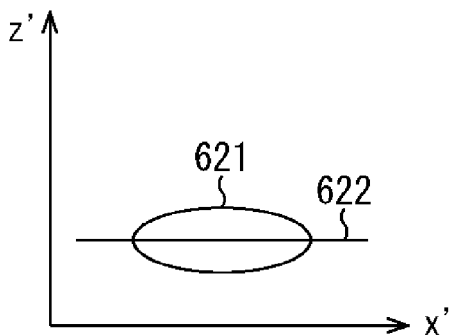

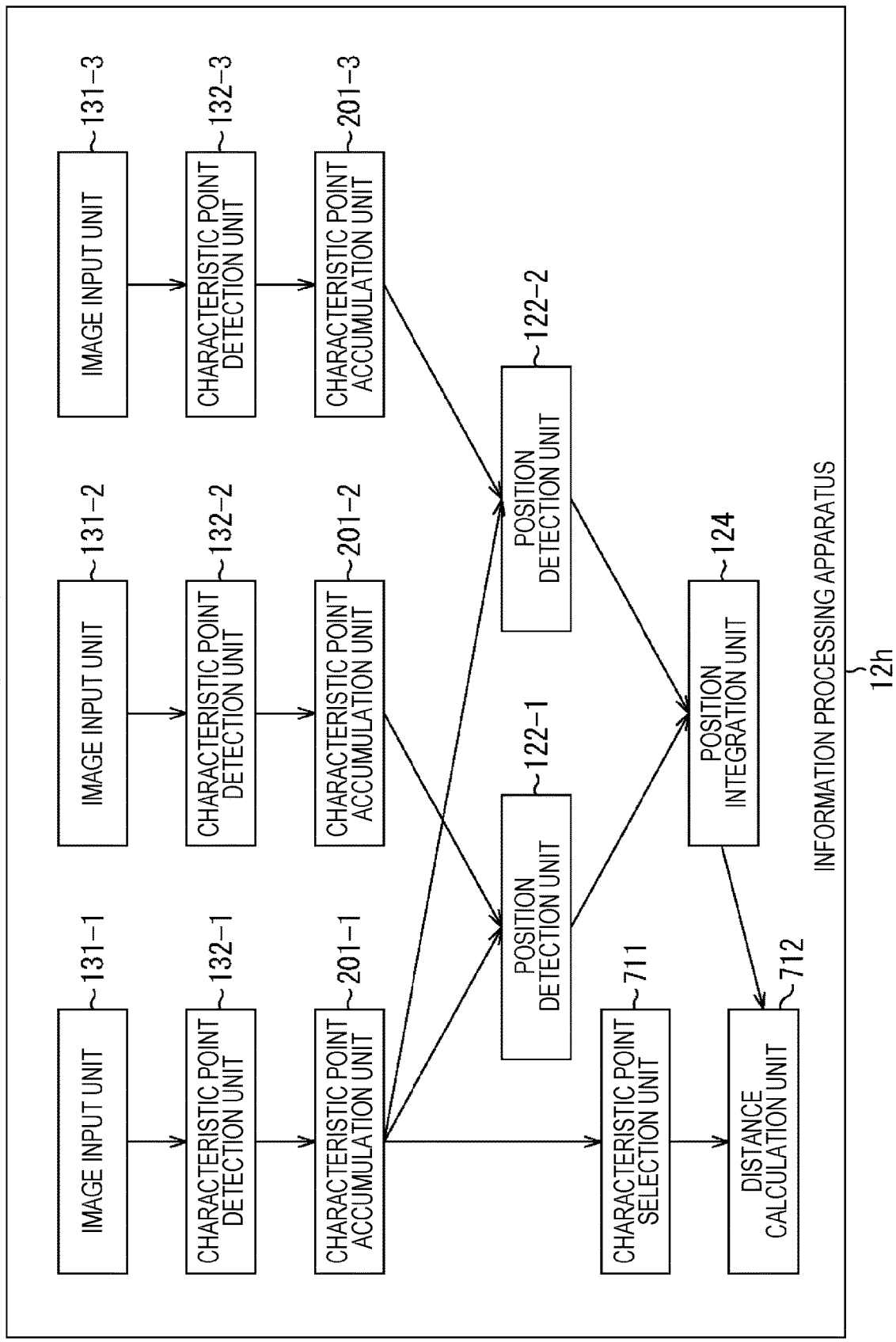

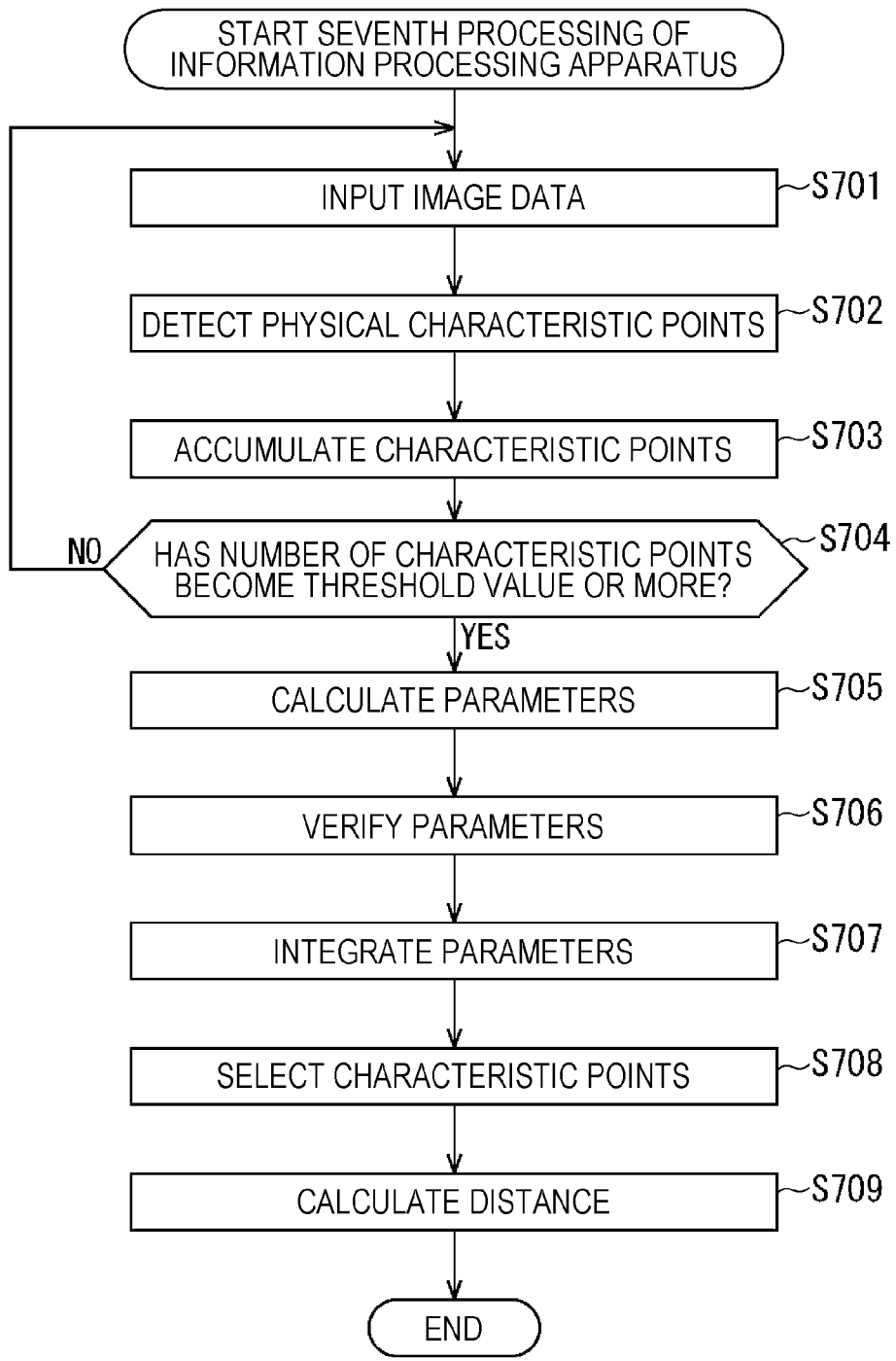

APPARATUS, METHOD, AND PROGRAM WITH VERIFICATION OF DETECTED POSITION INFORMATION USING ADDITIONAL PHYSICAL CHARACTERISTIC POINTS

CROSS REFERENCE TO RELATED APPLICATIONS

This application claims the benefit of priority of Provisional Application Ser. No. 62/791,998, filed on Jan. 14, 2019, the entire contents of which is incorporated herein by reference.

TECHNICAL FIELD

The present technology relates to an information processing apparatus, an information processing method, and a program, and relates to, for example, an information processing apparatus, an information processing method, and a program for calculating, when a plurality of imaging devices is installed, positions where the imaging devices are installed.

BACKGROUND ART

In a case of capturing the same object, scene, or the like by a plurality of imaging devices to acquire three-dimensional information of a capturing target, there is a method of calculating distances from the respective imaging devices to the target, using a difference in how the target captured by each of the plurality of imaging devices looks in each of the imaging devices.

In the case of acquiring three-dimensional information by this method, it is necessary that a positional relationship among the plurality of imaging devices used for capturing is known. Obtaining the positional relationships among the imaging devices may be referred to as calibration in some cases.

As a calibration method, the positional relationship among the imaging devices is calculated by using a board called special calibration board on which a pattern of fixed shape and size is printed, capturing the calibration board by the plurality of imaging devices at the same time, and performing an analysis using images captured by the imaging devices.

Calibration methods not using the calibration board have also been proposed. PTL 1 has proposed detecting a plurality of positions of the head and the foot of a person on a screen in chronological order while moving the person, and performing calibration from detection results.

CITATION LIST

Patent Literature

[PTL 1] Japanese Patent Application Laid-Open No. 2011-215082

SUMMARY

Technical Problem

In the case of performing calibration using the special calibration board, the calibration cannot be performed without the calibration board, and thus the calibration board needs to be prepared in advance and a user is required to take a trouble with preparing the calibration board.

Furthermore, in a case where the position of the imaging device is changed for some reason after the positions of the plurality of imaging devices are obtained, calibration using the calibration board needs to be performed again in order to update the changed position, and easy modification of the changed position has been difficult.

Furthermore, in the method according to PTL 1, there are various conditions such as a person standing perpendicular to the ground, and the ground being within an imaging range of the imaging device, and there is a possibility of reduction in usability.

The present technology has been made in view of the foregoing, and is intended to easily obtain positions of a plurality of imaging devices.

Solution to Problem

An information processing apparatus according to one aspect of the present technology includes a position detection unit configured to detect position information of a first imaging device and a second imaging device on the basis of corresponding characteristic points from a first characteristic point detected as a physical characteristic point regarding a subject imaged by the first imaging device, and a second characteristic point detected as a physical characteristic point regarding the subject imaged by the second imaging device.

An information processing method according to one aspect of the present technology includes, by an information processing apparatus that detects a position of an imaging device, detecting position information of a first imaging device and a second imaging device on the basis of corresponding characteristic points from a first characteristic point detected as a physical characteristic point regarding a subject imaged by the first imaging device, and a second characteristic point detected as a physical characteristic point regarding the subject imaged by the second imaging device.

A program according to one aspect of the present technology executes processing of detecting position information of a first imaging device and a second imaging device on the basis of corresponding characteristic points from a first characteristic point detected as a physical characteristic point regarding a subject imaged by the first imaging device, and a second characteristic point detected as a physical characteristic point regarding the subject imaged by the second imaging device.

In an information processing apparatus, an information processing method, and a program according to one aspect of the present technology, position information of a first imaging device and a second imaging device is detected on the basis of corresponding characteristic points from a first characteristic point detected as a physical characteristic point regarding a subject imaged by the first imaging device, and a second characteristic point detected as a physical characteristic point regarding the subject imaged by the second imaging device. Note that the information processing apparatus may be an independent apparatus or may be internal blocks configuring one apparatus.

Furthermore, the program can be provided by being transmitted via a transmission medium or by being recorded on a recording medium.

BRIEF DESCRIPTION OF DRAWINGS

FIG. 7 is a diagram for describing integration of positional relationships of imaging devices.

FIG. 11 is a diagram for describing physical characteristic points.

FIGS. 25A to 25C are diagrams for describing estimation of a floor surface.

FIG. 29 is a diagram illustrating a configuration of an information processing apparatus according to a seventh embodiment.

FIG. 30 is a flowchart for describing an operation of an information processing apparatus according to a seventh embodiment.

DESCRIPTION OF EMBODIMENTS

Hereinafter, modes for implementing the present technology (hereinafter referred to as embodiments) will be described.

<Configuration of Information Processing System>

Figure 1:
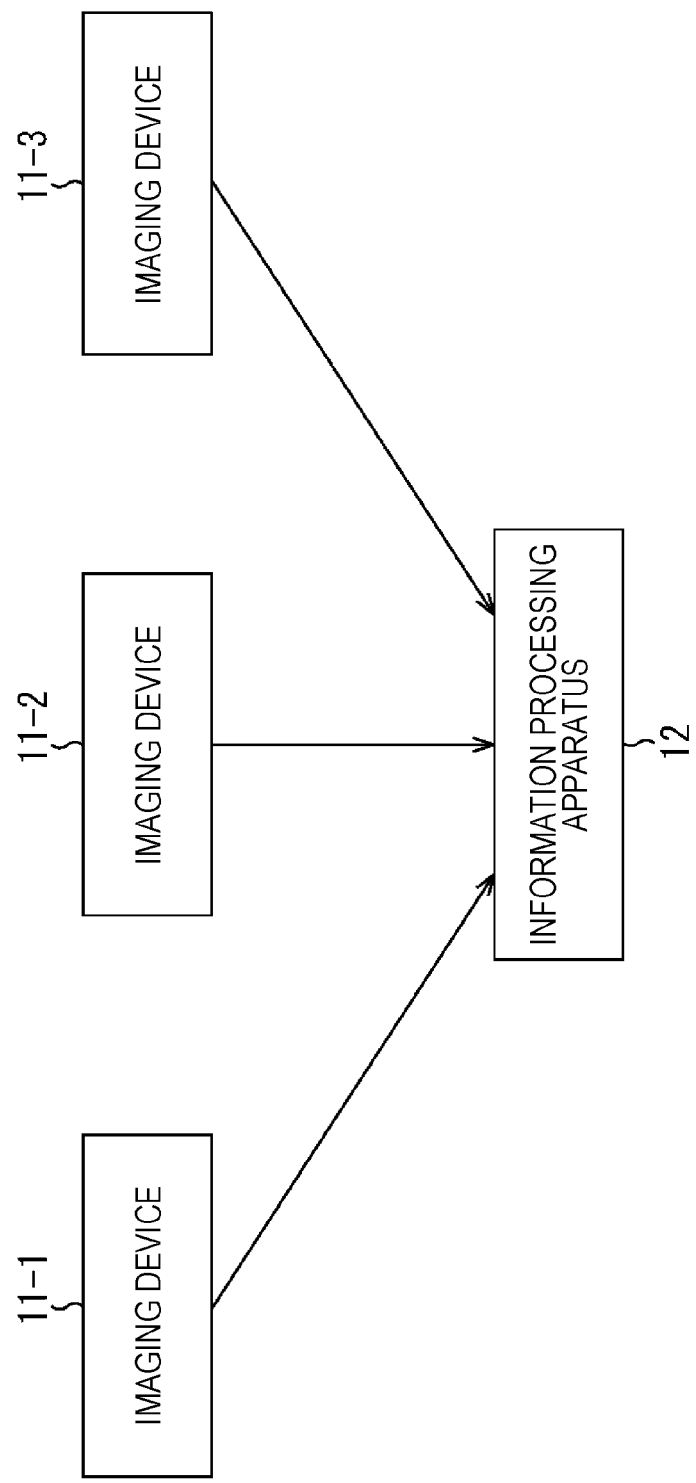
FIG. 1 is a diagram illustrating a configuration of an embodiment of an information processing system to which an embodiment of the present technology is applied.

FIG. 1 is a diagram illustrating a configuration of an embodiment of an information processing system to which an embodiment of the present technology is applied. The present technology can be applied to when obtaining, in a case where a plurality of imaging devices is installed, positions where the imaging devices are installed. The information processing system illustrated in FIG. 1 has a configuration provided with three imaging devices of imaging devices 11-1 to 11-3 and an information processing apparatus 12. In the following description, in a case where it is not necessary to individually distinguish the imaging devices 11-1 to 11-3, the imaging devices 11-1 to 11-3 are simply described as imaging device 11. Further, here, the description will be continued using the case where three imaging devices 11 are installed as an example. However, the present technology can be applied to a case where at least two imaging devices 11 are provided and can also be applied to a case where four or more imaging devices 11 are provided.

The imaging device 11 has a function to image a subject. Image data including the subject imaged by the imaging device 11 is supplied to the information processing apparatus 12. The information processing apparatus 12 obtains a positional relationship among the imaging devices 11-1 to 11-3 by analyzing the image.

The imaging device 11 and the information processing apparatus 12 are configured to be able to exchange the image data. The imaging device 11 and the information processing apparatus 12 are configured to be able to exchange data with each other via a network configured by wired and/or wireless means.

In a case where a real time property is not important, for example, a configuration in which the image data of the images imaged by the imaging devices 11 is recorded on a predetermined recording medium, and the information processing apparatus 12 reads the image data from the recording medium and analyzes the images to obtain the positional relationship among the imaging devices 11 can be adopted.

The imaging device 11 captures a still image and a moving image. In the following description, an image indicates images of one frame configuring a still image or a moving image imaged by the imaging device 11.

In a case of performing geometric processing, or the like, for example, three-dimensional measurement of the subject, for the images captured by the plurality of imaging devices 11, calibration for obtaining external parameters among the imaging devices 11 needs to be performed.

Furthermore, various applications such as free viewpoint video can be realized by obtaining a fundamental matrix configured by the external parameters without obtaining the external parameters.

The information processing apparatus 12 included in the information processing system can perform such calibration and obtain such a fundamental matrix. Hereinafter, the description will be continued using the case where the information processing apparatus 12 performs calibration and obtains the fundamental matrix as an example.

<Configuration Example of Imaging Device>

Figure 2:
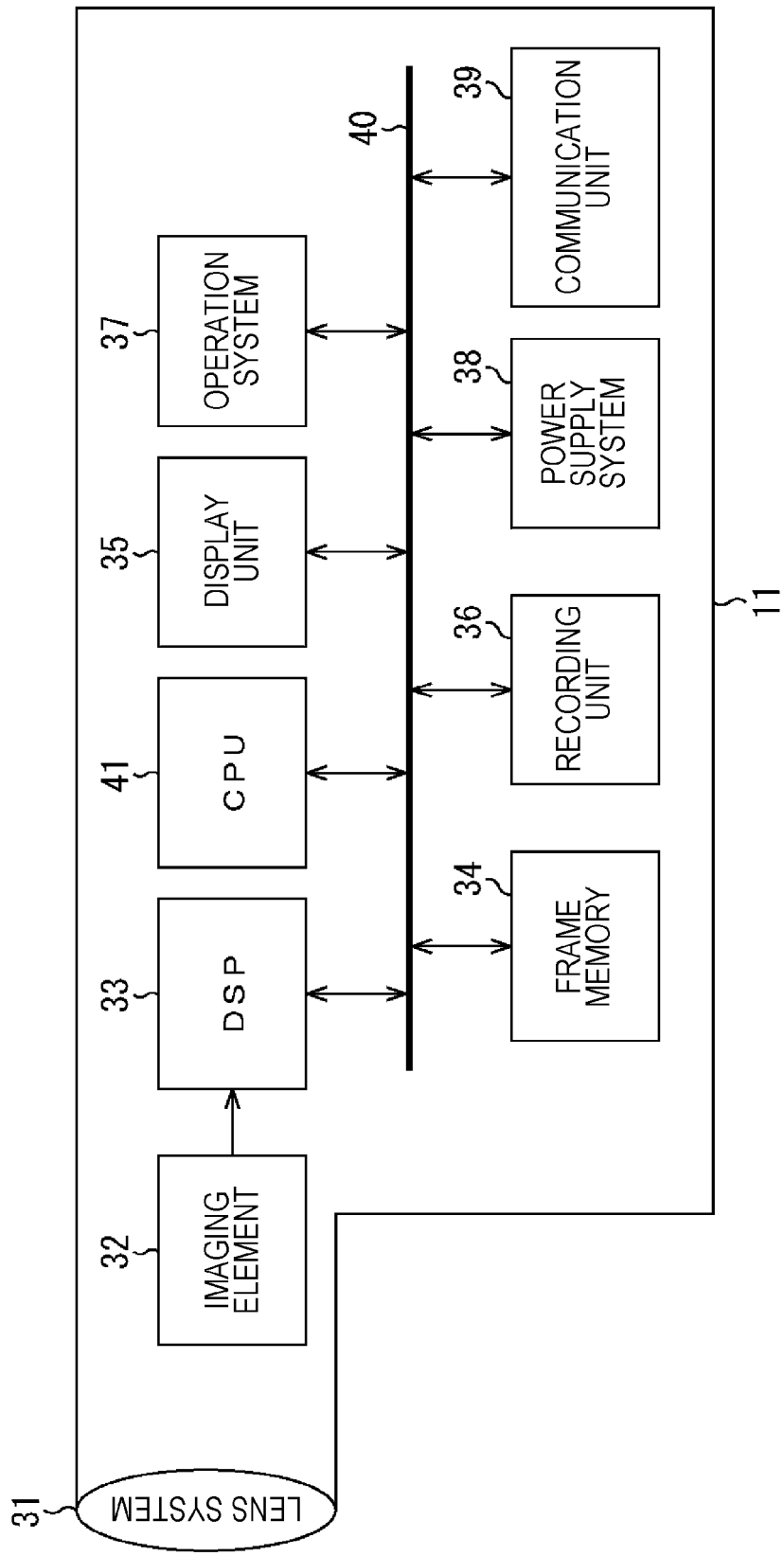
FIG. 2 is a diagram illustrating a configuration example of an imaging device.

FIG. 2 is a diagram illustrating a configuration example of the imaging device 11. The imaging device 11 includes an optical system including a lens system 31 and the like, an imaging element 32, a DSP circuit 33 that is a camera signal processing unit, a frame memory 34, a display unit 35, a recording unit 36, an operation system 37, a power supply system 38, and a communication unit 39, and the like.

In addition, the DSP circuit 33, the frame memory 34, the display unit 35, the recording unit 36, the operation system 37, the power supply system 38, and the communication unit 39 are mutually connected via a bus line 40. A CPU 41 controls each unit in the imaging device 11.

The lens system 31 takes in incident light (image light) from the subject and forms an image on an imaging surface of the imaging element 32. The imaging element 32 converts a light amount of the incident light imaged on the imaging surface by the lens system 31 into an electrical signal in pixel units and outputs the electrical signal as a pixel signal. As the imaging element 32, an imaging element (image sensor) including pixels described below can be used.

The display unit 35 includes a panel-type display unit such as a liquid crystal display unit or an organic electro luminescence (EL) display unit, and displays a moving image or a still image imaged by the imaging element 32. The recording unit 36 records the moving image or the still image imaged by the imaging element 32 on a recording medium such as a hard disk drive (HDD) or a digital versatile disk (DVD).

The operation system 37 issues operation commands for various functions possessed by the present imaging device under an operation by a user. The power supply system 38 appropriately supplies various power supplies serving as operating power sources for the DSP circuit 33, the frame memory 34, the display unit 35, the recording unit 36, the operation system 37, and the communication unit 39 to these supply targets. The communication unit 39 communicates with the information processing apparatus 12 by a predetermined communication method.

<Configuration Example of Information Processing Apparatus>

Figure 3:
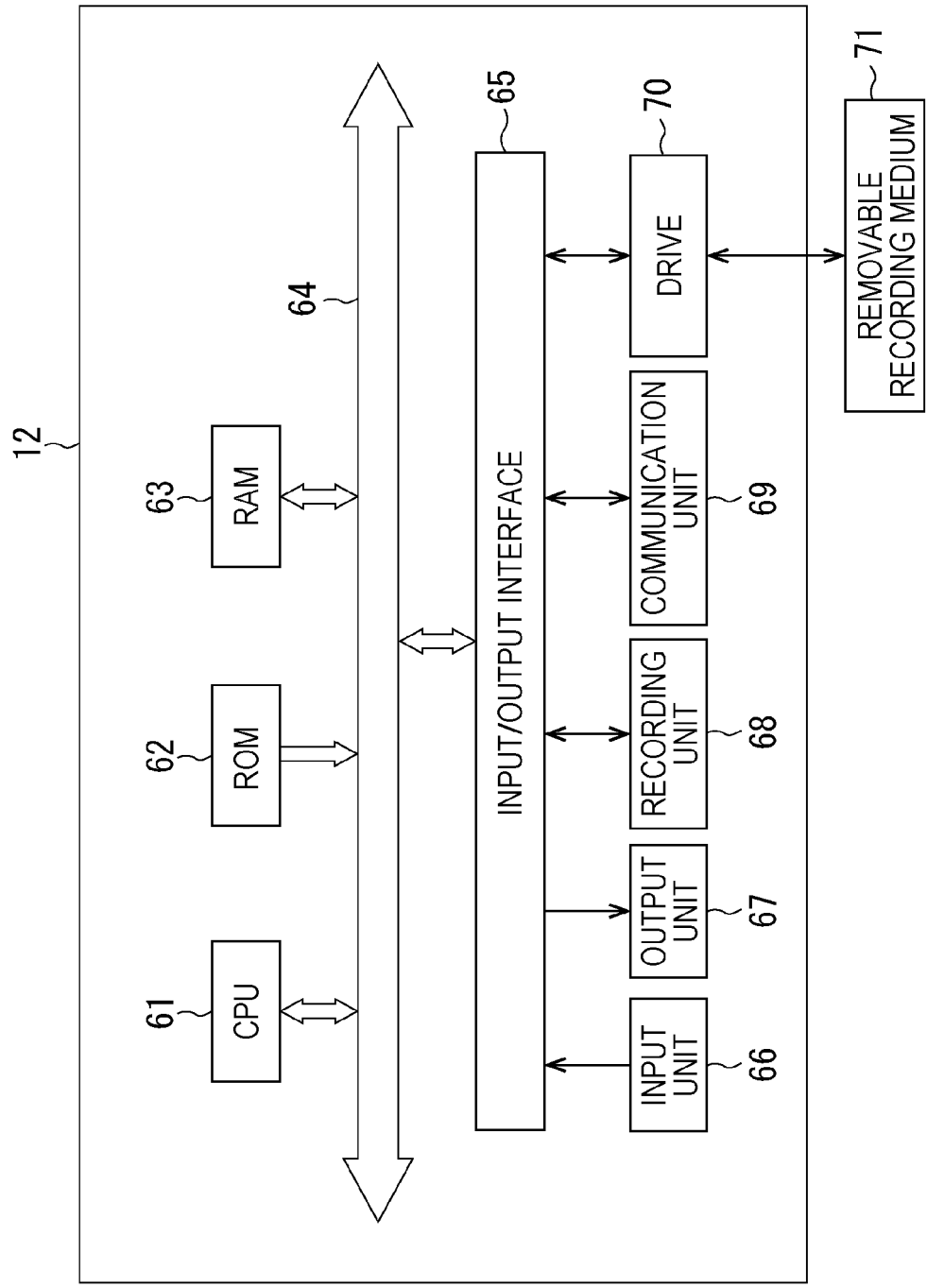
FIG. 3 is a diagram illustrating a configuration example of an information processing apparatus.

FIG. 3 is a diagram illustrating a configuration example of hardware of the information processing apparatus 12. The information processing apparatus 12 can be configured by, for example, a personal computer. In the information processing apparatus 12, a central processing unit (CPU) 61, a read only memory (ROM) 62, and a random access memory (RAM) 63 are mutually connected by a bus 64. Moreover, an input/output interface 65 is connected to the bus 64. An input unit 66, an output unit 67, a storage unit 68, a communication unit 69, and a drive 70 are connected to the input/output interface 65.

The input unit 66 includes a keyboard, a mouse, a microphone, and the like. The output unit 67 includes a display, a speaker, and the like. The storage unit 68 includes a hard disk, a nonvolatile memory, and the like. The communication unit 69 includes a network interface, and the like. The drive 70 drives a removable recording medium 71 such as a magnetic disk, an optical disk, a magneto-optical disk, or a semiconductor memory.

<Functions of Information Processing System>

Figure 4:
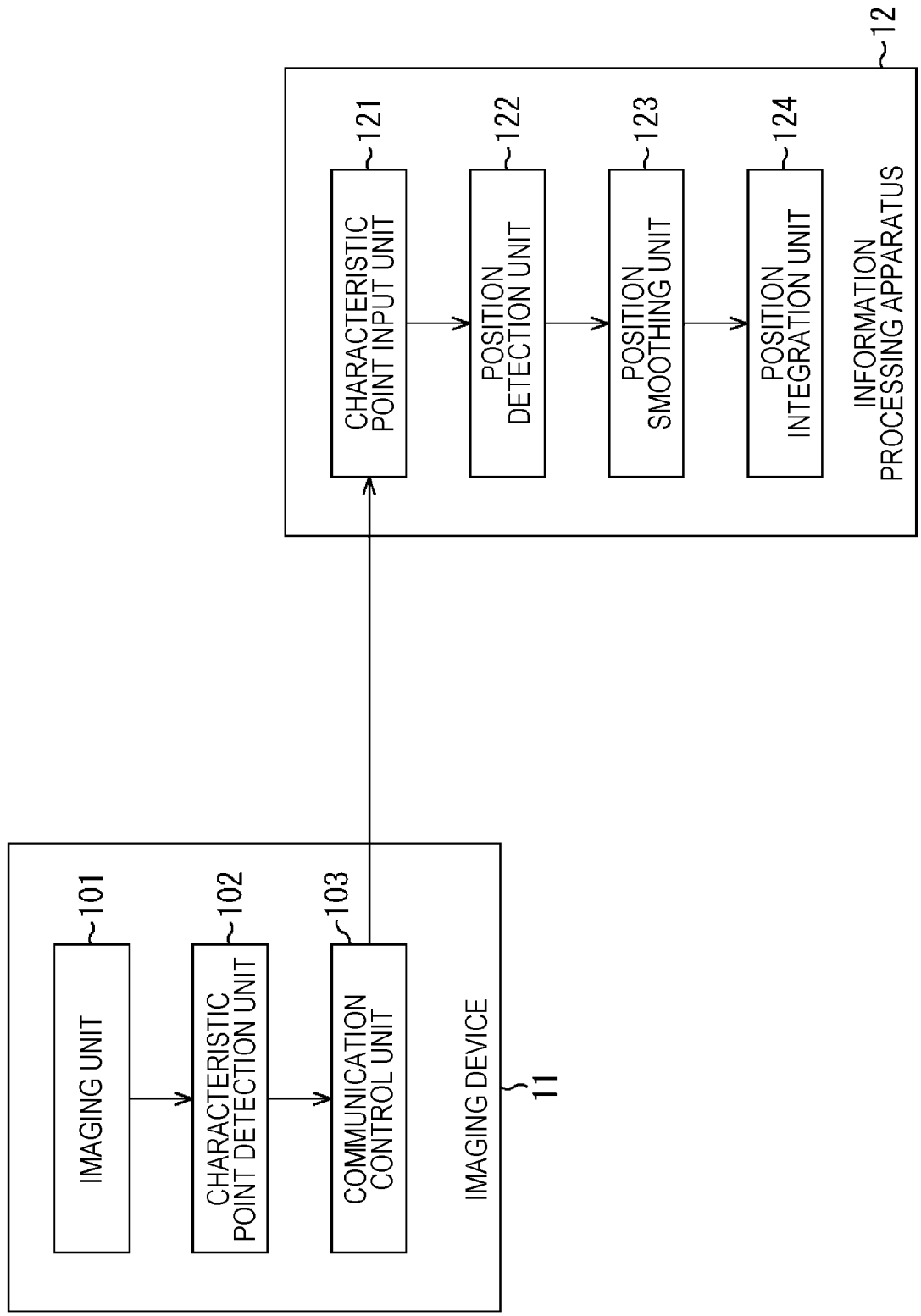
FIG. 4 is a diagram illustrating a functional configuration example of the information processing system.

FIG. 4 is a diagram illustrating a configuration example regarding functions of the information processing system.

The imaging device 11 includes an imaging unit 101, a characteristic point detection unit 102, and a communication control unit 103. The information processing apparatus 12 includes a characteristic point input unit 121, a position detection unit 122, a position smoothing unit 123, and a position integration unit 124. The imaging unit 101 of the imaging device 11 has a function to control the lens system 31, the imaging element 32, and the like of the imaging device 11 illustrated in FIG. 2 to image the image of the subject. The characteristic point detection unit 102 extracts characteristic points from the image. As will be described below in detail, a person is imaged as the subject, and physical characteristics of the imaged person, such as elbows and knees, are extracted as the characteristic points. The communication control unit 103 controls the communication unit 39 (FIG. 2) and transmits the characteristic points (information regarding the characteristic points) detected by the characteristic point detection unit 102 to the information processing apparatus 12.

The characteristic point input unit 121 of the information processing apparatus 12 receives the information regarding the characteristic points transmitted from the imaging device 11 and supplies the information to the position detection unit 122. The position detection unit 122 detects position information of the imaging device 11. As will be described below in detail, the position information of the imaging device 11 indicates relative positions among a plurality of the imaging devices 11 and positions in the real space.

The position smoothing unit 123 smooths the position information detected by the position detection unit 122 and supplies the position information to the position integration unit 124. The position integration unit 124 integrates the position information of the plurality of imaging devices 11 and specifies positions of the respective imaging devices 11.

Figure 5:
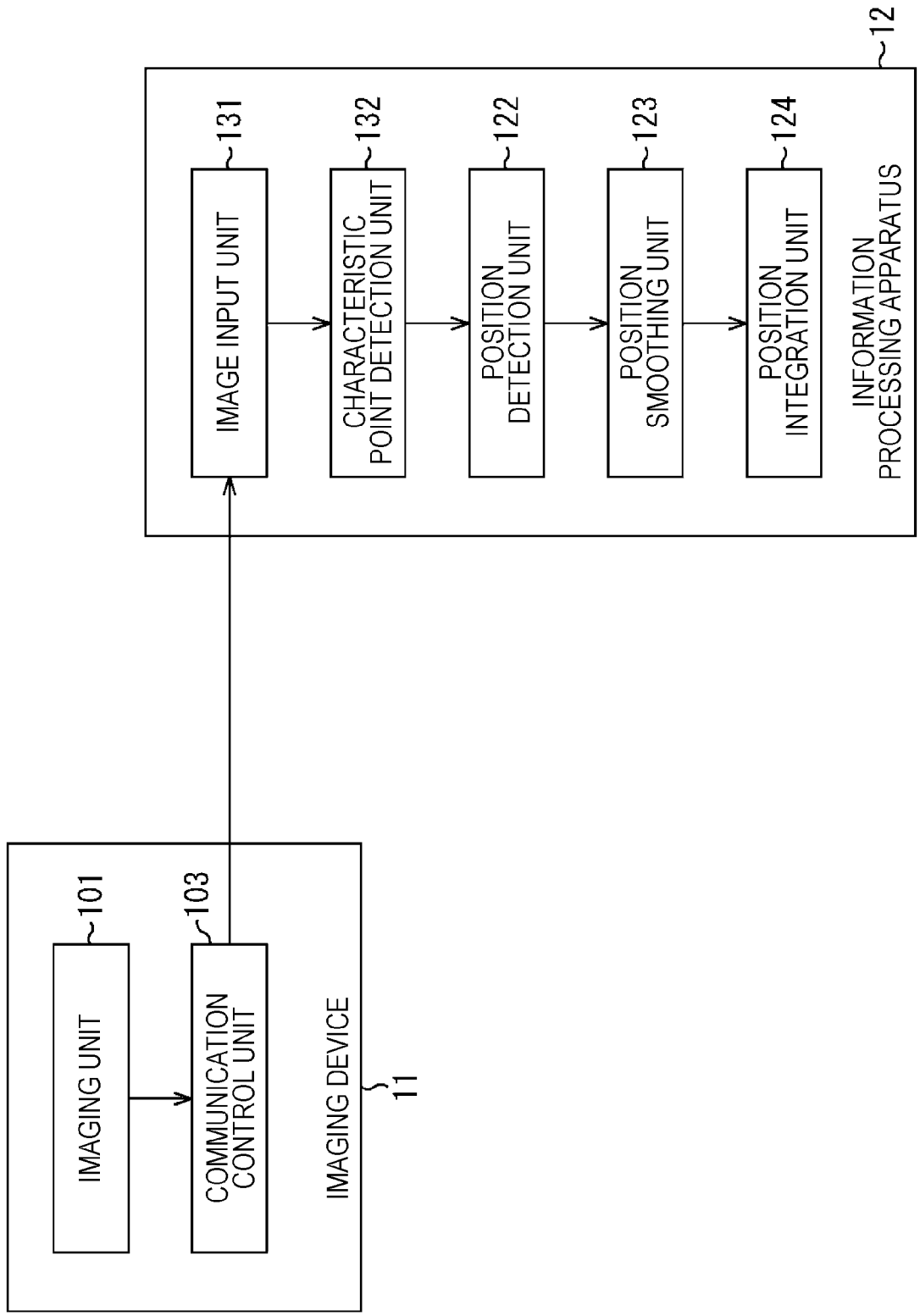
FIG. 5 is a diagram illustrating a functional configuration example of the information processing system.

FIG. 5 is a diagram illustrating another configuration example regarding functions of the information processing system. The imaging device 11 includes the imaging unit 101 and the communication control unit 103. The information processing apparatus 12 includes an image input unit 131, a characteristic point detection unit 132, the position detection unit 122, the position smoothing unit 123, and the position integration unit 124.

The information processing system illustrated in FIG. 5 is different from the information processing system illustrated in FIG. 4 in that characteristic points are detected on the side of the information processing apparatus 12.

The imaging unit 101 of the imaging device 11 images an image of the subject, and the communication control unit 103 transmits image data of the imaged image to the information processing apparatus 12.

The image input unit 131 of the information processing apparatus 12 receives the image data transmitted from the imaging device 11 and supplies the image data to the characteristic point detection unit 132. The characteristic point detection unit 132 corresponds to the characteristic point detection unit 102 of the imaging device 11 of the information processing system illustrated in FIG. 4, and detects characteristic points from the image. The position detection unit 122, the position smoothing unit 123, and the position integration unit 124 respectively correspond to the position detection unit 122, the position smoothing unit 123, and the position integration unit 124 of the information processing apparatus 12 of the information processing system illustrated in FIG. 4.

In the following description, the description will be continued using the case of the functional configuration of the information processing system illustrated in FIG. 5 as an example. Further, as illustrated in FIG. 1, the description will be continued using the information processing apparatus 12 that processes the information from the three imaging devices 11 as an example.

First Embodiment

As the first embodiment, an information processing apparatus that specifies respective pieces of position information of a plurality of imaging devices 11 by setting one imaging device 11 of the plurality of imaging devices 11 as a reference and calculating relative positions with respect to the reference imaging device 11 will be described.

Here is the case of specifying the position information of the three imaging devices 11 of the imaging devices 11-1 to 11-3, as illustrated in FIG. 1, and description will be given using a case where the imaging device 11-1 is set as the reference imaging device 11.

Figure 6:
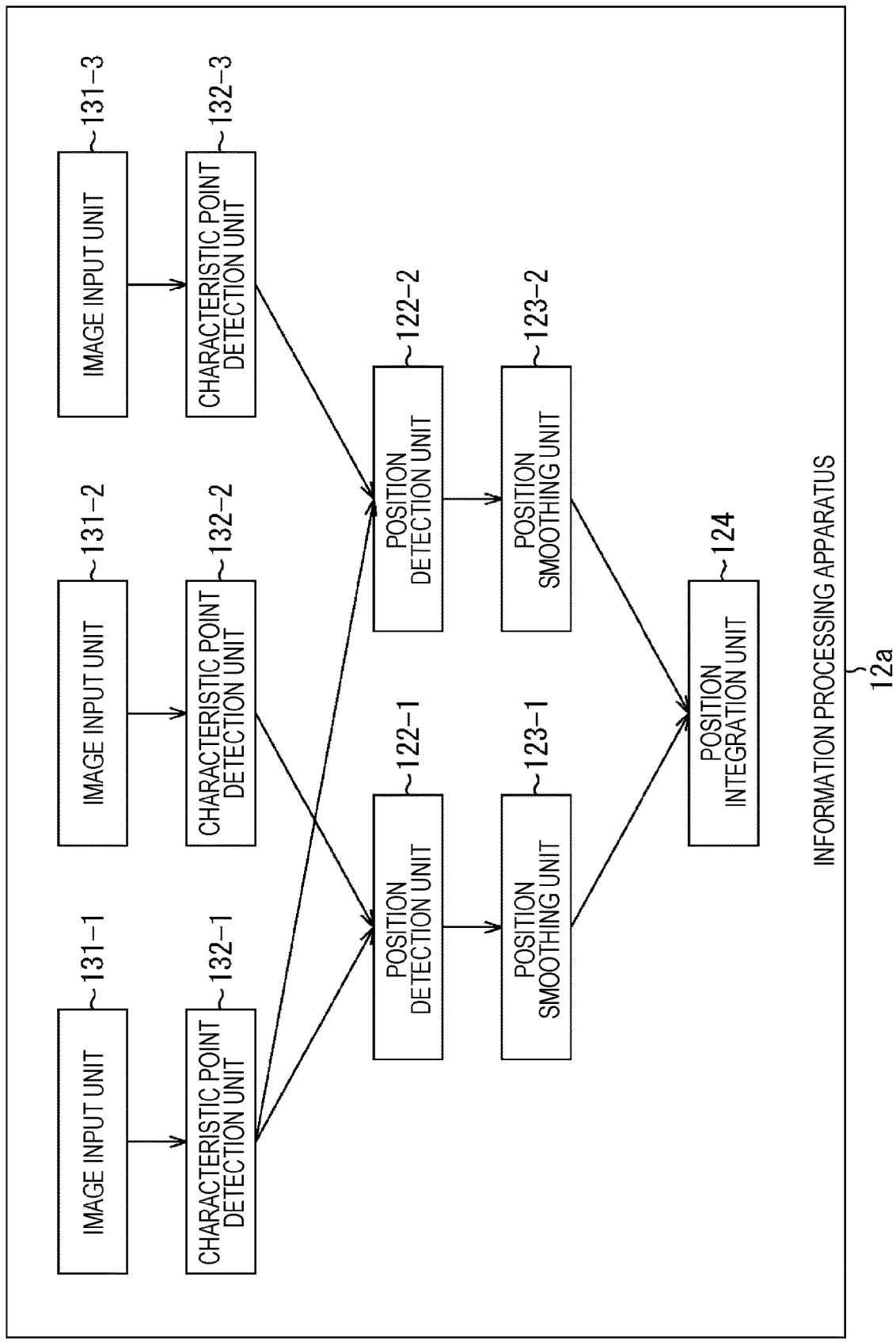
FIG. 6 is a diagram illustrating a configuration of an information processing apparatus according to a first embodiment.

In a case of the information processing apparatus 12 that processes information from the three imaging devices 11, the image input unit 131 and the characteristic point detection unit 132 are provided for each imaging device 11, as illustrated in FIG. 6. The information processing apparatus 12 according to the first embodiment is described as information processing apparatus 12a.

Referring to FIG. 6, the information processing apparatus 12a includes an image input unit 131-1 that inputs image data from the imaging device 11-1, an image input unit 131-2 that inputs image data from the imaging device 11-2, and an image input unit 131-3 that inputs image data from the imaging device 11-3.

The image data input to the image input unit 131-1 is supplied to a characteristic point detection unit 132-1. Likewise, the image data input to the image input unit 131-2 is supplied to a characteristic point detection unit 132-2, and the image data input to the image input unit 131-3 is supplied to a characteristic point detection unit 132-3.

The characteristic point detection unit 132-1 extracts characteristic points from an image imaged by the imaging device 11-1 and supplies the characteristic points to a position detection unit 122-1 and a position detection unit 122-2. The characteristic point detection unit 132-2 extracts characteristic points from an image imaged by the imaging device 11-2 and supplies the characteristic points to the position detection unit 122-1. The characteristic point detection unit 132-3 extracts characteristic points from an image imaged by the imaging device 11-3 and supplies the characteristic points to the position detection unit 122-2.

The characteristic points extracted from the image imaged by the imaging device 11-1 and the characteristic points extracted from the image imaged by the imaging device 11-2 are supplied to the position detection unit 122-1, and the position detection unit 122-1 detects relative positions between the imaging device 11-1 and the imaging device 11-2 using the supplied characteristic points.

The relative positions between the imaging device 11-1 and the imaging device 11-2 detected by the position detection unit 122-1 are supplied to a position smoothing unit 123-1.

The characteristic points extracted from the image imaged by the imaging device 11-1 and the characteristic points extracted from the image imaged by the imaging device 11-3 are supplied to the position detection unit 122-2, and the position detection unit 122-2 detects relative positions between the imaging device 11-1 and the imaging device 11-3 using the supplied characteristic points.

The relative positions between the imaging device 11-1 and the imaging device 11-3 detected by the position detection unit 122-2 are supplied to a position smoothing unit 123-2.

The position smoothing unit 123-1 performs smoothing processing for the relative positions between the imaging device 11-1 and the imaging device 11-2. The position smoothing unit 123-2 smooths the relative positions between the imaging device 11-1 and the imaging device 11-3.

Note that the smoothing is processing performed for improving accuracy of the position information to be detected and is processing performed when the number of characteristic points to be detected is small and there is a possibility that the accuracy of the position information to be detected is lowered, and thus can be omitted in a case where sufficient accuracy is obtained. In other words, the position smoothing unit 123 can be deleted from the configuration of the information processing apparatus 12a, and even the deleted configuration is within an application range of the present technology.

The position information from the position smoothing unit 123-1 and the position information from the position smoothing unit 123-2 are supplied to the position integration unit 124. The position integration unit 124 integrates the positional relationships among the plurality of imaging devices 11, in this case, the positional relationships among the imaging device 11-1, the imaging device 11-2, and the imaging device 11-3. Processing in the position integration unit 124 of the information processing apparatus 12a will be described with reference to FIG. 7. The left diagram in FIG. 7 illustrates the positional relationships detected by the position detection unit 122, and the right diagram in FIG. 7 illustrates the positional relationship integrated by the position integration unit 124.

Referring to the left diagram in FIG. 7, the position information of the imaging device 11-2 with respect to the imaging device 11-1 is detected by the position detection unit 122-1. In a case where the position information of the imaging device 11-1 is a position P1, a position P2 of the imaging device 11-2 with respect to the position P1 is detected by the position detection unit 122-1. In the example illustrated in FIG. 7, the imaging device 11-2 being located on the left side of the imaging device 11-1 and at a slightly upper position than the imaging device 11-1 is detected. Furthermore, an optical axis of the imaging device 11-2 being located in a direction with an upper right inclination with respect to an optical axis of the imaging device 11-1 is also detected.

Similarly, the position information of the imaging device 11-3 with respect to the imaging device 11-1 is detected by the position detection unit 122-2. In a case where the position of the imaging device 11-1 is the position P1, a position P3 of the imaging device 11-3 with respect to the position P1 is detected by the position detection unit 122-2. In the example illustrated in FIG. 7, the imaging device 11-3 being located on the right side of the imaging device 11-1 and at a slightly upper position than the imaging device 11-1 is detected. Furthermore, an optical axis of the imaging device 11-3 being located in a direction with an upper left inclination with respect to the optical axis of the imaging device 11-1 is also detected.

The position information is information indicating the relative positions among the plurality of imaging devices 11 and a position in the real space. Furthermore, the position information is an X coordinate, a Y coordinate, and a Z coordinate of the imaging device 11. Furthermore, the position information is a rotation angle around an X axis of the optical axis, a rotation angle around a Y axis of the optical axis, and a rotation angle around a Z axis of the optical axis. The description will be continued on the assumption that the position information includes the aforementioned six pieces of information but the present technology is applicable even in a case where some pieces of information out of the six pieces of information are acquired.

Furthermore, in the above and following description, in a case of giving description such as the position or the relative position of the imaging device 11, the description includes not only the position expressed by the coordinates of the imaging device 11 but also the rotation angles of the optical axis.

The position integration unit 124 acquires information (information of the position P2) regarding the relative position of the imaging device 11-2 of when the imaging device 11-1 is set as the reference from the position detection unit 122-1 and information (information of the position P3) regarding the relative position of the imaging device 11-3 of when the imaging device 11-1 is set as the reference from the position detection unit 122-2. The position integration unit 124 integrates the pieces of the position information of the imaging device 11-2 and the imaging device 11-3 with the imaging device 11-1 as the reference, thereby detecting the positional relationship illustrated in the right diagram in FIG. 7. In the position integration unit 124, information that the imaging device 11-2 is located at the position P2 and the imaging device 11-3 is located at the position P3 with the imaging device 11-1 as the reference, in other words, with the position P1 as the reference, is generated.

As described above, the information processing apparatus 12*a* sets the position of one imaging device 11 out of the plurality of imaging devices 11 as the reference, and detects and integrates the relative positional relationships between the reference imaging device 11 and the other imaging devices 11, thereby detecting the positional relationship among the plurality of imaging devices 11.

An operation of the information processing apparatus 12*a* will be described with reference to the flowchart in FIG. 8.

In step S101, the image input unit 131 inputs the image data. The image input unit 131-1 inputs the image data from the imaging device 11-1, the image input unit 131-2 inputs the image data from the imaging device 11-2, and the image input unit 131-3 inputs the image data from the imaging device 11-3.

In step S102, the characteristic point detection unit 132 extracts the characteristic point from the image based on the image data input to the image input unit 131. The characteristic point detection unit 132-1 extracts the characteristic points from the image imaged by the imaging device 11-1 and input to the image input unit 131-1. The characteristic point detection unit 132-2 extracts the characteristic points from the image imaged by the imaging device 11-2 and input to the image input unit 131-2. The characteristic point detection unit 132-3 extracts the characteristic point from the image imaged by the imaging device 11-3 input to the image input unit 131-3.

What is extracted as the characteristic point can be a part having a physical characteristic of a person. For example, a joint of a person can be detected as the characteristic point. As will be described below, the position detection unit 122-1 detects the relative positional relationship between the imaging device 11-1 and the imaging device 11-2 from a correspondence between the characteristic point detected from the image imaged by the imaging device 11-1 and the characteristic point detected from the image imaged by the imaging device 11-2. In other words, the position detection unit 122 performs position detection by combining joint information as the characteristic point detected from one image and joint information as the characteristic point detected from the other image at a corresponding position. In a case where the position detection using such characteristic points is performed, the position information of the imaging device 11 can be obtained regardless of the orientation of the subject, for example, the orientation of the front or the back, and even in a case where a face does not fit within the angle of view, by using the joint information such as a joint of a person as the characteristic point. Physical characteristic points such as eyes and a nose may be of course detected other than the joint of a person. More specifically, a left shoulder, a right shoulder, a left elbow, a right elbow, a left wrist, a right wrist, a neck, a left hip, a right hip, a left knee, a right knee, a left ankle, a right ankle, a right eye, a left eye, a nose, a mouth, a right ear, a left ear, and the like of a person can be detected as the characteristic points. Note that the parts exemplified as the physical characteristics here are examples, and a configuration in which other parts such as a joint of a finger, a fingertip, and a head top may be detected in place of or in addition to the above-described parts can be adopted.

Note that although the parts are described as the characteristic points, the parts may be regions having a certain size or line segments such as edges. For example, in a case where an eye is detected as the characteristic point, a center position of the eye (a center of a black eye) may be detected as the characteristic point, a region of the eye (eyeball) may be detected as the characteristic point, or a boundary (edge) portion between the eyeball and an eyelid may be detected as the characteristic point.

Detection of the characteristic point may be performed by specification by a person or may be performed using a predetermined algorithm. For example, the characteristic point may be detected (set) by a person operating an input device such as a mouse while viewing an image displayed on a monitor, and specifying a portion representing a physical characteristic such as the above-described left shoulder or right shoulder as the characteristic point. In a case of manually detecting (setting) the characteristic point, a possibility of detecting an erroneous characteristic point is low and there is an advantage of accurate detection.

The characteristic point may be detected by analyzing an image using a predetermined algorithm. As the predetermined algorithm, there is an algorithm described in the following document 1, for example, and a technology called OpenPose or the like can be applied. Document 1: Zhe Cao and Tomas Simon and Shih-En Wei and Yaser Sheikh. Realtime Multi-Person 2D Pose Estimation using Part Affinity Fields. In CVPR, 2017.

The technology disclosed in the document 1 is a technology for estimating a posture of a person, and detects a part (for example, a joint) having a physical characteristic of a person as described above for the posture estimation. Technologies other than the document 1 can also be applied to the present technology, and the characteristic points can be detected by other methods. Simply describing the technology disclosed in the document 1, a joint position is estimated from one image using deep learning, and a confidence map is obtained for each joint. For example, in a case where eighteen joint positions are detected, eighteen confidence maps are generated. Then, posture information of a person can be obtained by joining the joints.

In the characteristic point detection unit 132 (FIG. 6), detection of the characteristic points, in other words, detection of the joint positions is sufficient in this case. Therefore, execution of the processing up to this point is sufficient. Furthermore, information as to whether the detected detection position is a shoulder or an elbow and information as to whether the shoulder is a left shoulder or a right shoulder are necessary in subsequent processing. If such information can be obtained, the processing of joining the joints and estimating the posture can be omitted.

Further, according to the document 1, a case where a plurality of persons is captured in the image can also be coped with. In the first embodiment, the description will be continued using the case where one person is captured as an example. In a fourth embodiment, description will be given assuming a case where a plurality of persons is captured. In a case where the case where a plurality of persons is captured can be coped with as in the fourth embodiment, the following processing is also executed in joining the joints.

In a case where a plurality of persons is captured in an image, there is a possibility that a plurality of combinations of ways of joining the left shoulder and the left elbow exists, for example. For example, there is a possibility that the left shoulder of a person A is combined with the left elbow of the person A, the left elbow of a person B, the left elbow of a person C, or the like. To estimate a correct combination when there is a plurality of combinations, a technique called part affinity fields (PAFs) is used. According to this technique, a correct combination can be estimated by predicting a connectable possibility between joints as a direction vector map.

In the case where the number of captured persons is one, the estimation processing by the PAFs technique and the like can be omitted.

In step S102, the characteristic point detection unit 132 detects a portion representing the physical characteristic of the person from the image as the characteristic point. In the case of using the predetermined algorithm for this detection, accurate detection of the characteristic point is sufficient to the extent that the subsequent processing, specifically, processing described below by the position detection unit 122 can be executed. In other words, it is not necessary to execute all the above-described processing (the processing described in the document 1 as an example), and execution of only processing for detecting the characteristic point with high accuracy is sufficient to the extent that the processing described below by the position detection unit 122 can be executed. In a case of detecting the characteristic point by analyzing the image using the predetermined algorithm, the physical characteristic such as the joint position of a person can be detected without troubling the user. Meanwhile, there is a possibility of occurrence of erroneous detection or detection omission.

The detection of the characteristic point by a person and the detection of the characteristic point using the predetermined algorithm may be combined. For example, after the characteristic point is detected by an image analysis using the predetermined algorithm, verification as to whether or not the characteristic point detected by a person is correct, correction in the case of erroneous detection, addition in the case of detection omission, and the like may be performed.

Furthermore, in the case of detecting the characteristic point using the predetermined algorithm, an image analysis used for face authentication is also used and different algorithms are applied to a face portion and a body portion, and the respective characteristic points may be detected from the face portion and the body portion.

In step S102 (FIG. 8), the characteristic point detection unit 132 detects the physical characteristic points of a person from an image. Here, the description will be continued using the case where the eighteen points of a left shoulder, a right shoulder, a left elbow, a right elbow, a left wrist, a right wrist, a neck, a left hip, a right hip, a left knee, a right knee, a left ankle, a right ankle, a right eye, a left eye, a nose, a mouth, a right ear, and a left ear of a person are detected as the characteristic points.

In step S103, the position detection unit 122 calculates parameters. The characteristic point detected by the characteristic point detection unit 132-1 from the image imaged by the imaging device 11-1 and the characteristic point detected by the characteristic point detection unit 132-2 from the image imaged by the imaging device 11-2 are supplied to the position detection unit 122-1, and the position detection unit 122-1 calculates the relative positions of the imaging device 11-1 and the imaging device 11-2 using the supplied characteristic points. As described above, in this case, the relative position is the position of the imaging device 11-2 with respect to the imaging device 11-1 when the imaging device 11-1 is set as the reference.

Similarly, the characteristic point detected by the characteristic point detection unit 132-1 from the image imaged by the imaging device 11-1 and the characteristic point detected by the characteristic point detection unit 132-3 from the image imaged by the imaging device 11-3 are supplied to the position detection unit 122-2, and the position detection unit 122-2 calculates the relative positions of the imaging device 11-1 and the imaging device 11-3 using the supplied characteristic points. In this case, the position information of the imaging device 11-3 with respect to the imaging device 11-1 is calculated when the imaging device 11-1 is set as the reference.

The position detection unit 122 calculates parameters called external parameters as the relative position of the imaging device 11. The external parameters of the imaging device 11 (generally referred to as external parameters of a camera) are rotation and translation (rotation vector and translation vector). The rotation vector represents the orientation of the imaging device 11, and the translation vector represents the position of the imaging device 11. Furthermore, in the external parameters, the origin of the coordinate system of the imaging device 11 is at an optical center, and an image plane is defined by the X axis and the Y axis.

The external parameters are obtained and calibration of the imaging device 11 can be performed using the external parameters. Here, a method of obtaining the external parameters will be described. The external parameters can be obtained using an algorithm called 8-point algorithm.

Figure 9:
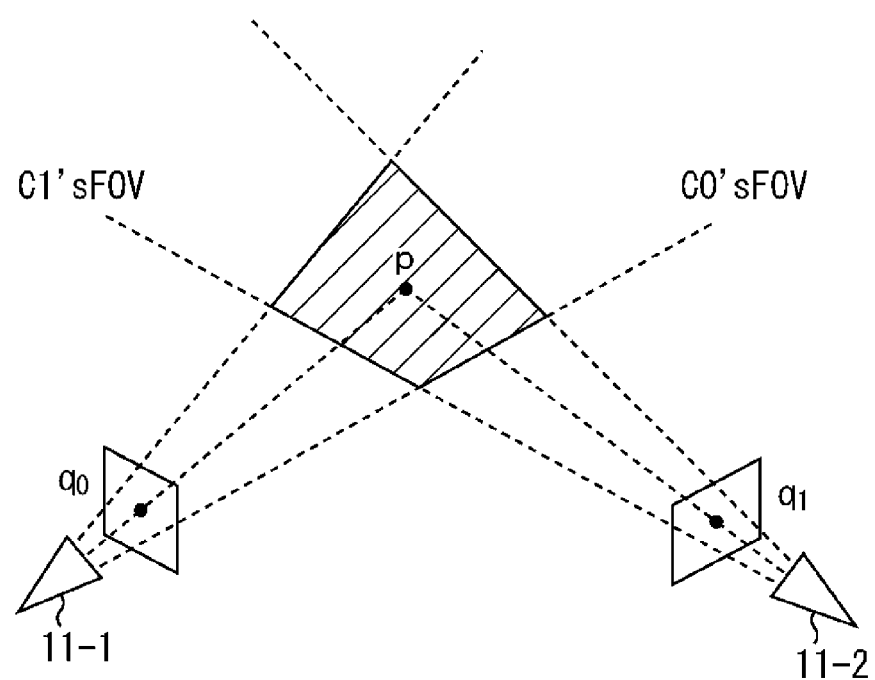
FIG. 9 is a diagram for describing how to calculate external parameters.

Assume that a three-dimensional point p exists in a three-dimensional space as illustrated in FIG. 9, and projected points on an image plane when the imaging device 11-1 and the imaging device 11-2 capture the point are q0 and q1, respectively. The following relational expression (1) is established between the projected points q0 and q1.

[Expression 1]

In the expression (1), F is a fundamental matrix. This fundamental matrix F can be obtained by preparing eight or more pairs of coordinate values of when certain three-dimensional points are captured by imaging devices 11, such as (q0, q1), and applying the 8-point algorithm or the like.

Moreover, the expression (1) can be expanded to the following expression (2), using internal parameters (K0, K1) that are parameters unique to the imaging device 11, such as a focal length and an image center, and an essential matrix E. Furthermore, the expression (2) can be expanded to an expression (3).

[Expression 2]

[Expression 3]

In a case where the internal parameters (K0, K1) are known, an E matrix can be obtained from the above-described pairs of corresponding points. Moreover, this E matrix can be decomposed into the external parameters by singular value decomposition. Furthermore, the essential matrix E satisfies the following expression (4) where vectors representing the point p in the coordinate system of the imaging device are p0 and p1.

[Expression 4]

At this time, the following expression (5) is established in a case where the imaging device 11 is a perspective projection imaging device.

[Expression 5]

At this time, the E matrix can be obtained by applying the 8-point algorithm to the pair (p0, p1) or the pair (q0, q1). From the above, the fundamental matrix and the external parameters can be obtained from the pairs of corresponding points obtained between the images imaged by the plurality of imaging devices 11.

The position detection unit 122 calculates the external parameters by performing processing to which such an 8-point algorithm is applied. In the above description, the eight pairs of corresponding points used in the 8-point algorithm are pairs of the characteristic points detected as the positions of the physical characteristics of a person. Here, a pair of the characteristic points will be additionally described.

Figure 10:
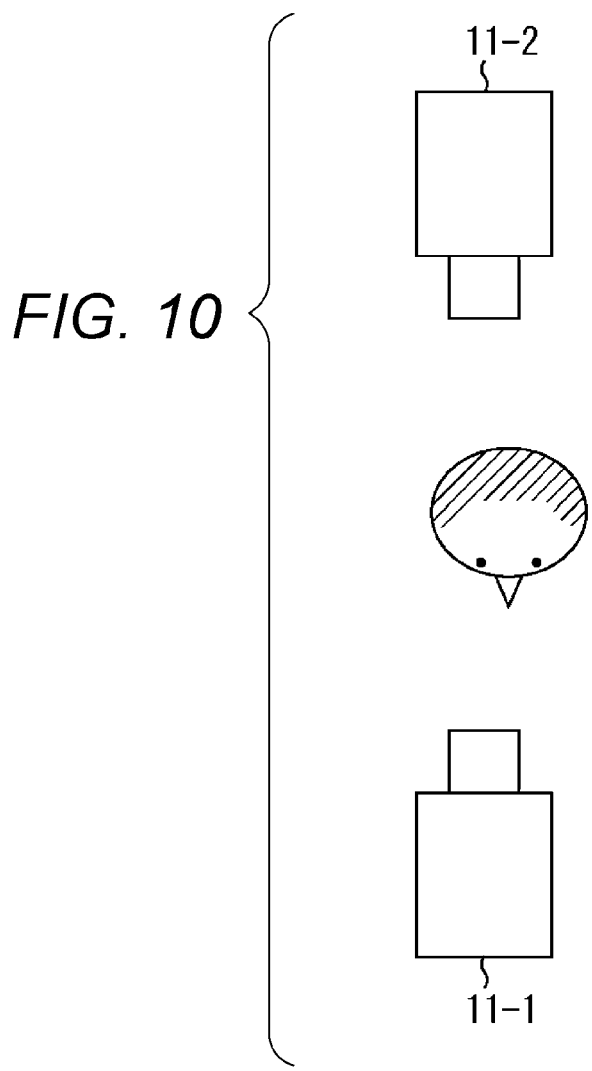
FIG. 10 is a diagram illustrating an example of a positional relationship of imaging devices.

To describe a pair of the characteristic points, the characteristic points detected in a situation as illustrated in FIG. 10 will be described as an example. As illustrated in FIG. 10, the imaging device 11-1 and the imaging device 11-2 are arranged at positions of 180 degrees and are capturing a person. FIG. 10 illustrates a state in which the imaging device 11-1 is capturing the person from the front, and the imaging device 11-2 is capturing the person from a back side. When the imaging devices 11 are arranged in this manner, the image imaged by the imaging device 11-1 (the characteristic points detected from the image) is illustrated in the left diagram in FIG. 11 and the image imaged by the imaging device 11-2 (the characteristic points detected from the image) is illustrated in the right diagram in FIG. 11. Since the imaging device 11-1 images the subject (person) from the front, eighteen points are detected as the characteristic points as illustrated in the left diagram in FIG. 11. The characteristic point detection unit 132 provides information (described as characteristic point position) indicating which part of the person the detected characteristic point is detected from, and information (described as characteristic point identifier) for identifying the characteristic point. The characteristic point identifier may be information that can identify individual characteristic points, and for example, numbers, alphabets, or the like are assigned. In FIG. 11, description is given using a case where alphabets are provided as the characteristic point identifiers as an example. Furthermore, if a rule is provided such that a is assigned to an identifier associated with a characteristic point position, for example, a right ankle, as the characteristic point identifier, the characteristic point identifier a can be uniquely identified as the characteristic point detected from the right ankle portion Hereinafter, the description will be continued on the assumption that the description of the characteristic point a or the like indicates that the characteristic point identifier is a and the characteristic point a represents the characteristic point detected from a predetermined position, for example, the right ankle portion.

Referring to the left diagram in FIG. 11, characteristic points a to r are detected from an image 11-1 imaged by the imaging device 11-1. The characteristic point a is a characteristic point detected from the right ankle portion, and the characteristic point b is a characteristic point detected from the left ankle portion.

The characteristic point c is a characteristic point detected from the right knee portion, and the characteristic point d is a characteristic point detected from the left knee portion.

The characteristic point e is a characteristic point detected from the right waist portion, and the characteristic point f is a characteristic point detected from the left waist portion. The characteristic point g is a characteristic point detected from the right wrist portion, and the characteristic point h is a characteristic point detected from the left wrist portion. The characteristic point i is a characteristic point detected from the right elbow portion, and the characteristic point j is a characteristic point detected from the left elbow portion.

The characteristic point k is a characteristic point detected from the right shoulder portion, and the characteristic point l is a characteristic point detected from the left shoulder portion. The characteristic point m is a characteristic point detected from the neck portion. The characteristic point n is a characteristic point detected from the right ear portion, and the characteristic point o is a characteristic point detected from the left ear portion. The characteristic point p is a characteristic point detected from the right eye portion, and the characteristic point q is a characteristic point detected from the left eye portion. The characteristic point r is a characteristic point detected from the nose portion.

Referring to the right diagram in FIG. 11, characteristic points a' to o' are detected from an image 11-2 imaged by the imaging device 11-2. The characteristic points (characteristic point identifiers) detected from the image 11-2 are described with a dash, and the same identifiers represent the same place, for example, the identifier a and the identifier a' represent the characteristic points detected from the right ankle. Since the imaging device 11-2 captures the back of the person, the eyes and nose detected from the face portion are not detected, so a characteristic points p', a characteristic point q', and a characteristic point r' are not illustrated.

The characteristic points described with reference to FIG. 11 are input to the position detection unit 122-1 (FIG. 6). Information indicating which imaging device 11 has imaged the characteristic points (described as imaging device specifying information) and information of a capture frame number and the like are also input to the position detection unit 122-1, as the information regarding the characteristic points, in addition to the information such as the characteristic point positions and the characteristic point identifiers.

The capture frame number is information for identifying an image to be processed and can be a number sequentially assigned to each frame after capture by the imaging device 11 is started, for example. The imaging device specifying information and the capture frame number are transmitted together with (included in) the image data from the imaging device 11. Other information such as capture time may also be transmitted together with the image data.

As illustrated in FIG. 4, in a case of the configuration in which the characteristic point detection unit 102 is included in the imaging device 11, the information such as the imaging device specifying information and the capture frame number is transmitted together with the information such as the characteristic point positions and the characteristic point identifiers.

The position detection unit 122 associates the characteristic points extracted from the images respectively captured by the imaging device 11-1 and the imaging device 11-2, using the supplied information. What are associated are the characteristic points extracted from the same place, in other words, the characteristic points at the same characteristic point position. For example, in the case illustrated in FIG. 11, the characteristic point a and the characteristic point a' detected from the right ankle are associated, and the characteristic point b and the characteristic point b' detected from the left ankle are associated. Hereinafter, the associated two characteristic points are described as corresponding points.

In a case of calculating the external parameters using the 8-point algorithm, eight pairs of corresponding points are sufficient. Since eighteen characteristic points are detected from the image 11-1 and the fifteen characteristic points are detected from the image 11-2, fifteen pairs of the corresponding points are obtained. Eight pairs of corresponding points out of the fifteen pairs of the corresponding points are used, and the external parameters are calculated as described above. The 8-point algorithm is used to obtain relative rotation of two imaging devices 11 and change in the position information. Therefore, to obtain the position information of two or more of a plurality of imaging devices, for example, to obtain the position information of the three imaging devices 11-1 to 11-3, as described with reference to FIG. 7, one imaging device 11 is set as the reference, and the relative positions with respect to the reference imaging device 11 are obtained. Therefore, two position detection units 122 are required as illustrated in FIG. 6. In other words, to obtain the position information of N imaging devices, (N−1) position detection units 122 are provided in the information processing apparatus 12.

In step S103 (FIG. 8), the relative positions (external parameters) of the imaging device 11-1 and the imaging device 11-2 are obtained by the position detection unit 122-1 and the relative positions (external parameters) of the imaging device 11-1 and the imaging device 11-3 are obtained by the position detection unit 122-2.

Since the relative positions of the imaging device 11-1 and the imaging device 11-2 and the relative positions of the imaging device 11-1 and the imaging device 11-3 are detected by the processing so far, the respective positions of the imaging devices 11-1 to 11-3 can be obtained with reference to the imaging device 11-1, as described with reference to FIG. 7. Therefore, the relative positions detected at this point of time may be supplied to the position integration unit 124 and the processing may be moved onto processing of integrating the positions of the imaging devices 11-1 to 11-3.

The description will be continued on the assumption that processing of increasing the accuracy of the external parameters is further executed. In the above-described processing, the external parameters are obtained using the eight pairs of corresponding points. The accuracy of the external parameters to be calculated can be increased by calculating the external parameters from more information.

Processing of increasing the accuracy of the external parameters of the imaging device 11 using eight or more pairs of the corresponding points will be described. To increase the accuracy of the external parameters, verification as to whether or not the calculated external parameters are correct is performed (step S104).

To increase the accuracy of the external parameters to be calculated, an external parameter having the highest consistency with the positions of the remaining characteristic points is selected from external parameters obtained from arbitrarily or randomly selected eight pairs of corresponding points. The consistency in this case means that, when corresponding points other than the eight pairs of corresponding points used for the calculation of the external parameters are substituted into the above-described expression (1), the right side becomes 0 if the calculated external parameters of the imaging device 11 are correct or an error E occurs if the calculated external parameters are not correct.

For example, in a case where the external parameters are obtained from the eight pairs of the corresponding points of the characteristic points a to h and the characteristic points a' to h', and when the obtained external parameters and any one pair of the corresponding points of the characteristic points i to o and the characteristic points i' to o' are substituted to the expression (1), it can be determined that the correct external parameters have been calculated in a case where a result becomes 0 and it can be determined that wrong external parameters have been calculated in a case where the result becomes the error E other than 0.

In a case where the substitution result is the error E, the external parameters are obtained from the corresponding points other than the eight pairs of corresponding points of the characteristic points a to h and the characteristic points a' to h' used when the external parameters are previously calculated, for example, the characteristic points a to g and i and the characteristic points a' to g' and i', and the obtained external parameters and the corresponding points other than the eight pairs of corresponding points of the characteristic points a to g and i and the characteristic points a' to g' and i' are substituted into the expression (1), and whether or not the error E occurs is determined.

Figure 12:
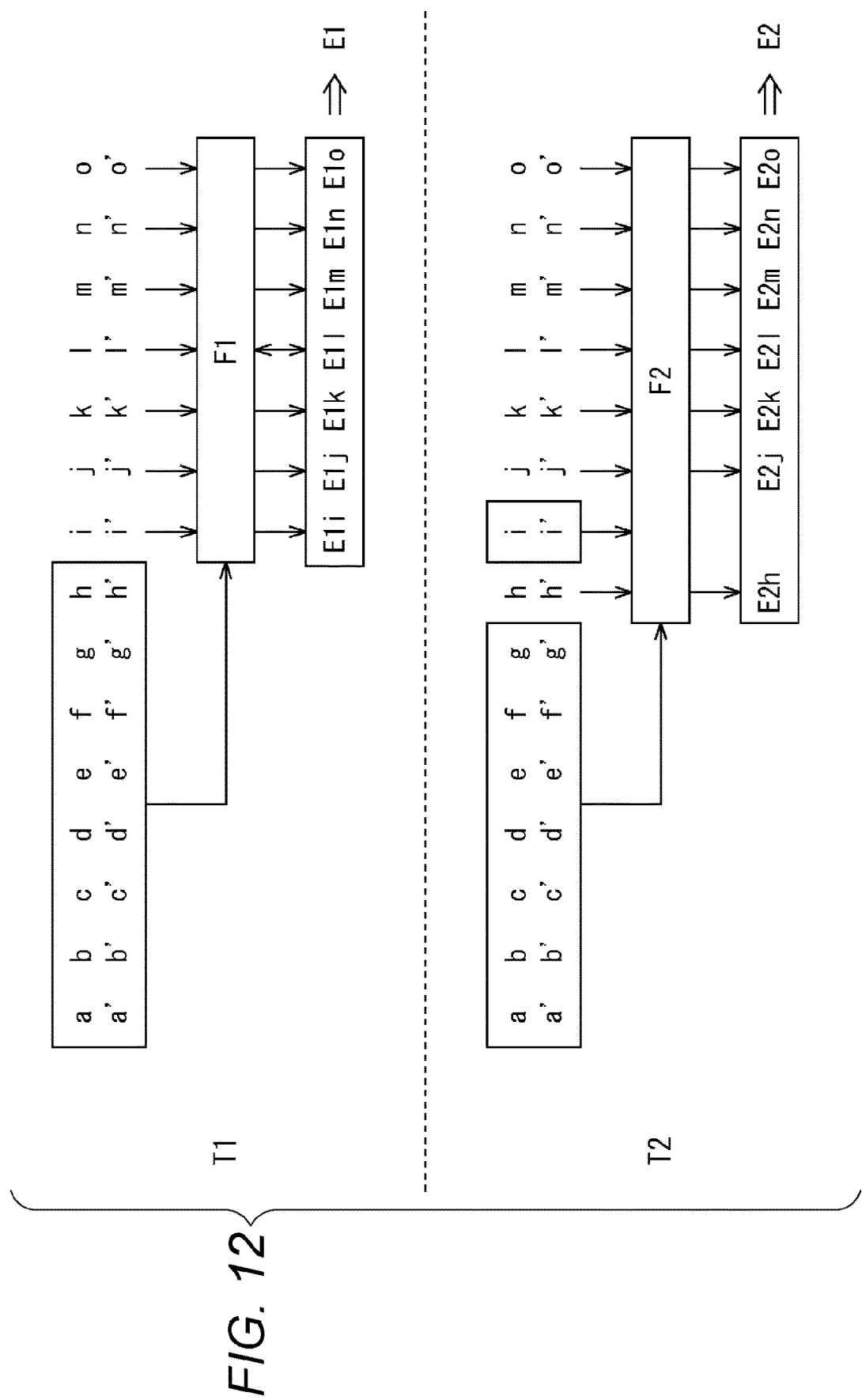
FIG. 12 is a diagram for describing parameter verification.

The external parameter with the substitution result of 0 or with the error E of the smallest value can be estimated as an external parameter calculated with the highest accuracy. The case of performing such processing will be described with reference to FIG. 12 again. At a time T1, the external parameters are obtained from the eight pairs of corresponding points between the characteristic points a to h and the characteristic points a' to h', and the fundamental matrix F1 is calculated. The corresponding points between the characteristic point i and the characteristic point i' are substituted into the expression (1) where the fundamental matrix F1 is F in the expression (1). The calculation result at this time is an error E1i.

Likewise, the corresponding points between the characteristic point j and the characteristic point j' are substituted into the expression (1), where the fundamental matrix F1 is F in the expression (1), and an error E1j is calculated.

Errors E1k to E1o are calculated by executing the calculation where the fundamental matrix F1 is F in the expression (1), for the respective corresponding points between the characteristic points k to o and the characteristic points k' to o'. A value obtained by adding all the calculated errors E1i to E1o is set as an error E1.

At a time T2, the external parameters are obtained from the eight pairs of corresponding points between the characteristic points a to g and i and the characteristic points a' to g' and i', and a fundamental matrix F2 is calculated. The corresponding points between the characteristic point h and the characteristic point h' are substituted into the expression (1), where the fundamental matrix F2 is F in the expression (1), and an error E2h is calculated. Likewise, errors E2j to E2o are calculated by executing the calculation where the fundamental matrix F2 is F in the expression (1), for the respective corresponding points between the characteristic points j to o and the characteristic points j' to o'. A value obtained by adding all the calculated error E2h and errors E2j to E2o is set as an error E2.

As described above, the external parameters are calculated using the eight pairs of corresponding points and the errors E of the calculated external parameters are respectively calculated using the corresponding points other than the eight pairs of corresponding points used for the calculation, and the total value is finally calculated. Such processing is repeatedly performed while changing the eight pairs of corresponding points used for calculating the external parameters.

In a case of selecting eight pairs of corresponding points from fifteen pairs of corresponding points and calculating the external parameters, 1508 external parameters are calculated and the error E is calculated from a combination formula when calculating the external parameters for all the corresponding points. The external parameter of when the error E with the smallest value out of the 1508 errors E is calculated is the external parameter calculated with the highest accuracy. Then, the subsequent processing is performed using the external parameter calculated with the highest accuracy, the position information of the imaging device 11 can be calculated with high accuracy.

Here, the external parameters are calculated using the eight pairs of corresponding points and the errors E of the calculated external parameters are calculated using the corresponding points other than the eight pairs of corresponding points used for the calculation, and added values are compared. As another method, maximum values of the errors E obtained when the corresponding points before addition are substituted may be compared in the above description without addition.

When the maximum values of the errors E are compared, an error E with the smallest maximum value is extracted, and the external parameter of when the extracted error E is calculated may be calculated as the external parameter calculated with the highest accuracy. For example, in the above-described example, the maximum value in the errors E1i to E1o and the maximum value in the error E2h and the errors E2j to E2o are compared, and the external parameter of when a smaller error E is calculated may be set as the external parameter calculated with the highest accuracy.

Further, the external parameter calculated with the highest accuracy may be calculated using a median value of the errors E or an average value of the errors E, instead of the maximum value of the errors E.

Further, in the case of using the maximum value, the median value, or the average value of the errors E, processing of excluding the characteristic point with a large error may be performed in advance by threshold processing in order to exclude an outlier. For example, at the time T1 in FIG. 12, the errors E1i to E1o are calculated. In a case where the error E1o in the errors E1i to E1o is equal to or larger than a threshold value, for example, the maximum value, the median value, or the average value may be calculated using the errors E1i to E1n excluding the error E1o.

Furthermore, according to the processing (processing of calculating the characteristic points) based on the above-described document 1, reliability of each characteristic point can be calculated as additional information. The external parameters may be calculated taking the reliability into account. In a case of imaging a person and detecting a characteristic point, the reliability of the detected characteristic point differs depending on the posture of the person, or the position or the angle of the imaging device with respect to the person.

For example, as illustrated in FIG. 11, the reliability of a characteristic point n at a right eye position of when the person is imaged from the front is high but the reliability of a characteristic point n' at the right eye position of when the person is imaged from the back is low even if detected.

For example, the external parameters may be obtained using top eight pairs of corresponding points of the characteristic points having high reliability.

Furthermore, in the case of executing the above-described processing of improving the accuracy of the external parameters, the processing may be executed using only the characteristic points having the reliability of a predetermined threshold value or more. In other words, the external parameters are obtained using the eight pairs of corresponding points having the reliability of the predetermined threshold value or more, and the errors E may be calculated using the corresponding points of the characteristic points other than the eight pairs of corresponding points used for calculating the external parameters and having the reliability of the predetermined threshold value or more.

Furthermore, the reliability may be used as weighting. For example, in a case of calculating total values of the errors E and comparing the total values in the processing of improving the accuracy of the external parameters, the total values may be calculated such that weighting of an error E calculated from the characteristic point with high reliability is made large and weighting of an error E calculated from the characteristic point with low reliability is made small. In other words, the total value of the errors E may be calculated treating the error E calculated in the calculation using the characteristic point with high reliability as the error E with high reliability, and the error E calculated in the calculation using the characteristic point with low reliability as the error E with low reliability.

The reliability of the external parameters, that is, the accuracy of the external parameters can be improved by the calculation using the reliability.

Since the relative positions of the imaging device 11-1 and the imaging device 11-2 and the relative positions of the imaging device 11-1 and the imaging device 11-3 are detected by the processing so far, the respective pieces of the position information of the imaging devices 11-1 to 11-3 can be obtained with reference to the imaging device 11-1, as described with reference to FIG. 7. Therefore, the relative positions detected at this point of time may be supplied to the position integration unit 124 and the processing may be moved onto the processing of integrating the position information of the imaging devices 11-1 to 11-3.

Here, the description will be continued using the case where the processing in the position smoothing unit 123 is executed in order to improve the accuracy of calculated relative positions as an example.

In steps S103 and S104 (FIG. 8), the relative positions (external parameters) of the imaging device 11-1 and the imaging device 11-2 verified by the position detection unit 122-1 are supplied to the position smoothing unit 123-1 and the relative positions (external parameters) of the imaging device 11-1 and the imaging device 11-3 verified by the position detection unit 122-2 are supplied to the position smoothing unit 123-2.

In step S105, the position smoothing unit 123 smooths the external parameters in the time direction.

The external parameters are calculated by the processing up to step S103, in other words, by the processing of the position detection unit 122 but the external parameters are calculated using the eight pairs of corresponding points. Therefore, there is a possibility that noise is included in the external parameters and the external parameters are not accurate values. For example, in a case where a person is imaged from a side surface (right side or left side), what is detected as the physical characteristic point is only the imaged surface side. Therefore, the number of the characteristic points is smaller than the eighteen characteristic points, as illustrated in the left diagram in FIG. 11. Moreover, in such a case, there is a possibility that eight characteristic points are not detected, and if the eight characteristic points are not detected, the 8-point algorithm is not applied, and therefore the external parameters are not detected in some cases.

Furthermore, there is a case where a characteristic point with low reliability is included in some cases even if eight or more characteristic points are detected in the case where a person is imaged from a side surface, and there is a possibility that noise is included in the external parameters by using the characteristic point with low reliability. Therefore, to remove such noise, smoothing is performed in the time direction.

The relative position information supplied to the position smoothing unit 123 is, in other words, information of the relative positions and the rotation angles of the two imaging devices 11 detected in the position detection unit 122, is three-dimensional information. Therefore, the position smoothing unit 123 smooths the position of the imaging device 11 and the rotation angle of the optical axis in the time direction. To describe smoothing, this three-dimensional information is expressed as follows. The values described below are values indicating the position information of the imaging device 11-2 or the imaging device 11-3 with respect to the reference imaging device 11 (in this case, the imaging device 11-1).

CamPosX1 (K, t): the X coordinate of the position of the imaging device

CamPosY1 (K, t): the Y coordinate of the position of the imaging device

CamPosZ1 (K, t): the Z coordinate of the position of the imaging device

CamAngleX1 (K, t): the rotation angle around the X axis of the optical axis

CamAngleY1 (K, t): the rotation angle around the Y axis of the optical axis

CamAngleZ1 (K, t): the rotation angle around the Z axis of the optical axis

These values indicate values at a predetermined time t, and k is an identifier of the imaging device 11, for example, a number assigned to the imaging device 11.

Here, since the description is given using the example in which the three imaging devices 11-1 to 11-3 are arranged as an example, 2 or 3 is set to k of the above-described values in a case where 1 is assigned to the imaging device 11-1, 2 is assigned to the imaging device 11-2, and 3 is assigned to the imaging device 11-3 as the identifiers.

CamPosX1 (2, t), CamPosY1 (2, t), CamPosZ1 (2, t), CamAngleX1 (2, t), CamAngleY1 (2, t), and CamAngleZ1 (2, t) are input to the position smoothing unit 123-1 as the position information of the imaging device 11-2 with respect to the imaging device 11-1 at the predetermined time t. Furthermore, CamPosX1 (3, t), CamPosY1 (3, t), CamPosZ1 (3, t), CamAngleX1 (3, t), CamAngleY1 (3, t), and CamAngleZ1 (3, t) are input to the position smoothing unit 123-2 as the position information of the imaging device 11-3 with respect to the imaging device 11-1 at the predetermined time t.

The position smoothing unit 123 smooths the position information in the time direction on the basis of the following expression (6) using a smoothing coefficient $\alpha$.

$$CamPosX1(K,t) = \alpha \cdot CamPosX1(K,t) + (1-\alpha) \cdot CamPosX1(K,t-1)$$

$$CamPosY1(K,t) = \alpha \cdot CamPosY1(K,t) + (1-\alpha) \cdot CamPosY1(K,t-1)$$

$$CamPosZ1(K,t) = \alpha \cdot CamPosZ1(K,t) + (1-\alpha) \cdot CamPosZ1(K,t-1)$$

$$CamAngleX1(K,t) = \alpha \cdot CamAngleX1(K,t) + (1-\alpha) \cdot CamAngleX1(K,t-1)$$

$$CamAngleY1(K,t) = \alpha \cdot CamAngleY1(K,t) + (1-\alpha) \cdot CamAngleY1(K,t-1)$$

$$CamAngleZ1(K,t) = \alpha \cdot CamAngleZ1(K,t) + (1-\alpha) \cdot CamAngleZ1(K,t-1) \quad (6)$$

The smoothing coefficient $\alpha$ may be a value common to these six values or may be a different value for each of the six values. Referring to the expression (6), for example, the expression of the X coordinate, the value of the X coordinate at the time t is calculated using a value obtained at the time t and a value obtained at a preceding time t−1. Here, the description will be continued using the case of using the values at the time t and the time t−1 as an example. However, values of further preceding time t−2, time t−3, and the like may also be used.

By smoothing the position information in the time direction as described above, occurrence of the following state can be coped with and thus the position information of the imaging device 11 can be obtained with high accuracy.

In the present embodiment, a person is captured by the three imaging devices 11-1 to 11-3, the characteristic points serving as the physical characteristics of the person are detected from the captured image, and the position information of the imaging devices 11-1 to 11-3 is specified using the characteristic points, as described with reference to FIGS. 1 to 7. Here, if the same person is captured by the three imaging devices 11-1 to 11-3 at the same time, the respective pieces of the position information of the imaging devices 11-1 to 11-3 can be specified by up to the processing before the position smoothing unit 123.

However, there is a possibility that the same person is not captured by the imaging devices 11-1 to 11-3 at the same time. For example, there is a possibility of occurrence of a situation where, at the time t, the imaging device 11-1 and the imaging device 11-2 capture the person A but the imaging device 11-3 does not capture the person A because the person A exists outside the field of view of the imaging device 11-3. In such a situation, the characteristic point is not detected from the image captured by the imaging device 11-3, and the corresponding points to the characteristic points detected from the image captured by the imaging device 11-1 are not obtained.

When such a situation occurs, the position information is calculated using the characteristic points detected at a time other than the time t. However, even if the person A is not captured by the imaging device 11-3 at predetermined time t, the person A exists within the field of view of the imaging device 11-3 at another time due to movement of the person A, and the possibility that the person A is captured by the imaging device 11-3 is high.

Therefore, in a case where the characteristic point is not obtained from the image from the imaging device 11-3 at the time t, the position information of the imaging device 11-3 is calculated using the characteristic point obtained when the person A is imaged at preceding point of time or the position information of the imaging device 11-3 is calculated using the characteristic point detected from the image obtained when the person A moves, becomes capturable, and is captured at later point of time.

The position smoothing unit 123 uses the position information when the position detection unit 122 can acquire the position information at the latest time t, and the position smoothing unit 123 accumulates the result of the preceding time t−1 and uses the accumulated result when the position detection unit 122 does not acquire the position information.

By performing such processing by the position smoothing unit 123, the relative position of the imaging device 11 can be calculated even if not all the plurality of imaging devices 11 are installed in a state where the fields of view overlap, in other words, even if not all the plurality of imaging devices 11 are installed at positions where the imaging devices 11 can capture the same person at the same time.

In other words, the respective pieces of the position information of the plurality of imaging devices 11 can be calculated by the movement of the person even if the imaging devices 11 that are not the references are arranged in a state where the fields of view do not overlap as long as the fields of view overlap with the field of view of the reference imaging device 11.

In step S105 (FIG. 8), the position information (external parameter) smoothed in the time direction by the position smoothing unit 123 (FIG. 6) is output to the position integration unit 124. In step S106, the position integration unit 124 integrates the position information. The information of the relative position of the imaging device 11-2 based on the imaging device 11-1 is supplied from the position smoothing unit 123-1 and the information of the relative position of the imaging device 11-3 based on the imaging device 11-1 is supplied from the position smoothing unit 123-2 to the position integration unit 124. As described with reference to FIG. 7, the position integration unit 124 integrates the position information of the imaging device 11-1, the imaging device 11-2, and the imaging device 11-3, using the supplied information.

As described above, according to the present technology, the positions of the plurality of imaging devices can be specified. Furthermore, for the specification of the positions, a person is imaged, the physical characteristics of the person are detected, and the characteristic points are used. Therefore, calibration of the imaging device can be performed without a calibration board or the like, for example.

Note that, in the above-described embodiment, the case in which a person is captured as the subject and the physical characteristics of the person are detected has been described as an example. However, any subject other than a person can be applied to the present technology as long as the subject is an object from which physical characteristics can be obtained. For example, a so-called mannequin that mimics a shape of a person, a stuffed animal, or the like can be used in place of the above-mentioned person. Furthermore, an animal or the like can be applied to the present technology.

Second Embodiment

Figure 13:
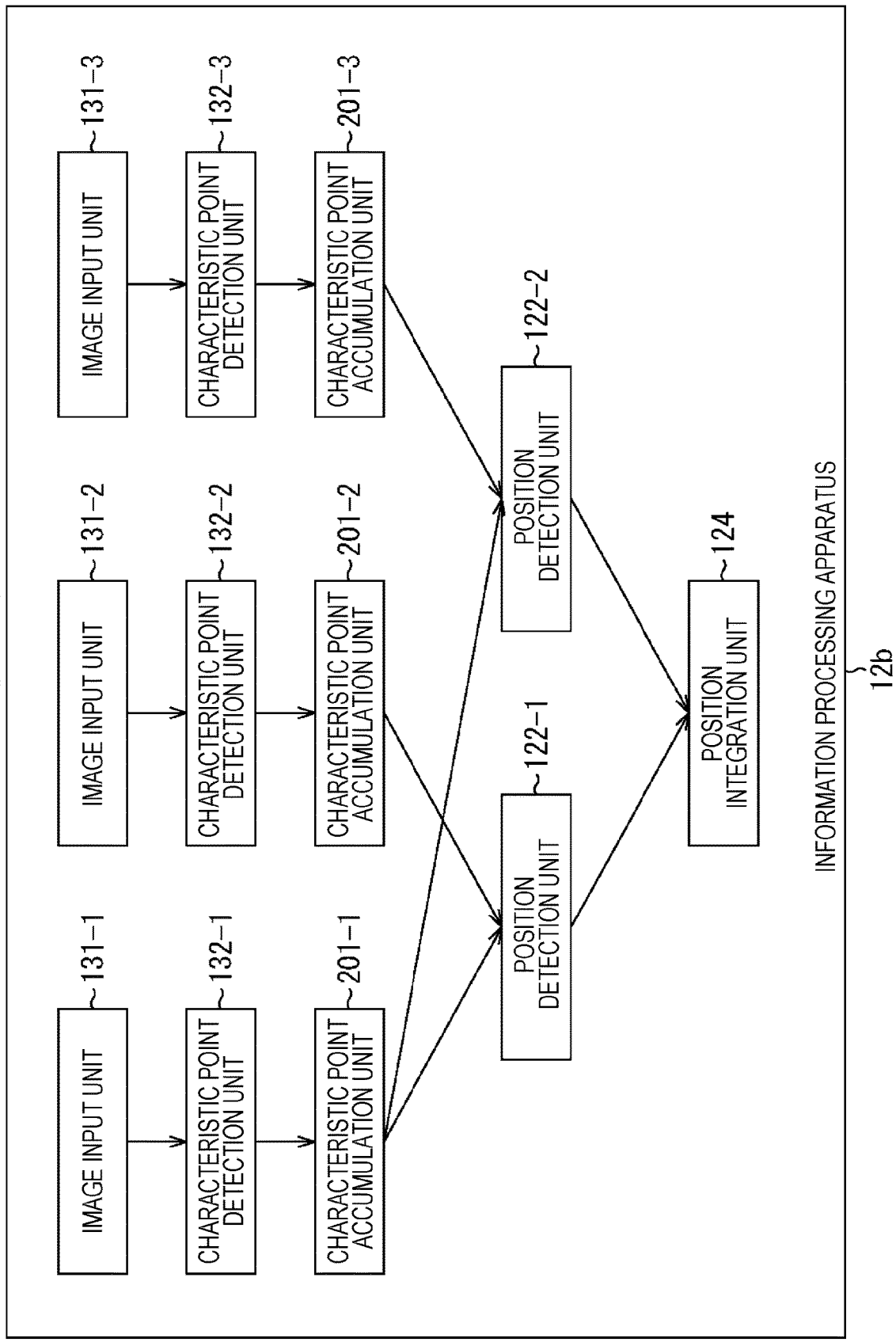
FIG. 13 is a diagram illustrating a configuration of an information processing apparatus according to a second embodiment.

FIG. 13 is a diagram illustrating a configuration example of an information processing apparatus 12b according to the second embodiment. The information processing apparatus 12b illustrated in FIG. 13 has a configuration of a case of processing images from three imaging devices 11-1 to 11-3, as in the information processing apparatus 12a according to the first embodiment illustrated in FIG. 6. The same parts as those of the information processing apparatus 12a according to the first embodiment illustrated in FIG. 6 are denoted by the same reference signs, and description of the same parts will be omitted as appropriate.

As described above, the information processing apparatus 12a according to the first embodiment smooths the position information in the time direction in the position smoothing unit 123 as measures against noise whereas the information processing apparatus 12b according to the second embodiment is different in increasing the number of characteristic points treated in a position detection unit 122 as measures against noise. Specifically, as illustrated in FIG. 13, the information processing apparatus 12b is different from the information processing apparatus 12a according to the first embodiment in having a configuration in which a characteristic point accumulation unit 201 that accumulates characteristic points detected in a characteristic point detection unit 132 is added. Furthermore, the information processing apparatus 12b illustrated in FIG. 13 is different from the information processing apparatus 12a according to the first embodiment in having a configuration in which the position smoothing unit 123 (FIG. 6) is deleted because of performing processing by accumulating the characteristic points. Although the position smoothing unit 123 can be provided in the information processing apparatus 12b according to the second embodiment, here, the description will be continued using a case of the configuration without the position smoothing unit 123 as an example.

A characteristic point accumulation unit 201-1 accumulates characteristic points detected by a characteristic point detection unit 132-1 from an image captured by the imaging device 11-1. Likewise, a characteristic point accumulation unit 201-2 accumulates characteristic points detected by a characteristic point detection unit 132-2 from an image captured by the imaging device 11-2, and a characteristic point accumulation unit 201-3 accumulates characteristic points detected by a characteristic point detection unit 132-3 from an image captured by the imaging device 11-3. The characteristic point accumulation unit 201 accumulates the characteristic points detected from a plurality of images imaged at different times. With the accumulation of the characteristic points, for example, even if a person A is not imaged by the imaging device 11-3 at a predetermined time t and characteristic points are not detected, characteristic points from the person A imaged by the imaging device 11-3 at times other than the time t can be kept accumulated. Therefore, even when the person A is not imaged, occurrence of a situation where no characteristic points for specifying position information of the imaging device 11 exists can be prevented.

An operation of the information processing apparatus 12b illustrated in FIG. 13 will be described with reference to the flowchart in FIG. 14.

In step S201, an image input unit 131 inputs image data. In step S202, the characteristic point detection unit 132 detects characteristic points representing physical characteristics of a person. Since processing in steps S201 and S202 is similar to the processing in steps S101 and S102 (FIG. 8), the description is omitted.

In step S203, the characteristic point accumulation unit 201 accumulates the characteristic points detected by the characteristic point detection unit 132. The characteristic point accumulation unit 201-1 accumulates the characteristic points detected by the characteristic point detection unit 132-1 from the image imaged by the imaging device 11-1. Similarly, the characteristic point accumulation unit 201-2 accumulates the characteristic points detected by the characteristic point detection unit 132-2 from the image imaged by the imaging device 11-2, and the characteristic point accumulation unit 201-3 accumulates the characteristic points detected by the characteristic point detection unit 132-3 from the image imaged by the imaging device 11-3.

In step S204, whether or not the number of the accumulated characteristic points has become a threshold value or more is determined. This determination may be performed by the characteristic point accumulation unit 201 or by the position detection unit 122 by reference to the number of the characteristic points accumulated in the characteristic point accumulation unit 201. In a case where it is determined in step S204 that the number of accumulated characteristic points has not become the threshold value or more, the processing returns to step S201 and the processing in step S201 and subsequent steps is repeated.

On the other hand, in a case where it is determined in step S204 that the number of accumulated characteristic points has become the threshold value or more, the processing proceeds to step S205. In step S205, the position detection unit 122 calculates external parameters (calculates position information of the imaging device 11). In step S206, the calculated external parameters are verified.

Since the calculation of the external parameters in step S205 and the verification of the external parameters in step S206 are similarly performed to the processing in steps S103 and S104 (FIG. 8), detailed description of the processing is omitted here.

In step S205, the external parameters are calculated on the basis of an 8-point algorithm, and in step S206, verification is performed using corresponding points other than eight pairs of corresponding points used for calculating the external parameters. This verification is performed by calculating errors E as described with reference to FIG. 12.

When this verification is performed, corresponding points other than the eight pairs of corresponding points used for calculating the external parameters are used. The number of the corresponding points used for the verification is larger than the case of the first embodiment.

For example, in a case where eighteen characteristic points are detected from one frame (one image) and characteristic points of ten frames are accumulated, one hundred eighty (180) characteristic points are accumulated. The external parameters are calculated using eight characteristic points out of the accumulated one hundred eighty characteristic points, and the verification is performed using the remaining one hundred seventy two (172=180−2) characteristic points. Since the number of characteristic points (corresponding points) used for verification increases in this manner, the accuracy of the verification can be improved and the accuracy of the calculated external parameters can be improved.

Furthermore, the number of combinations of the eight pairs of corresponding points used for calculating the external parameters can be increased. Therefore, when repeating processing of changing the combination of the corresponding points, calculating the external parameters, and verifying the external parameters, the number of the external parameters to be verified can be increased, and more appropriate external parameters can be set.

Furthermore, by accumulation of the characteristic points, even if there is a frame (image) from which characteristic points have not been detected, the characteristic points detected from images captured before and after the frame are accumulated. Therefore, the external parameters can be calculated.

The external parameters (the positional relationship of the imaging device 11) calculated as a result of such verification are output to a position integration unit 124. In step S207, the position integration unit 124 integrates the parameters to specify the positional relationship of the imaging device 11. Since the processing in step S207 is similar to the processing in step S106 (FIG. 8), description of the processing is omitted.

At the point of time when the characteristic points are accumulated and a predetermined number of the characteristic points are accumulated in this manner, the external parameters are calculated. In this case, in step S204, whether or not the number of accumulated characteristic points becomes the threshold value or more is determined. The threshold value used for this determination may be simply set to a numerical value such as 5000.

Further, this threshold value is favorably set to a value that can be determined to be sufficient for calculation of the external parameters. Therefore, the number of images (the number of frames) used for detecting physical characteristic points of a person is determined as an index of the threshold value, using the following two indices.

The first index is the number of characteristic points and is described as index Flag T. The index Flag T is defined by the following expression (7). In the following expression (7), Tk represents the number of physical characteristic points of a person detected in a k-th image. Further, in the following expression (7), Th k represents the threshold value.

$$\text{Flag}T = 0(\Sigma Tk < \text{Th } k)1(\text{other}) \quad (7)$$

The expression (7) is an expression for setting 0 as the index Flag T in a case where the number of characteristic points accumulated in the characteristic point accumulation unit 201 is smaller than the threshold value Th k, and for setting 1 as the index Flag T in a case where the number of characteristic points is equal to or larger than the threshold value Th k.

The second index is distribution of the characteristic points and is described as index Flag A. The index Flag A is defined by the following expression (8). By dividing an image into M in a horizontal direction and N in a vertical direction, one image is divided into M×N blocks. Whether or not a characteristic point exists in each block is expressed by B (M, N). In the following expression (8), Th A represents the threshold value.

$$\text{Flag}A = 0(\Sigma B(M,N) < \text{Th } A)1(\text{other}) \quad (8)$$

In the expression (8), in a case where at least one characteristic point exists in a block, B (M, N)=1 is set, and in a case where no characteristic point exists in a block, B (M, N)=0 is set. The expression (8) is an expression for setting 0 as the index Flag A in a case where a cumulative total of B (M, N) is smaller than the threshold value Th A, and for setting 1 as the index Flag A in a case where the cumulative total is equal to or larger than the threshold value Th A. In other words, the expression (8) is an expression for cumulating the number of blocks where characteristic points exist and determining whether or not the cumulative total becomes the threshold value Th A or more.

The reason why distribution of the characteristic points is used as the second index is that obtainment (verification) of the external parameters can be performed with higher accuracy when the characteristic points (corresponding points) used for the obtainment (verification) exist over the entire image than locally existing in a part of the image.

When the determination as to whether or not the number of characteristic points is the threshold value or more is performed in step S204 (FIG. 14), whether or not both the two index Flag T and index Flag A are set to 1 is determined.

As illustrated in FIG. 13, in a case where there are the characteristic point accumulation units 201-1 to 201-3, in other words, in a case of handling the three imaging devices 11, whether or not the index Flag T=1 and the index Flag A=1 are established is determined for each of the characteristic point accumulation units 201-1 to 201-3. Then, when it is determined that the index Flag T=1 and the index Flag A=1 are established in each of the characteristic point accumulation units 201-1 to 201-3, the characteristic points respectively accumulated in the characteristic point accumulation units 201-1 to 201-3 are supplied to the corresponding position detection units 122-1 and 122-2.

By accumulating the characteristic points for calculating the external parameters in consideration of the distribution of the characteristic points in this way, the external parameters can be obtained with higher accuracy.

Since the external parameters are calculated after the sufficient characteristic points for calculating the external parameters are accumulated, the external parameters can be calculated with high accuracy by the configuration not provided with the position smoothing unit 123, which is provided in the information processing apparatus 12a of the first embodiment. However, even the information processing apparatus 12b according to the second embodiment can have the configuration provided with the position smoothing unit 123.

For example, the characteristic point accumulation unit 201 is configured by a memory, but in a case where the capacity of the memory is not secured or in a case where a computational amount is limited, for example, and a sufficient number of characteristic points are not used and precision is not secured, the configuration provided with the position smoothing unit 123 can be adopted to secure the accuracy.

Third Embodiment

In the first and second embodiments, the case of setting one of the plurality of imaging devices 11 as a reference and obtaining the relative positional relationship with the reference imaging device 11 has been described as an example. A case of obtaining a positional relationship among a plurality imaging devices without setting a reference imaging device 11 will be described as a third embodiment.

Figure 15:
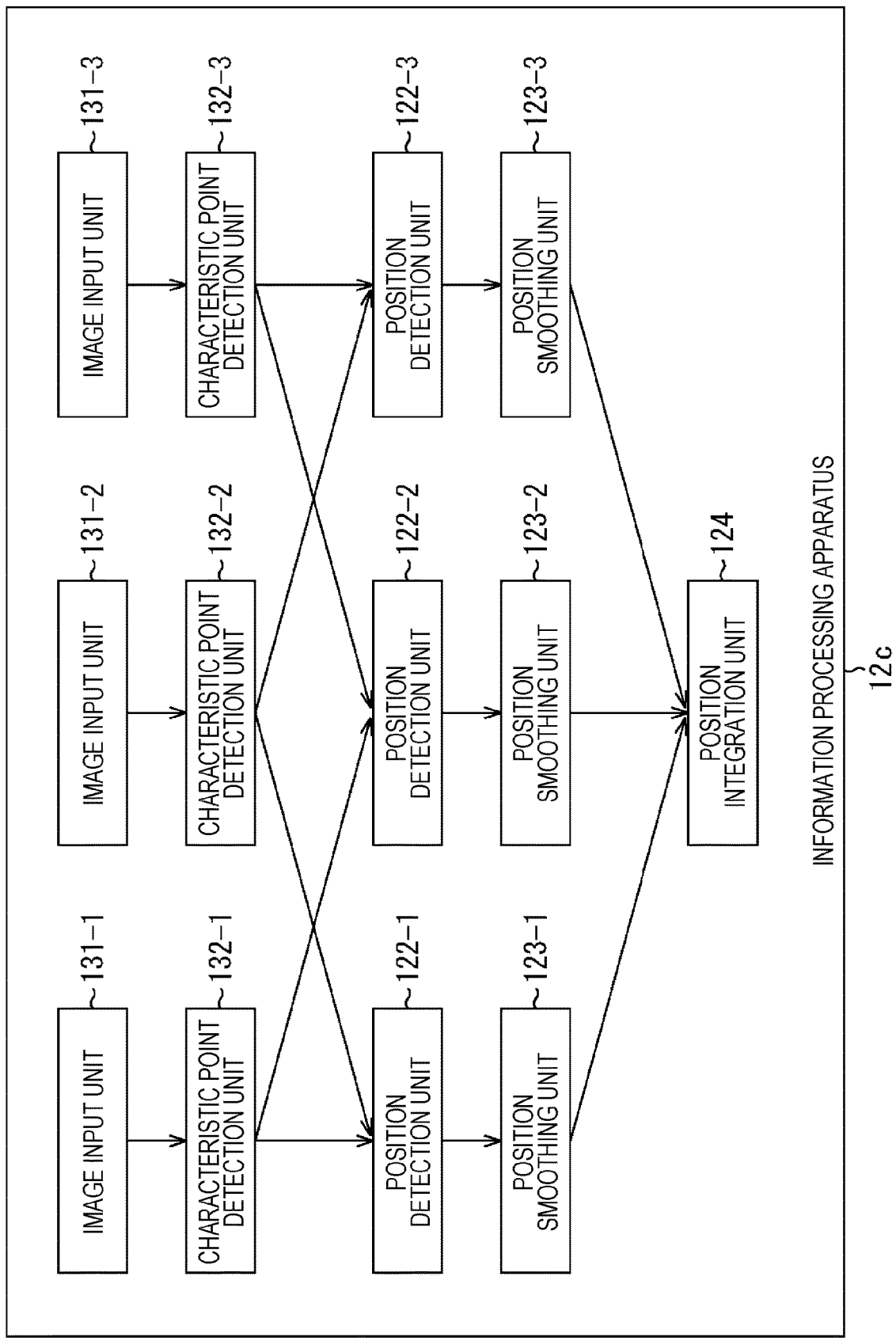
FIG. 15 is a diagram illustrating a configuration of an information processing apparatus according to a third embodiment.

FIG. 15 is a diagram illustrating a configuration of an information processing apparatus 12c according to the third embodiment. The information processing apparatus 12c illustrated in FIG. 15 is different from the information processing apparatus 12a according to the first embodiment illustrated in FIG. 6 in having a configuration in which a position detection unit 122-3 and a position smoothing unit 123-3 are added.

Referring to FIG. 15, the information processing apparatus 12c includes an image input unit 131-1 that inputs image data from an imaging device 11-1, an image input unit 131-2 that inputs image data from an imaging device 11-2, and an image input unit 131-3 that inputs image data from an imaging device 11-3.

The image data input to the image input unit 131-1 is supplied to a characteristic point detection unit 132-1. Likewise, the image data input to the image input unit 131-2 is supplied to a characteristic point detection unit 132-2, and the image data input to the image input unit 131-3 is supplied to a characteristic point detection unit 132-3.

The characteristic point detection unit 132-1 extracts characteristic points from an image imaged by the imaging device 11-1 and supplies the characteristic points to a position detection unit 122-1 and a position detection unit 122-2. The characteristic point detection unit 132-2 extracts characteristic points from an image imaged by the imaging device 11-2 and supplies the characteristic points to the position detection unit 122-1 and the position detection unit 122-3. The characteristic point detection unit 132-3 extracts characteristic points from an image imaged by the imaging device 11-3 and supplies the characteristic points to the position detection unit 122-2 and the position detection unit 122-3.

The characteristic points extracted from the image imaged by the imaging device 11-1 and the characteristic points extracted from the image imaged by the imaging device 11-2 are supplied to the position detection unit 122-1, and the position detection unit 122-1 detects relative positions between the imaging device 11-1 and the imaging device 11-2 using the supplied characteristic points. The relative positions between the imaging device 11-1 and the imaging device 11-2 detected by the position detection unit 122-1 are supplied to a position smoothing unit 123-1.

The characteristic points extracted from the image imaged by the imaging device 11-1 and the characteristic points extracted from the image imaged by the imaging device 11-3 are supplied to the position detection unit 122-2, and the position detection unit 122-2 detects relative positions between the imaging device 11-1 and the imaging device 11-3 using the supplied characteristic points. The relative positions between the imaging device 11-1 and the imaging device 11-3 detected by the position detection unit 122-2 are supplied to a position smoothing unit 123-2.

The characteristic point extracted from the image imaged by the imaging device 11-2 and the characteristic point extracted from the image imaged by the imaging device 11-3 are supplied to the position detection unit 122-3, and the position detection unit 122-3 detects relative positions between the imaging device 11-2 and the imaging device 11-3 using the supplied characteristic points. The relative positions between the imaging device 11-2 and the imaging device 11-3 detected by the position detection unit 122-3 are supplied to the position smoothing unit 123-3.

The position smoothing unit 123-1 performs smoothing processing for the relative positions between the imaging device 11-1 and the imaging device 11-2. The position smoothing unit 123-2 performs smoothing processing for the relative positions between the imaging device 11-1 and the imaging device 11-3. The position smoothing unit 123-3 performs smoothing processing for the relative positions between the imaging device 11-2 and the imaging device 11-3.

Position information from the position smoothing unit 123-1, position information from the position smoothing unit 123-2, and position information from the position smoothing unit 123-3 are supplied to a position integration unit 124. The position integration unit 124 integrates positional relationships among the plurality of imaging devices 11, in this case, the positional relationships among the imaging device 11-1, the imaging device 11-2, and the imaging device 11-3.

The information processing apparatus 12c illustrated in FIG. 15 has a configuration of when the third embodiment is applied to the information processing apparatus 12a according to the first embodiment. As in the information processing apparatus 12a of the first embodiment, the smoothing is processing performed for improving accuracy of the position information to be detected and is processing performed when the number of characteristic points to be detected is small and there is a possibility that the accuracy of the position information to be detected is lowered, and thus can be omitted in a case where sufficient accuracy is obtained. In other words, the position smoothing unit 123 can be deleted from the configuration of the information processing apparatus 12c, and even the deleted configuration is within the application range of the present technology.

Figure 16:
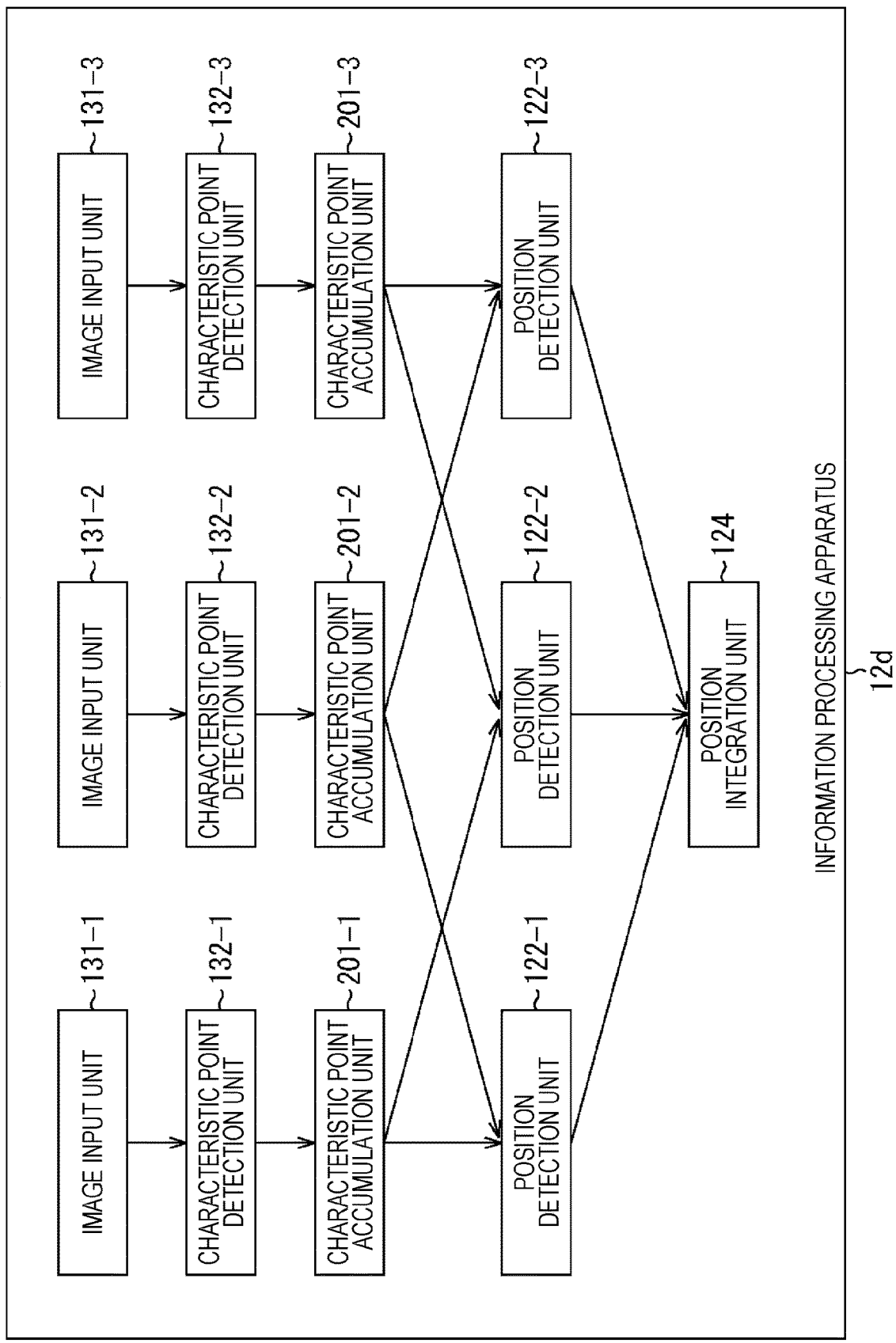
FIG. 16 is a diagram illustrating another configuration of the information processing apparatus according to the third embodiment.

In a case where the third embodiment is applied to the information processing apparatus 12b according to the second embodiment, the configuration of an information processing apparatus 12d illustrated in FIG. 16 is obtained. The information processing apparatus 12d illustrated in FIG. 16 is different from the information processing apparatus 12b according to the second embodiment illustrated in FIG. 13 in having a configuration in which the position detection unit 122-3 is added.

The position detection unit 122-3 calculates a relative positional relationship between the imaging device 11-2 and the imaging device 11-3 using the characteristic points detected from the image captured by the imaging device 11-2 and accumulated in a characteristic point accumulation unit 201-2 and the characteristic points detected from the image captured by the imaging device 11-3 and accumulated in a characteristic point accumulation unit 201-3.

The information processing apparatus 12d illustrated in FIG. 16 can also have the configuration in which the position smoothing unit 123 is added, as in the information processing apparatus 12b illustrated in FIG. 13.

Here, the third embodiment will be described by taking the case of the configuration of the information processing apparatus 12c illustrated in FIG. 15 as an example. Since an operation of the information processing apparatus 12c according to the third embodiment is performed on the basis of the processing in the flowchart illustrated in FIG. 8, as in the information processing apparatus 12a according to the first embodiment, description of the operation is omitted. However, the processing performed by the position integration unit 124 in step S106 is different. Therefore, description will be given here.

Processing in the position integration unit 124 of the information processing apparatus 12c illustrated in FIG. 15 will be described with reference to FIG. 17. The left diagram in FIG. 17 illustrates the positional relationships detected by the position detection unit 122, and the right diagram in FIG. 17 illustrates the positional relationship integrated by the position integration unit 124.

The position detection unit 122 detects a relative positional relationship between two imaging devices 11 of the plurality of imaging devices 11. In other words, the position detection unit 122 detects the position information of one imaging device 11 with respect to the other imaging device 11 in the two imaging devices 11. Further in other words, the position detection unit 122 sets either one of the two imaging devices 11 as a reference and detects the positional relationship between the reference imaging device 11 and the other imaging device 11 that is not the reference.

Here, for convenience, it is assumed that imaging device specifying information assigned to the imaging devices 11 is numbers, and the imaging device 11 having a smaller number is set as the reference. Furthermore, the number is, for example, a branch number attached to the reference sign, and the description is continued on the assumption that the imaging device 11-1 indicates that the imaging device specifying information is "1", for example.

Figure 17:
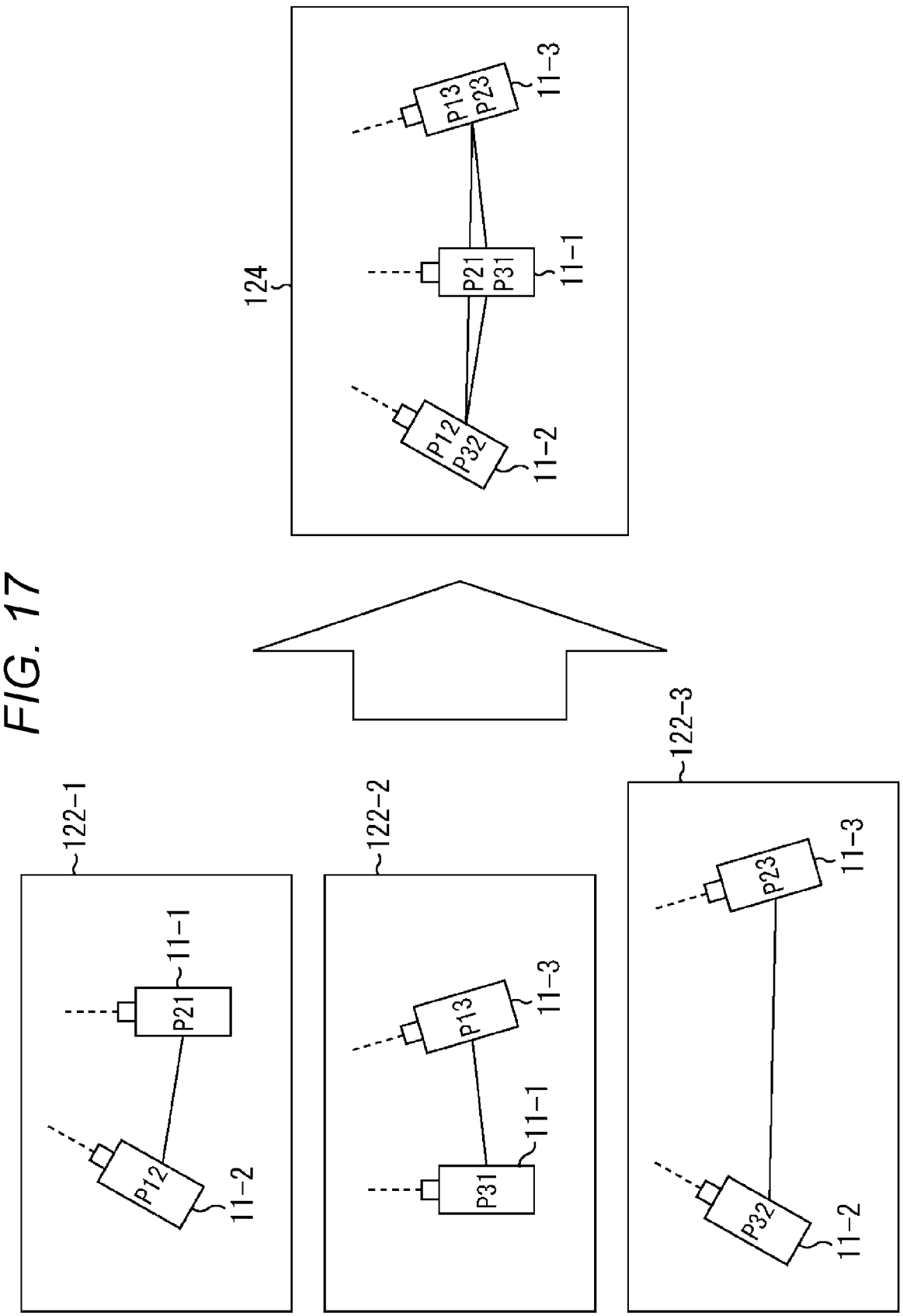
FIG. 17 is a diagram for describing integration of positional relationships of imaging devices.

Referring to the left diagram in FIG. 17, the relative positions between the imaging device 11-1 and the imaging device 11-2 are detected by the position detection unit 122-1. In a case where the position information of the imaging device 11-1 is a position P21, a position P12 of the imaging device 11-2 with respect to the position P21 is detected by the position detection unit 122-1. The position P21 indicates the position information of the imaging device 11-1 with respect to the imaging device 11-2. Furthermore, the position P12 indicates the position information of the imaging device 11-2 with respect to the imaging device 11-1.

The relative positions between the imaging device 11-1 and the imaging device 11-3 are detected by the position detection unit 122-2. In a case where the position information of the imaging device 11-1 is a position P31, a position P13 of the imaging device 11-3 with respect to the position P31 is detected by the position detection unit 122-2. The position P31 indicates the position information of the imaging device 11-1 with respect to the imaging device 11-3. Furthermore, the position P13 indicates the position information of the imaging device 11-3 with respect to the imaging device 11-1.

The relative positions between the imaging device 11-2 and the imaging device 11-3 are detected by the position detection unit 122-3. In a case where the position information of the imaging device 11-2 is a position P32, a position P23 of the imaging device 11-3 with respect to the position P32 is detected by the position detection unit 122-3. The position P32 indicates the position of the imaging device 11-2 with respect to the imaging device 11-3. Furthermore, the position P23 indicates the position of the imaging device 11-3 with respect to the imaging device 11-2.

The position information is information indicating the relative positions among the plurality of imaging devices 11 and a position in a real space. Further, the position information includes an X coordinate, a Y coordinate, a Z coordinate of the imaging device 11, a rotation angle around the X axis of an optical axis, a rotation angle around the Y axis of the optical axis, a rotation angle around the Z axis of the optical axis, as in the first and second embodiments.

The position integration unit 124 can acquire information of the position P12 from the position detection unit 122-1, can acquire information of the position P13 from the position detection unit 122-2, and can acquire information of the position P23 from the position detection unit 122-3. The position integration unit 124 integrates the positions of the imaging devices 11-1 to 11-3 using the acquired information.

As described above, the information processing apparatus 12c detects the relative positional relationship between two imaging devices 11 of the plurality of imaging devices 11, and integrates the relative positional relationships, thereby detecting the positional relationship among the plurality of imaging devices 11. The processing of the position integration unit 124 will be further described. The position integration unit 124 can specify the position information of the imaging device 11-3 on the basis of the information of the position P13 as the relative position with respect to the imaging device 11-1, or can specify the position information of the imaging device 11-3 on the basis of the information of the position P23 as the relative position with respect to the imaging device 11-2.

It is favorable if the position of the imaging device 11-3 specified on the basis of the position P13 coincides with the position of the imaging device 11-3 specified on the basis of the position P23. However, incoincidence is considered in a case where there is an error in one or both of the position P13 and the position P23.

To prevent occurrence of such an error, integration is performed in the position integration unit 124. The position information supplied to the position integration unit 124 is three-dimensional information and can be expressed as follows.

CamPosX2 (K, L): the X coordinate of the position of the imaging device

CamPosY2 (K, L): the Y coordinate of the position of the imaging device

CamPosZ2 (K, L): the Z coordinate of the position of the imaging device

CamAngleX2 (K, L): the rotation angle around the X axis of the optical axis

CamAngleY2 (K, L): the rotation angle around the Y axis of the optical axis

CamAngleZ2 (K, L): the rotation angle around the Z axis of the optical axis In these values, k is an identifier of the imaging device 11, for example, a number assigned to the imaging device 11. Here, since the description is given using the example in which the three imaging devices 11-1 to 11-3 are arranged as an example, any one of 1 to 3 is set to k of the above-described values in a case where 1 is assigned to the imaging device 11-1, 2 is assigned to the imaging device 11-2, and 3 is assigned to the imaging device 11-3, respectively, as the identifiers.

Furthermore, in these values, L represents the identifier of the reference imaging device 11. Since the reference imaging device 11 has a smaller number, the reference imaging device 11 is the imaging device 11-1 for the imaging device 11-2, and is the imaging device 11-1 or the imaging device 11-2 for the imaging device 11-3. Therefore, 1 or 2 is set to L.

It is assumed that the position in the three-dimensional space of the reference imaging device is set to an origin (0, 0, 0) and the optical axis is set in the X axis direction. In other words, the following expressions are established using the above-described values.

CamPosX2(1,1)=CamPosY2(1,1)=CamPosZ2(1,1)=0

CamPosX2(2,2)=CamPosY2(2,2)=CamPosZ2(2,2)=0

CamAngleX2(1,1)=1 and CamAngleY2(1,1)=CamPosZ2(1,1)=0

CamAngleX2(2,2)=1 and CamAngleY2(2,2)=CamPosZ2(2,2)=0

In the description with reference to FIG. 17, the positions P21 and P31 indicate the position information of the imaging device 11-1 of when the imaging device 11-1 is set as the reference and thus become the values described here. Furthermore, the position P32 indicates the position information of the imaging device 11-2 of when the imaging device 11-2 is set as the reference and thus becomes the value described here.

Furthermore, for example, the position P12 indicates the position information of the imaging device 11-2 of when the imaging device 11-1 is set as the reference and thus the X coordinate of the position P12 becomes CamPosX2 (2, 1). Other values can be similarly expressed.

In a case where the reference imaging device 11 is not the imaging device 11-1, the position of the reference imaging devices 11 is the origin. For example, in a case where the reference imaging device 11 is the imaging device 11-2, the position of the imaging device 11-2 is the origin.

In a case where the reference imaging device 11 is an M-th imaging device 11, rotational transformation and parallel translation are performed so as to be matched with the position of the imaging device 11-M of when the reference imaging device 11 is the imaging device 11-1. For example, in a case of M=2, the reference imaging device 11 is the imaging device 11-2, and the rotational transformation and the parallel translation are performed to be matched with the position of the imaging device 11-2 of when the reference imaging device 11 is the imaging device 11-1. Variables after rotational transformation and parallel translation are expressed as follows.

CamPosX2' (K, L): the X coordinate of the position of the imaging device after transformation CamPosY2' (K, L): the Y coordinate of the position of the imaging device after transformation CamPosZ2' (K, L): the Z coordinate of the position of the imaging device after transformation CamAngleX2' (K, L): the rotation angle around the X axis of the optical axis after transformation CamAngleY2' (K, L): the rotation angle around the Y axis of the optical axis after transformation CamAngleZ2' (K, L): the rotation angle around the Z axis of the optical axis after transformation When there is no error in the position information of the imaging device 11 and the rotation angle of the optical axis calculated in the position detection unit 122 (smoothed by the position smoothing unit 123), the position information and the rotation angles of the optical axes of the three imaging devices 11-1 to 11-3 coincide. However, since there is a possibility of an error, the obtained values are averaged and the average value is taken as the position information. The average value is calculated by the following expression (9).

$$CamPosX2ave(K)=1/n\Sigma CamPos2X'(K,L)$$

$$CamPosY2ave(K)=1/n\Sigma CamPos2Y'(K,L)$$

$$CamPosZ2ave(K)=1/n\Sigma CamPos2Z'(K,L)$$

$$CamAngleX2ave(K)=1/n\Sigma CamAngle2X'(K,L)$$

$$CamAngleY2ave(K)=1/n\Sigma CamAngle2Y'(K,L)$$

$$CamAngleZ2ave(K)=1/n\Sigma CamAngle2Z'(K,L) \quad (9)$$

In the expression (9), n is the number of pieces of the position information and the rotation angles of the optical axes detected for each imaging device 11. n is a value smaller by one than the number (N) of imaging devices 11, that is, a value satisfying n=N−1. Here, the description is given using the case where the three imaging devices 11 are objects to be processed, and thus n is 2.

In a case of obtaining values regarding X, for example, and the position information and the rotation angle of the imaging device 11-1 in the calculation based on the expression (9), a specific expression is as follows.

$$CamPosX2ave(1)=\tfrac{1}{2}(CamPos2X'(1,2)+CamPos2X'(1,3))$$

Values other than X in the imaging device 11-1 and values in the imaging devices 11-2 and 11-3 are also calculated on the basis of the expression (9).

In this way, the position information and the rotation angle of the optical axis of the imaging device 11 can be easily obtained. Therefore, for example, this method can be applied when obtaining the positional relationship of the imaging device 11 with a small calculation amount. According to this method, since the positional relationship of another imaging device 11 is obtained with reference to the imaging device 11-1, there is a possibility that the positional relationship is not necessarily optimized as a whole.

In other words, in a case where an error in the relative position with respect to the reference imaging device 11-1 is large, the overall positional relationship is affected by the error and may include an error. Therefore, a method of optimizing the positional relationship as a whole will be described below.

An error E is defined by the following expression (10).

In the expression (10), the error in the position information is an error Epos, the identification information (number) of the imaging device is a number k, and the number of the reference imaging device 11 is a number L1 or L2. The expression (10) is an expression for calculating a total of deviations of the position of an imaging device 11-$k$ obtained from different reference imaging devices 11.

$$E\text{pos}=\Sigma\Sigma\Sigma|\text{CamPos}X2'(K,L1)-\text{CamPos}X2'(K,L2)|+$$
$$\Sigma\Sigma\Sigma|\text{CamPos}Y2'(K,L1)-\text{CamPos}Y2'(K,L2)|+$$
$$\Sigma\Sigma\Sigma|\text{CamPos}Z2'(K,L1)-\text{CamPos}Z2'(K,L2)|$$
where $L1 \ne L2$ \hfill (10)

Similarly, an error Eangle of the rotation angle of the optical axis is defined by the following expression (11). The expression (11) is an expression for calculating a total of deviations of the rotation angle of the imaging device 11-$k$ obtained from different reference imaging devices 11.

$$E\text{angle}=\Sigma\Sigma\Sigma|\text{CamAngle}X2'(K,L1)-\text{CamAngle}X2'(K,L2)|+\Sigma\Sigma\Sigma|\text{CamAngle}Y2'(K,L1)-\text{CamAngle}Y2'(K,L2)|+\Sigma\Sigma\Sigma|\text{CamAngle}Z2'(K,L1)-\text{CamAngle}Z2'(K,L2)|$$ where $L1 \ne L2$ \hfill (11)

The final error E is defined by the following expression (12). In the following expression (12), β is a preset parameter.

$$E=\beta \cdot E\text{pos}+(1-\beta)E\text{angle} \quad (12)$$

In the expressions (10) and (11), the error Epos and the error Eangle are calculated using absolute values of differences, but the error Epos and the error Eangle may be obtained by other calculation expressions such as squares of the differences. Alternatively, values obtained by other calculation expressions may be substituted into the expression (12).

The amount of parallel translation and the rotation amount of the optical axis of the imaging device are adjusted such that the error E calculated by the expression (12) becomes minimum. An example of how to make this adjustment will be described. In the above-described calculation, there are three parameters for each of the parallel translation and the rotation, and six parameters in total, and the six parameters exist for each reference imaging device 11.

In the case where there are the three imaging devices 11-1 to 11-3, as described above, the reference imaging device 11 is the imaging device 11-1 in the combination of the imaging device 11-1 and the imaging device 11-2, the reference imaging device 11 is the imaging device 11-1 in the combination of the imaging device 11-1 and the imaging device 11-3, and the reference imaging device 11 is the imaging device 11-2 in the combination of the imaging device 11-2 and the imaging device 11-3. Therefore, in such a case, the number of imaging devices 11 serving as the references is three, and thus the number of parameters is eighteen in total. In a case where one or a plurality of parameters out of the eighteen parameters is slightly changed and the error E becomes small, the parameters are updated. In a case where the error E becomes large, the parameters are maintained without update. Such processing is repeated to obtain a parameter with a minimum error E. Then, average values of the positions and the rotation angles of the optical axes of the imaging devices 11 of when the error E becomes minimum are calculated.

By obtaining the parameters with the minimum error E in this way, the positional relationship as a whole of the imaging device 11 can be specified with high accuracy.

In the third embodiment, the positional relationship can be calculated as long as fields of view overlap in two imaging devices 11 even if the fields of view of all the plurality of imaging devices 11 do not overlap, as in the first and second embodiments. The processing is performed excluding the combination of the imaging devices 11 having no overlapping fields of view, of the plurality of imaging devices 11, from the calculation.

Fourth Embodiment

In the first to third embodiments, the case of specifying the positional relationship by capturing a person has been described using the example in which the three imaging devices 11-1 to 11-3 are installed as the plurality of imaging devices 11.

A positional relationship between imaging devices 11 can be obtained by capturing a person by two imaging devices 11, analyzing images respectively captured by the two imaging devices 11, and detecting physical characteristic points of the person. In a case of capturing a person from the front, the physical characteristic points of the person are easily detected (the number of characteristic points to be detected is large) but in a case of capturing the person from a side surface, the physical characteristic points of the person are less easily detected (the number of characteristic points to be detected is small).

In a case of obtaining the positional relationship between the imaging devices 11 by combining the two imaging devices 11, as described above, there is a possibility that the positional relationship between the two imaging devices 11 is not calculated with high accuracy in a case where one of the two imaging devices 11 captures the person from a direction where the physical characteristic points of the person are easily detected and the other imaging device 11 captures the person from a direction where the physical characteristic points of the person are less easily detected.

Figure 18:
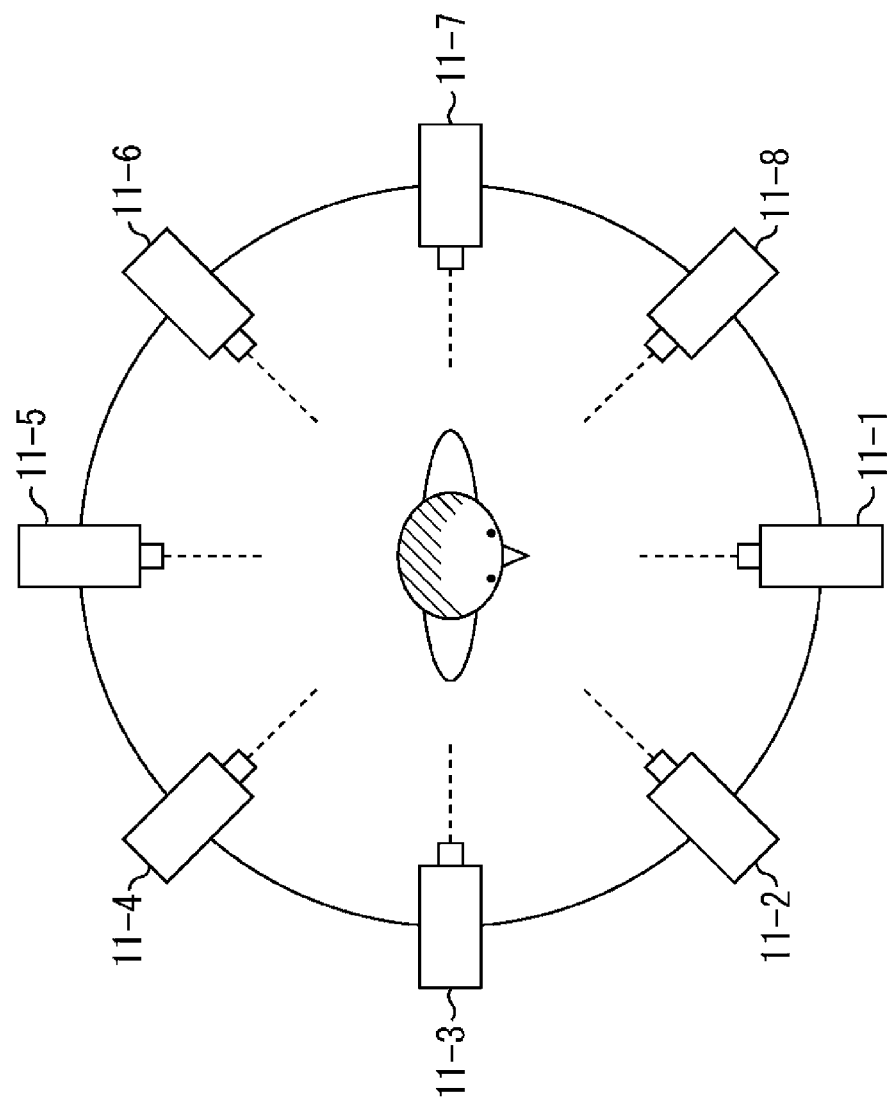
FIG. 18 is a diagram for describing an arrangement example of imaging devices.

For example, as illustrated in FIG. 18, consider a case where eight imaging devices 11-1 to 11-8 are arranged.

In the example illustrated in FIG. 18, the eight imaging devices 11-1 to 11-8 are arranged at equal intervals on a circumference to surround a person A. Furthermore, in the example illustrated in FIG. 18, the person A is facing the imaging device 11-1, and the description will be continued on the assumption that the imaging devices 11-1 to 11-8 capture the person A when the person A is facing the imaging device 11-1.

For example, consider a case of combining the imaging device 11-1 and the imaging device 11-3 and calculating the positional relationship between the imaging device 11-1 and the imaging device 11-3. In this case, since the imaging device 11-1 captures the person A from the front, the imaging device 11-1 can easily detect the physical characteristic points of the person and can extract many characteristic points. On the other hand, since the imaging device 11-3 captures the person A from a side surface, in this case, from a right side of the person A, only physical characteristic points that can be obtained from the right side of the person are detected, and the number of characteristic points to be detected is small.

In such a case, since the number of characteristic points (the number of corresponding points) used for calculating the positional relationship becomes small, reliability of position information as a calculation result is low. The overall positional relationship may be specified without using the combination of the imaging devices 11 estimated to have a calculation result with low reliability. Furthermore, when calculating an error E as in the third embodiment, processing such as not using the combination of the imaging devices 11 with low reliability or decreasing a contribution ratio by multiplying a weight coefficient may be performed.

The combination of the imaging devices 11 estimated to have a calculation result with low reliability is specifically a combination of imaging devices 11 having a positional relationship of 90 degrees. In a case where optical axes of two imaging devices 11 are shifted by 90 degrees, the above-described processing of excluding the combination or decreasing the contribution ratio of a value calculated from the combination is performed. Note that, by setting the weight coefficient of the combination of the imaging devices 11 with low reliability to 0, the combination of the imaging devices 11 with low reliability can be excluded from calculation. Therefore, the weight coefficient may be made 0 instead of the excluding processing.

By the way, conventionally, external parameters are calculated using a board on which a predetermined pattern is printed such as a calibration board. If the external parameters of the imaging device 11 are obtained using the calibration board in the arrangement state of the imaging devices 11 as illustrated in FIG. 18, the imaging device 11 arranged at a position where the imaging device 11 does not capture the calibration board does not calculate the external parameters.

For example, when the calibration board faces the imaging device 11-1, the imaging device 11-5 that is capturing the back of the calibration board does not capture the pattern printed on the calibration board and thus has a difficulty in calculating the external parameters. Furthermore, the imaging device 11-3 has a high possibility of capturing a side surface of the calibration board and a surface where no pattern is printed and has a difficulty in calculating the external parameters.

Moreover, in the case of using a calibration board, it is commonly known that the accuracy of calibration decreases if an angle made by the optical axis of the imaging device and the calibration board becomes small. For example, in the situation illustrated in FIG. 18, the accuracy of calibration of the imaging device 11-2 is lower than the accuracy of calibration of the imaging device 11-1, and the accuracy of calibration of the imaging device 11-3 is lower than the accuracy of calibration of the imaging device 11-2.

Even the imaging device 11 arranged at the position where the imaging device 11 captures the back of the calibration board in the case of the calibration board, for example, even the imaging device 11-5 can capture the back of a person in the case of a person, thereby performing calibration according to the present technology, as described above.

In other words, according to the present technology, even in a case where the positional relationship between two imaging devices 11 becomes 90 degrees or more, the two imaging devices 11 capture the front and back of the person and thus can detect the physical characteristic points of the person such as joints, and thereby performing calibration, as described above. In other words, according to the present technology, calibration can be performed regardless of the positional relationship between two imaging devices 11.

Figure 19:
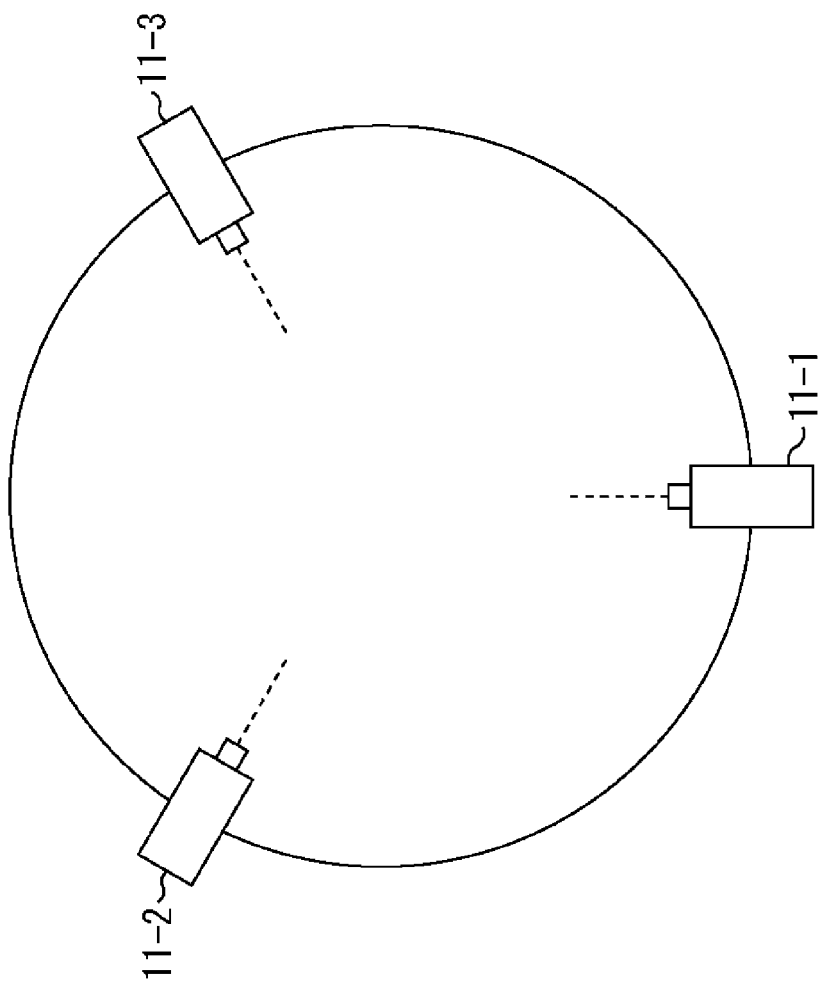
FIG. 19 is a diagram for describing an arrangement example of imaging devices.

Furthermore, according to the present technology, appropriate calibration can be performed even in a case where the imaging devices 11 are arranged in a sparse state, as illustrated in FIG. 19. In the arrangement of the imaging devices 11 illustrated in FIG. 19, the three imaging devices 11-1 to 11-3 are arranged at intervals of 120 degrees on a circumference. In a case of performing calibration using the calibration board in the case of such arrangement, for example, the imaging device 11-2 and the imaging device 11-3 are in a state of capturing the back of the calibration board in a case where the calibration board faces the imaging device 11-1 and thus calibration is not performed.

Furthermore, in a case where the calibration board is arranged having the same angle with respect to both the optical axis of the imaging device 11-1 and the optical axis of the imaging device 11-2, in other words, in a case where the calibration board is arranged with the back to the imaging device 11-3, the imaging device 11-1 and the imaging device 11-2 are in a state of capturing the calibration board from oblique directions and thus have a possibility of performing calibration in a state where the accuracy of the calibration is low.

According to the present technology, calibration can be performed by capturing a person even in a case where the imaging devices 11 are arranged in a sparse state, as illustrated in FIG. 19.

As described above, according to the present technology, calibration can be performed without depending on the arrangement of the imaging devices 11. Moreover, as described above, by performing the processing of excluding the combination of the imaging devices 11 in the positional relationship having the possibility of low reliability, calibration can be performed with higher accuracy.

Figure 20:
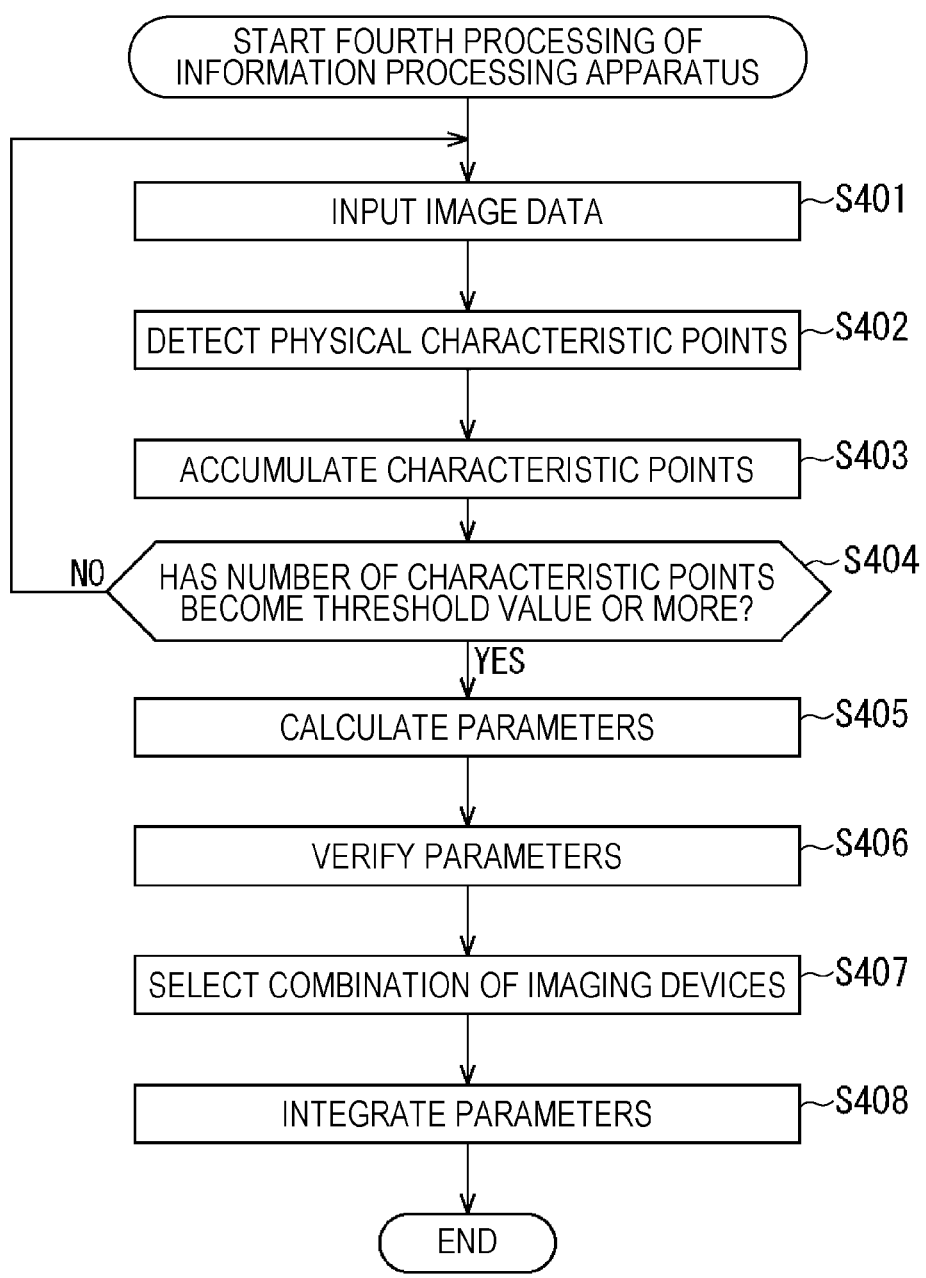
FIG. 20 is a flowchart for describing an operation of an information processing apparatus according to a fourth embodiment.
Figure 21:
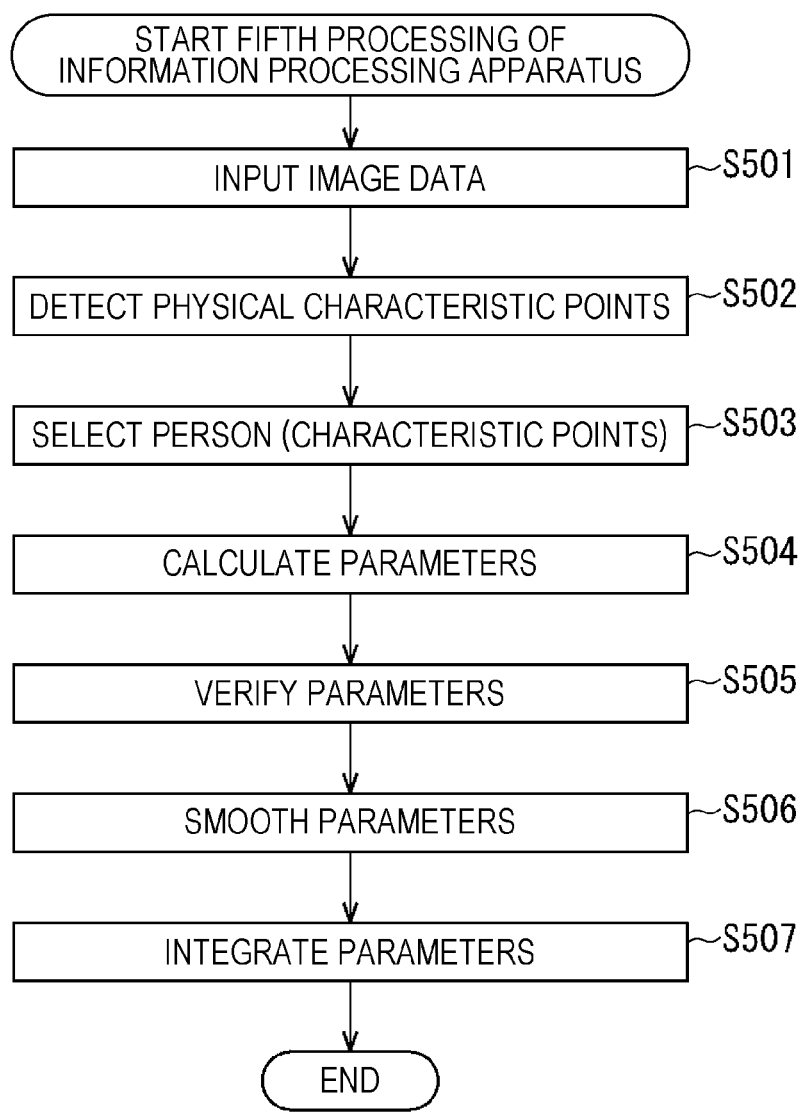
FIG. 21 is a flowchart for describing an operation of an information processing apparatus according to a fifth embodiment.

Here, an operation of an information processing apparatus 12e in a case of including the processing of excluding the combination of the imaging devices 11 in the positional relationship having the possibility of low reliability will be described with reference to the flowchart in FIG. 20.

The fourth embodiment can be combined with any one of the first to third embodiments. Here, the description will be continued using a case of applying the fourth embodiment to the information processing apparatus 12b according to the second embodiment as an example.

Since the information processing apparatus 12e according to the fourth embodiment can have a similar configuration to the configuration of the information processing apparatus 12b according to the second embodiment illustrated in FIG. 13, description of the configuration is omitted here.

Figure 14:
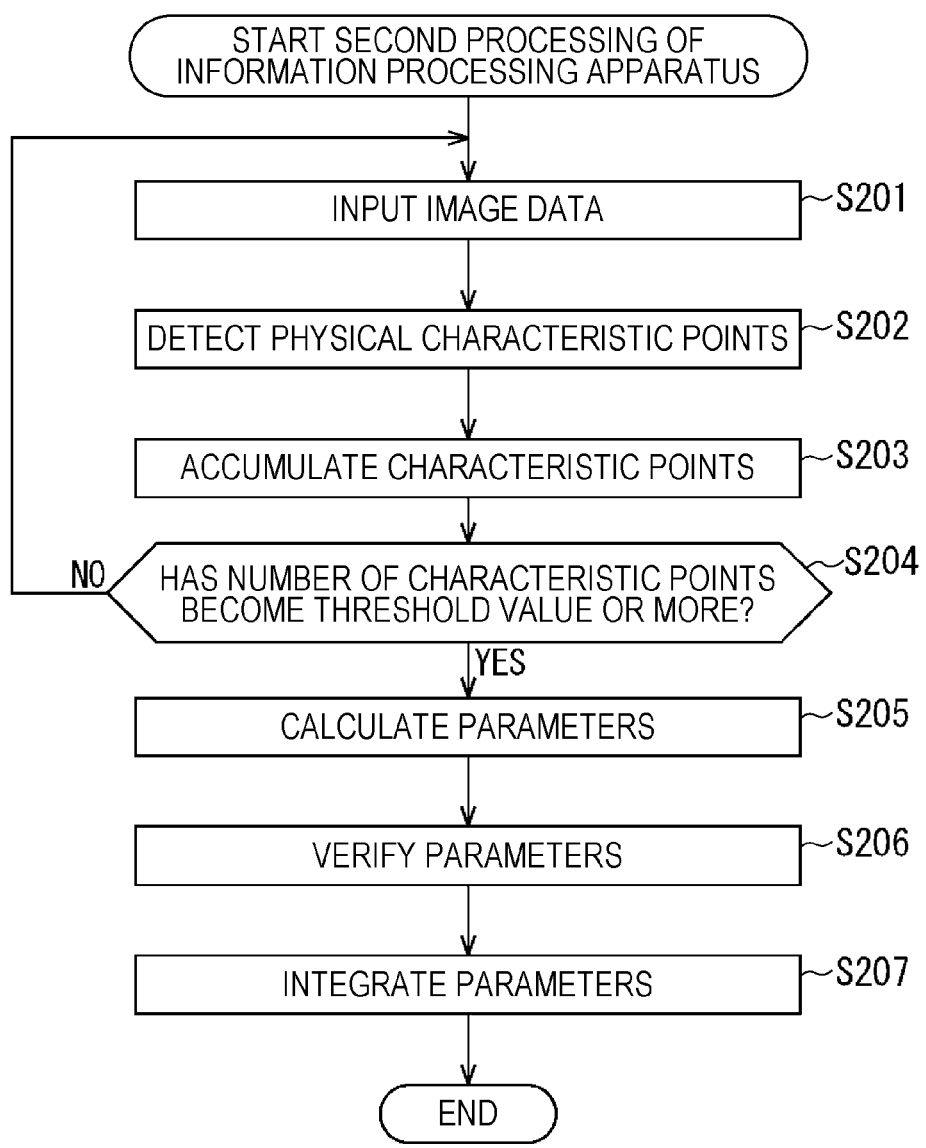
FIG. 14 is a flowchart for describing an operation of the information processing apparatus according to the second embodiment.

Processing in steps S401 to S406 and S408 is similar to the processing in steps S201 to S207 of the flowchart illustrated in FIG. 14. The information processing apparatus 12e according to the fourth embodiment is different from the information processing apparatus 12b according to the second embodiment in selecting a combination of the imaging devices 11 in step S407 and integrating parameters in step S408 on the basis of the selection.

In step S407, parameters to be used when a position integration unit 124 integrates parameters are selected. This selection is processing of selecting a combination of the imaging devices 11 of when parameters used for integration are calculated from among the combinations of the imaging devices 11 when parameters are calculated.

As described above, when the parameters are integrated in the position integration unit 124, the combination of the imaging devices 11 having the positional relationship of 90 degrees is detected in order to execute the processing of excluding the parameters calculated from the combination of the imaging devices 11 having the positional relationship of 90 degrees or the processing of decreasing the contribution. Hereinafter, the description will be continued using a case of executing the excluding processing as an example.

The positional relationship between the combined two imaging devices 11 has been calculated by a position detection unit 122 in the processing before the processing in step S407 is executed. In step S407, a combination of the imaging devices 11 having a positional relationship of other than 90 degrees is selected. In other words, the combination of the imaging devices 11 having the positional relationship of 90 degrees is excluded. In this manner, in step S407, the processing of excluding the parameters with low reliability is executed.

Note that, here, the description has been given using the case where the positional relationship between the imaging devices 11 is 90 degrees as an example. However, this numerical value may have a range. For example, a range from 85 to 95 degrees is set, and the combination of the imaging devices 11 having the positional relationship falling in this range may be excluded.

By executing the processing of excluding the parameters with low reliability in this manner, the processing of integrating the parameters is executed using the parameters with high reliability. Therefore, a result after the integration can be a result with high reliability.

Referring to FIG. 18 again, even if the combination of the imaging device 11-1 and the imaging device 11-3 is excluded by the processing in step S407, the positions of the imaging device 11-1 and the imaging device 11-3 can be specified by the combination of the imaging device 11-2 and the imaging device 11-1 or the combination of the imaging device 11-2 and the imaging device 11-3, for example.

Furthermore, here, the description has been given using the case of applying the fourth embodiment to the second embodiment as an example. In the second embodiment, the characteristic points are accumulated and after a predetermined number of the characteristic points are detected, the position information is detected.

Therefore, if the imaging device 11-3 does not detect the characteristic points at a predetermined time, the characteristic points are detected in the imaging device 11-3 at the point of time when the characteristic points become detectable by movement of a person, and furthermore, the characteristic points are accumulated. Therefore, the position information of the imaging device 11-3 being undetectable can be prevented.

Similar effects can be obtained in a case of applying the fourth embodiment to the first embodiment and in a case of applying the fourth embodiment to the third embodiment.

Fifth Embodiment

In the first to fourth embodiments, the description has been given using the case of capturing one person, detecting the physical characteristic points of the person, and specifying the positional relationship among the plurality of imaging devices 11 as an example. The present technology can be applied not only when one person is captured but also when a plurality of persons is captured. As a fifth embodiment, an operation of an information processing apparatus 12*f* when a plurality of persons is captured will be described.

The fifth embodiment can be applied in combination with any one of the first to fourth embodiments. Here, description will be continued using a case where the fifth embodiment is applied to the information processing apparatus 12*a* according to the first embodiment as an example.

Since the information processing apparatus 12*f* according to the fifth embodiment can have a similar configuration to the configuration of the information processing apparatus 12*a* according to the first embodiment illustrated in FIG. 6, description of the configuration is omitted here.

Figure 8:
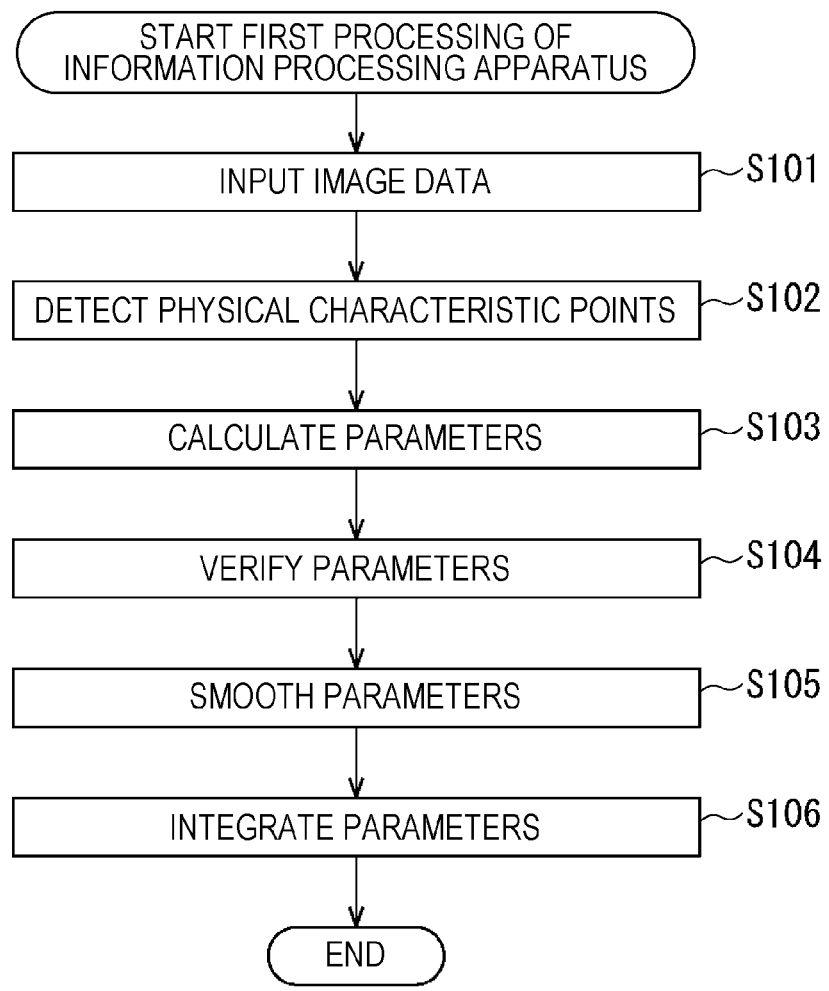
FIG. 8 is a flowchart for describing an operation of the information processing apparatus according to the first embodiment.

Processing in steps S501, S502, and S504 to S507 is basically similar processing to the processing in steps S101 to S107 of the flowchart illustrated in FIG. 8. The information processing apparatus 12*f* according to the fifth embodiment is different from the processing of the information processing apparatus 12*a* according to the first embodiment in selecting characteristic points of a person to be used for calculating parameters in step S503 and calculating parameters in step S504 on the basis of the selection.

In step S503, characteristic points of a person used for calculating parameters are selected. In a case where a person A and a person B are imaged by an imaging device 11, the parameters can be calculated using the characteristic points of the person A, and the parameters can also be calculated using the characteristic points of the person B. Therefore, in step S503, the person used for calculating parameters, in this case, the person A or the person B is selected, and in step S504, the parameters are calculated using physical characteristic points of the selected person.

In a case of setting characteristic points by hand of a person (user) when detecting the characteristic points, a plurality of persons is identified by the user, and a group of the characteristic points is set for each person, in which detection of a characteristic point and a person from which the characteristic point has been detected are associated with each other. In a case of detecting the characteristic points on the basis of a predetermined algorithm when detecting the characteristic points, faces and clothes are recognized, persons in an image are identified, the characteristic points are detected from the individual persons after recognition, and the group of the characteristic points is set for each person. Furthermore, in a case of using the above-described document 1 as the predetermined algorithm, the characteristic points are detected for each person, in other words, the physical characteristic points such as a left shoulder and a right shoulder are detected, for example, and connection of the detected characteristic points, for example, connection of the left shoulder, a left elbow, and a left hand can be detected. Using the above, the group of the characteristic points can be set for each person.

In step S503, for example, the person A is selected, and the physical characteristic points of the person A are set as the characteristic points (corresponding points) used for calculating parameters. In step S504, the parameters are calculated using the characteristic points (characteristic points grouped into the person A) detected from the selected person, in this case, the person A.

Figure 22:
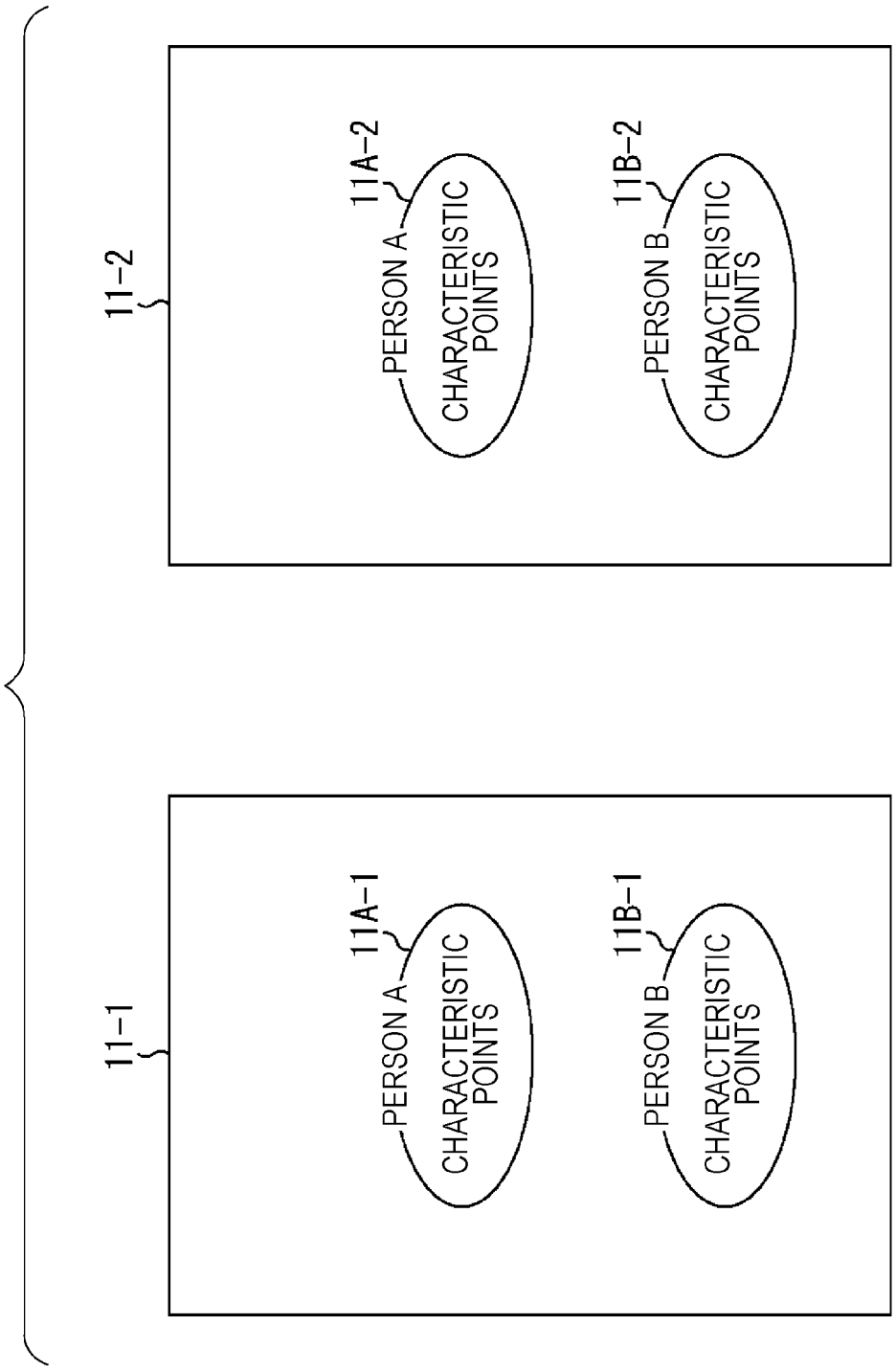
FIG. 22 is a diagram for describing selection of characteristic points.

Two imaging devices 11 are selected from a plurality of imaging devices 11, and the calculation of parameters is performed using the characteristic points detected from images respectively imaged by the selected two imaging devices 11, as in the above-described embodiments. Here, a situation when the characteristic points are selected will be described with reference to FIG. 22.

It is assumed that the characteristic points of the person A and the person B are respectively detected from an image imaged by an imaging device 11-1, and the groups of the characteristic points are generated. Here, the group of the characteristic points of the person A is set as a characteristic point group 11A-1, and the group of the characteristic points of the person B is set as a characteristic point group 11B-1. Similarly, in the imaging device 11-2, the characteristic points of the person A and the person B are respectively detected, and a characteristic point group 11A-2 that is the group of the characteristic points of the person A and a characteristic point group 11B-2 that is the group of the characteristic points of the person B are generated.

In step S503, in a case of determining that the parameters are calculated using the characteristic points of the person A, a position detection unit 122-1 (FIG. 6) calculates the parameters using the characteristic point group 11A-1 and the characteristic point group 11A-2. At this time, the correct characteristic point group 11A-1 and characteristic point group 11A-2 are not necessarily read out.

As described above, when detecting the characteristic points, there are cases of identifying persons in an image by the user and detecting the characteristic points (detection method 1), detecting the characteristic points after recognizing the faces and clothes (detection method 2), and detecting the characteristic points by the predetermined algorithm (detection method 3).

Since the detection method 1 and the detection method 2 individually identify a plurality of persons in an image, the person identified as the person A in the image from the imaging device 11-1 is also identified as the person A in the image from the imaging device 11-2. Therefore, when the characteristic points detected from the person identified as the person A in the imaging device 11-1 are classified into the characteristic point group 11A-1, and the characteristic points detected from the person identified as the person A in the imaging device 11-2 are classified into the characteristic point group 11A-2, the possibility that the characteristic point group 11A-1 and the characteristic point group 11A-2 are the groups of the characteristic points detected from the same person is high.

The detection method 3 detects the characteristic points for each plurality of persons in the image and groups the characteristic points for each person. There is no guarantee that the person identified as the person A in the image from the imaging device 11-1 and the person identified as the person A in the image from the imaging device 11-2 are the same person. For example, there is no guarantee that the characteristic point group 11A-1 and the characteristic point group 11A-2 are the groups of the characteristic points detected from the same person A.

In the case of applying the detection method 1 or the detection method 2, the parameters can be calculated using the characteristic points detected from the same person. Therefore, the parameters can be obtained by the same processing as the first embodiment and the subsequent processing can also be similarly performed.

In other words, in a case where a plurality of persons is imaged, one of the plurality of persons is selected, and the parameters can be obtained as in the first embodiment using the characteristic points detected as the physical characteristic points from the selected person.

In this case, when performing verification in step S505, the verification may be performed using the characteristic points other than eight points used in an 8-point algorithm when calculating the parameters out of the characteristic points in the characteristic point group 11A-1 (11A-2) of the selected person (person A). Alternatively, the verification may be performed using the characteristic points in the characteristic point group 11B-1 (11B-2) of the person (person B) other than the selected person A.

In a case of applying the detection method 3, there is no guarantee that the characteristic points used for calculating the parameters are the characteristic points detected from the same person. Therefore, whether or not the characteristic points are detected from the same person needs to be confirmed.

Note that, even in the verification method 2, the accuracy of recognition of the faces and clothes becomes low and there is a possibility that the recognition result of persons becomes wrong, in a case where the faces are not imaged or a case where there is a plurality of persons in similar clothes, for example. In such a case, there is no guarantee that the characteristic points used for calculating the parameters are the characteristic points detected from the same person even in the detection method 2.

Therefore, in the case of the detection method 2 or the detection method 3, the verification is performed by the following processing in verifying the calculated parameters in step S505. The position detection unit 122 (FIG. 6) selects the characteristic points of one person from each imaging device 11 and calculates the parameters. For example, the position detection unit 122-1 (FIG. 6) selects the characteristic point group 11A-1 from the imaging device 11-1 side and selects the characteristic point group 11A-2 from the imaging device 11-2 side. The position detection unit 122-1 selects eight points from the characteristic points in the characteristic point group 11A-1, and selects characteristic points corresponding to the selected eight points from the characteristic point group 11A-2. The position detection unit 122-1 calculates the parameters using the pair of the selected eight characteristic points (corresponding points).

When verifying the calculated parameters, the characteristic points of a person other than the person used for calculating the parameters are used. For example, in a case where the characteristic points of the person A are used for calculating the parameters, the parameters are calculated using a person other than the person A, for example, the person B.

For example, in a case where the parameters are calculated using the characteristic point group 11A-1 and the characteristic point group 11A-2, the verification is performed using the characteristic point group 11B-1 and the characteristic point group 11B-2. This verification can be performed in the same way as in the first embodiment, and the verification in the first embodiment has already been described with reference to FIG. 12 and the like. Therefore, the description of the verification is omitted here.

Regarding the characteristic points used for calculating the parameters, the verification may be performed using characteristic points other than the eight points used for calculating the parameters. For example, when performing the verification, characteristic points other than the eight points used for calculating the parameters are substituted into the expression (1), and whether or not an error is a predetermined threshold value or less is determined. In a case where the pairs of the characteristic points (corresponding points) used for calculating the parameters are the characteristic points detected from different persons, there is a high possibility that the error becomes large.

Therefore, the characteristic points other than the eight points used for calculating the parameters are substituted into the expression (1), whether or not the error is the predetermined threshold value or less is determined, and whether or not the characteristic points used for the parameters are the characteristic points detected from the same person may be determined In a case where the error is the threshold value or more, the parameters are discarded, a combination of other characteristic point groups is selected, parameters are newly calculated, and verification for the newly calculated parameters may be performed.

In addition, the verification of the parameters estimated to be parameters calculated using the characteristic points detected from the same person may be further performed using the characteristic points of a person not used for calculating the parameters. Finally, parameters with the smallest error are obtained.

As described above, even in a case where a plurality of person is captured, the present technology can be applied.

Sixth Embodiment

According to the first to fifth embodiments, the relative positional relationship among the plurality of imaging devices 11 can be obtained. This relative positional relationship is a positional relationship specified in the set coordinate system and does not necessarily coincide with the coordinate system in the real space in which the imaging device 11 is installed. For example, as illustrated in FIG. 23, in a case where the coordinate system of the real space is an XYZ coordinate system and the set coordinate system is an xyz coordinate system, there may be a deviation between the XYZ coordinate system in the real space and the set xyz coordinate system.

Figure 23:
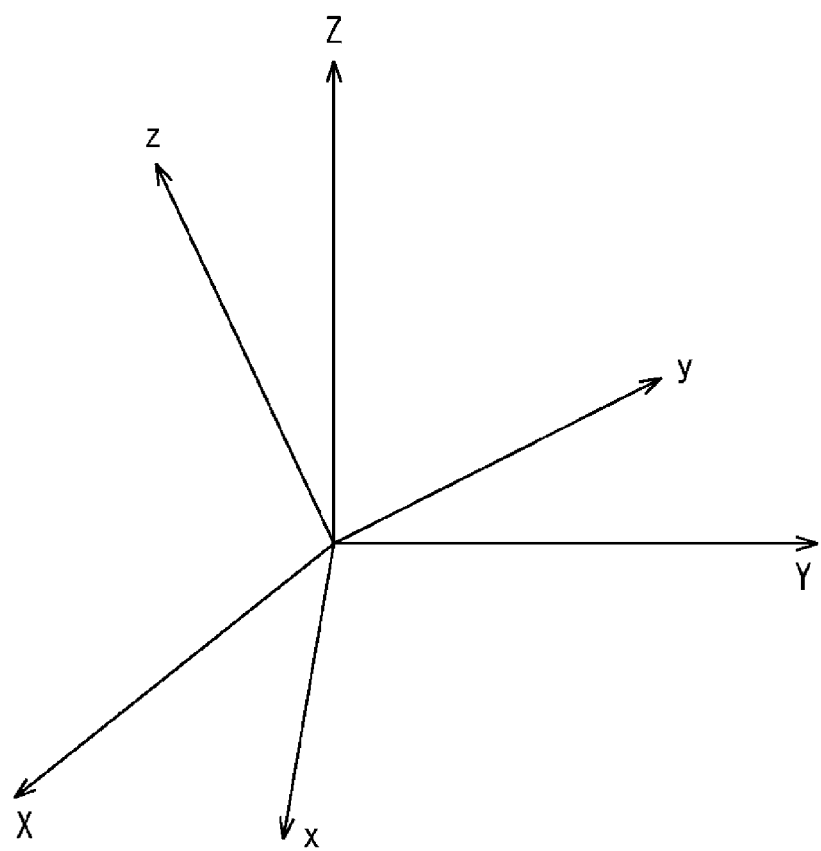
FIG. 23 is a diagram for describing a set coordinate system and a coordinate system in a real space.

In the example illustrated in FIG. 23, there is an xy plane of the xyz coordinate system set at a position inclined with respect to an XY plane of the XYZ coordinate system in the real space. In such a case, processing of causing the set xyz coordinate system to coincide with the XYZ coordinate system in the real space is executed. A case including such processing will be described as a sixth embodiment.

The sixth embodiment can be applied in combination with any one of the first to fifth embodiments. Here, the description will be continued using a case of applying the sixth embodiment to the information processing apparatus 12b according to the second embodiment as an example.

Figure 24:
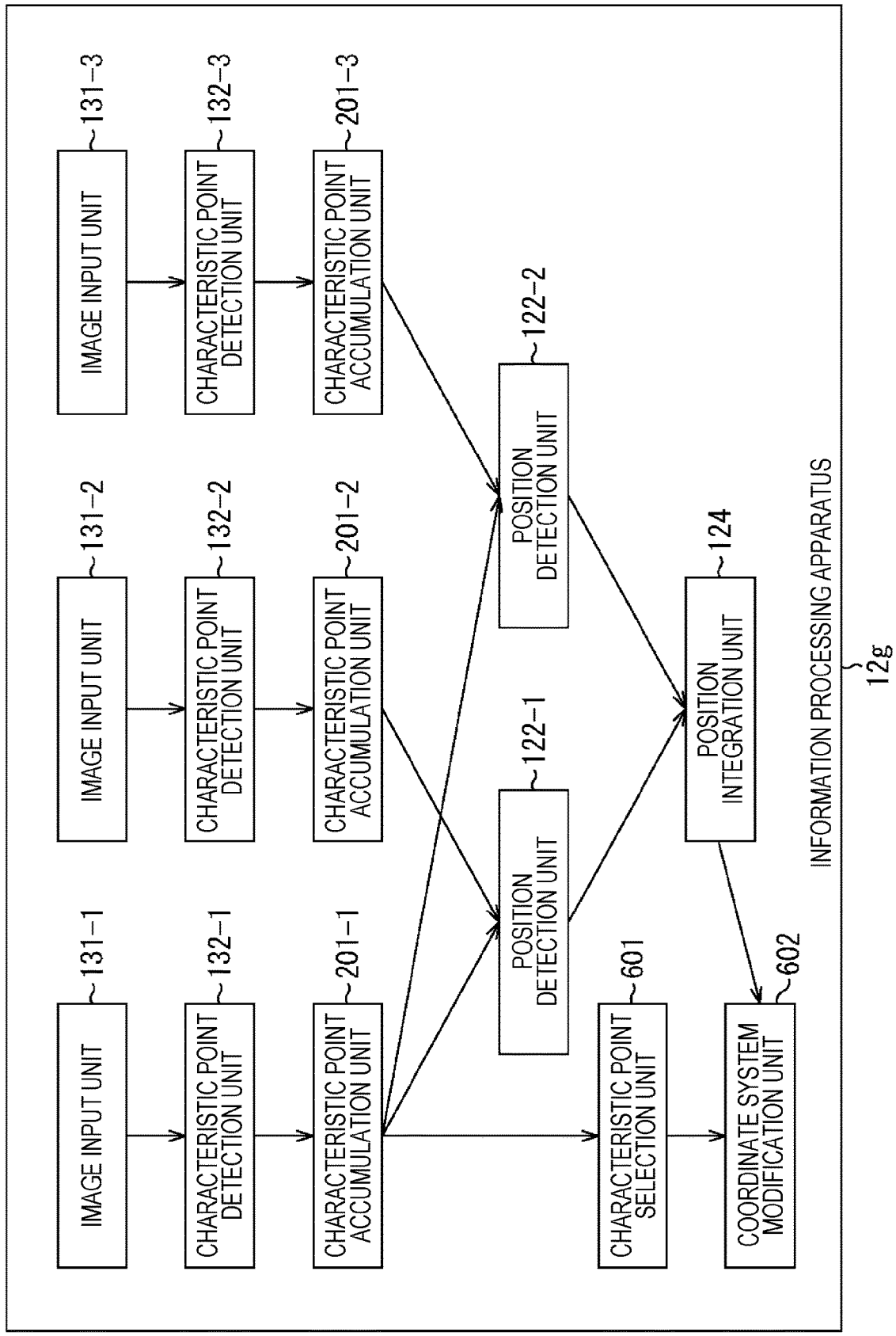
FIG. 24 is a diagram illustrating a configuration of an information processing apparatus according to a sixth embodiment.

FIG. 24 is a diagram illustrating a configuration example of an information processing apparatus 12g according to the sixth embodiment. The configuration of the information processing apparatus 12g according to the six embodiment is different from the configuration of the information processing apparatus 12b according to the second embodiment illustrated in FIG. 13 in that a characteristic point selection unit 601 and a coordinate system modification unit 602 are added, and other parts are similar.

The characteristic point selection unit 601 selects characteristic points detected from a predetermined position of a person from any one or a plurality of characteristic point accumulation units 201-1 to 201-3, and supplies the characteristic points to the coordinate system modification unit 602. The coordinate system modification unit 602 sets the XY plane in the real space as a floor surface and estimates where in the set xyz coordinate system the XY plane is located.

The coordinate system modification unit 602 arranges the acquired characteristic points in the xyz coordinate system by reference to an integration result from a position integration unit 124. The coordinate system modification unit 602 estimates the XY plane from a distribution state, and modifies the coordinate system such that the set xyz coordinate system coincides with the XYZ coordinate system in the real space, using the estimation result.

The processing of the characteristic point selection unit 601 and the coordinate system modification unit 602 will be described with reference to FIGS. 25A to 25B. FIGS. 25A to 25B illustrate an x axis and a z axis in the xyz coordinate system, and the description will be continued using the distribution of the characteristic points in an xz plane as an example.

Referring to FIG. 25A, consider a case in which the characteristic points are distributed in a portion (described as distribution 621) illustrated in an elliptical shape on the xz plane in FIG. 25A. In the case where the floor surface is estimated, characteristic points with less change in distance from the floor surface are favorably used as the characteristic points from among physical characteristic points of a subject. For example, characteristic points detected from a portion mainly related to foot such as an ankle, an instep, or a toe of the foot are used.

Here, the description will be continued on the assumption that the characteristic points detected from a portion such as an ankle, an instep, or a toe of a foot are used, the portion being detected from portions exhibiting physical characteristics of a person and having less change in distance from the floor surface even in a state where the person as the subject is standing or sitting at a position close to the floor surface.

Note that, in a case where the state of the person standing is maintained without sitting, the characteristic points detected from a portion such as a head top, an eye, or a nose may be used. Furthermore, characteristic points detected from a portion such as a waist or a hand may be used.

In a case where the characteristic points detected from a portion such as an ankle or an instep of a foot (hereinafter, an ankle will be described as an example) are distributed in an oblique direction as illustrated in FIG. 25A, it can be determined that the set coordinate system deviates from the coordinate system in the real space.

Since the position of the ankle when the person is walking moves up and down with respect to the floor surface, the distribution of the characteristic points of the ankle becomes distribution having a certain width as illustrated in FIG. 25A. In a case where the characteristic points of the ankle are distributed as illustrated in FIG. 25A, when estimating a plane (the straight line in FIG. 25B) on which the characteristic points of the ankle are distributed from the distribution 621, as illustrated in FIG. 25B, the estimated plane (straight line 622) becomes a straight line inclined obliquely upward and rightward with respect to an x axis in FIG. 25B.

When the x axis is the floor surface, the straight line 622 obtained from the distribution 621 of the characteristic points of the ankle is supposed to be parallel to the floor surface in a case where the floor surface is a reference. However, as illustrated in FIG. 25B, in a case where the straight line 622 is inclined with respect to the x axis, the xyz coordinate system set at that time can be determined to be deviated from the XYZ coordinate system in the real space.

Therefore, as illustrated in FIG. 25C, the xyz coordinate system is modified such that the straight line 622 becomes parallel to the x axis. The modified coordinate system is illustrated as an x'y'z' coordinate system in FIG. 25C.

In the description with reference to FIGS. 25A to 25C, the xz plane has been described as an example, so presumption of the straight line 622 has been described. However, in reality, a plane in the three-dimensional xyz coordinate system is presumed. The plane is estimated from distribution of the characteristic points of the ankle in the three-dimensional coordinate system, the characteristic points being selected from the characteristic points accumulated in the characteristic point accumulation unit 201.

The plane can be generally expressed by $z=ax+by+c$. Furthermore, one characteristic point of the ankle can be expressed by $(x, y, z)$, and a plurality of characteristic points is selected from the characteristic point accumulation unit 201, so that a point group used for estimating the plane is obtained. Then, the coefficients a, b, and c of the expression are obtained by a least squares method using the point group of the characteristic points or the like, so that the plane can be estimated.

Figure 26:
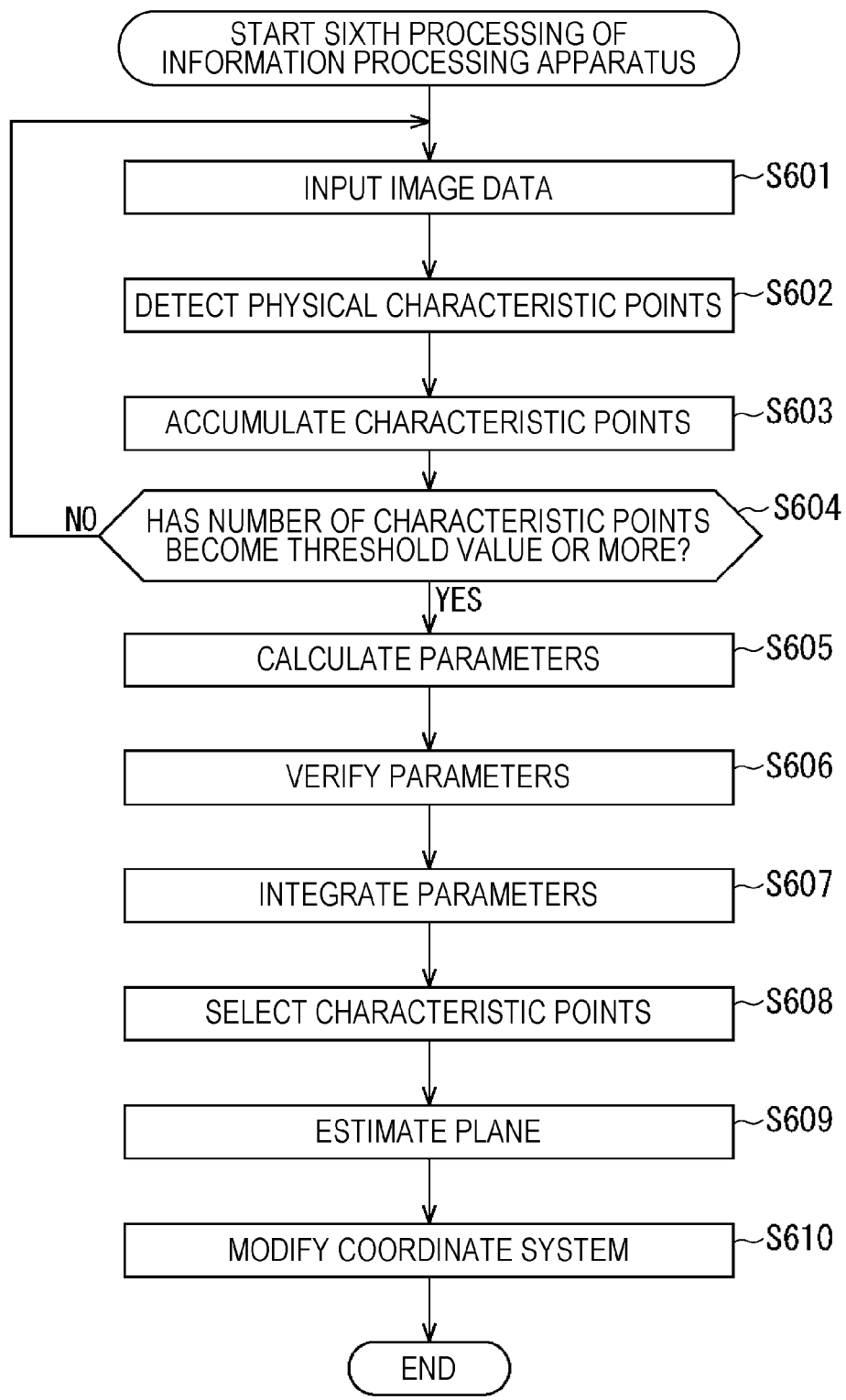
FIG. 26 is a flowchart for describing an operation of the information processing apparatus according to the sixth embodiment.

An operation of the information processing apparatus 12g illustrated in FIG. 24 will be described with reference to the flowchart in FIG. 26.

Processing in steps S601 to S607 is similar to the processing in steps S201 to S207 of the flowchart illustrated in FIG. 14. In other words, the physical characteristic points of a person are detected from images imaged by the imaging devices 11, and a positional relationship between the imaging devices 11 is calculated. In step S608, the characteristic point selection unit 601 selects the characteristic points detected from a predetermined position such as an ankle or an instep of a foot from the characteristic points accumulated in the characteristic point accumulation unit 201.

When the characteristic points are selected in step S608, the processing proceeds to step S609. In step S609, the plane is estimated. For the estimation of the plane, the characteristic points selected as described above are used, and the plane in the xyz coordinate system set at that time is estimated by a predetermined method such as the least squares method.

In step S610, the coordinate system modification unit 602 modifies the coordinate system by rotationally transforming or translating the entire xyz coordinate system such that the obtained plane overlaps with or becomes parallel to the floor surface in the real space, in the above description, the plane described as the XY plane.

The plane estimated in step S608 is a plane located above the floor surface. When a person moves around the floor, the ankle, the instep of the foot, the toes of the foot, and the like are separated upward from the floor. Therefore, the estimated plane becomes a plane at a position separated from the floor surface. To correct such a deviation from a true value, firstly, characteristic points located above the estimated plane are excluded.

Removal is performed in order from characteristic points located far from the estimated plane until the number of characteristic points reaches a preset ratio. For example, removal of the characteristic points is repeated until the number of characteristic points becomes half the number of the characteristic points used for estimating the plane. At the point of time when the number of the whole characteristic points reaches the present ratio, the plane is estimated using the remaining characteristic points again.

By performing such processing, the plane can be estimated using the characteristic points detected from the ankle and the like of when the foot is on the floor surface or when the foot is located at a position close to the floor surface, except the characteristic points detected from the ankle and the like of when the foot is separated from the floor surface when walking. Therefore, the plane can be estimated at a position closer to the floor surface in the real space and can approach the true value.

Note that the series of processing such as estimation of the plane, exclusion of the characteristic points located above the estimated plane, and estimation of the plane again may be repeatedly performed.

In this way, the plane can be estimated at a position close to the floor surface, but the estimated plane does not coincide with the floor surface. For example, in a case where the plane is estimated using only the characteristic points detected from the ankle, the floor surface and the ankle are separated by a predetermined distance even when the foot is on the floor surface. The estimated plane can be made to coincide with the floor surface by lowering the estimated plane by this predetermined distance.

Therefore, correction can be made by measuring the predetermined distance between the floor surface and the ankle, determining a correction amount using the measurement result, and lowering the estimated plane by the correction amount. This correction amount may be set in advance.

The predetermined distance between the floor surface and the ankle varies depending on the person but it is considered that there is no great difference in the distance and a large error does not occur even if the correction amount is set in advance and the correction is performed using the set correction amount. What type of correction amount is used may be appropriately set depending on a situation such as whether high accuracy is required or is not required.

Furthermore, the correction amount may be corrected according to the physical characteristic selected as the characteristic point. For example, the ankle is above the instep of the foot, and the instep of the foot is above the toes of the foot. In other words, the instep of the foot is closer to the floor surface than the ankle, and the toes of the foot are closer to the floor surface than the instep of the foot.

The correction amount may be made small in a case of using the characteristic point detected from a portion close to the floor surface and the correction amount can be made large in a case of using the characteristic point detected from a portion far from the floor surface, in consideration of such physical characteristics of a person. Specifically, the correction amounts may be set to satisfy the correction amount of the ankle>the correction amount of the instep of the foot>the correction amount of the toes of the foot.

Seventh Embodiment

According to the first to sixth embodiments, the relative positional relationship among the plurality of imaging devices 11 can be obtained. In the first to sixth embodiments, the relative positional relationship is obtained but a specific distance between two imaging devices 11 is not calculated.

Figure 27:
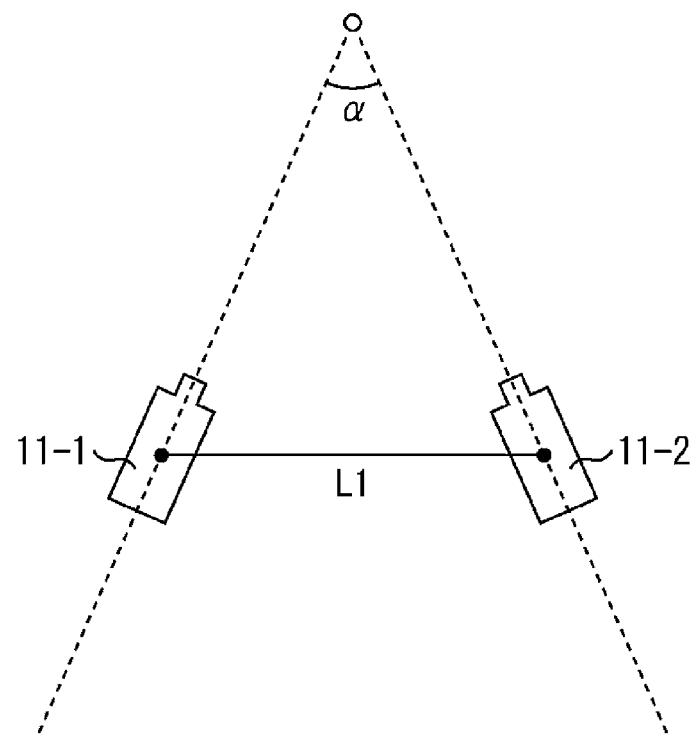
FIG. 27 is a diagram for describing a distance between imaging devices.

A relative positional relationship between imaging devices 11 will be described with reference to FIG. 27. A positional relationship that an optical axis of an imaging device 11-1 intersects with an optical axis of an imaging device 11-2 with an angle α is obtained by applying any of the first to sixth embodiments.

Furthermore, when the imaging device 11-1 is set as a reference, position information (coordinates in an xyz coordinate system in the above description) of the imaging device 11-2 is obtained. Therefore, a relative distance L1 between the imaging device 11-1 and the imaging device 11-2 can be obtained.

However, how long the distance L1 is in a real space is not obtained in the above-described embodiments. For example, a specific numerical value such as whether the distance L1 is 1m or 2m is not calculated. Therefore, as a seventh embodiment, a case of calculating a specific numerical value (a distance in a real space) will be described.

How to calculate the distance in the real space will be described with reference to FIGS. 28A and 28B. A situation in which the imaging device 11-1 and the imaging device 11-2 are imaging an object 701 and a state in which the object 701 faces the imaging device 11-1, as illustrated in FIG. 28A, will be described as an example. Further, a case in which relative positions of the imaging device 11-1 and the imaging device 11-2 are detected as described above, and the relationship between the relative positions is a positional relationship illustrated in FIG. 28A will be described as an example. In this case, as illustrated in FIG. 28A, a triangle made by a side L1, a side L2, and a side L3 is formed by the imaging device 11-1, the imaging device 11-2, and the object 701. Three angles of the triangle are obtained when the relative positions of the imaging device 11-1 and the imaging device 11-2 are detected, but lengths of the sides L1, L2, and L3 are in an unknown state.

If the length of any one of the three sides constituting the triangle can be obtained, the lengths of the other two sides can also be obtained. As a result, the distance between the imaging device 11-1 and the imaging device 11-2 in the real space can also be calculated.

Figure 28B:
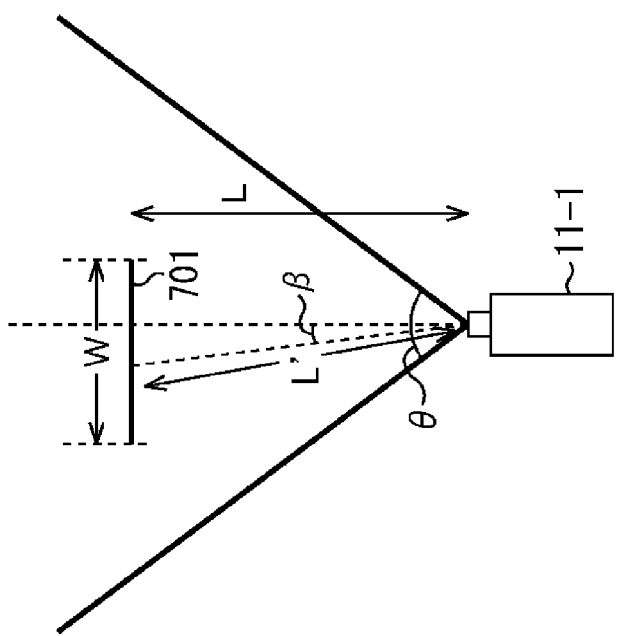
FIGS. 28A and 28B are diagrams for describing calculation of a distance.
Figure 28A:
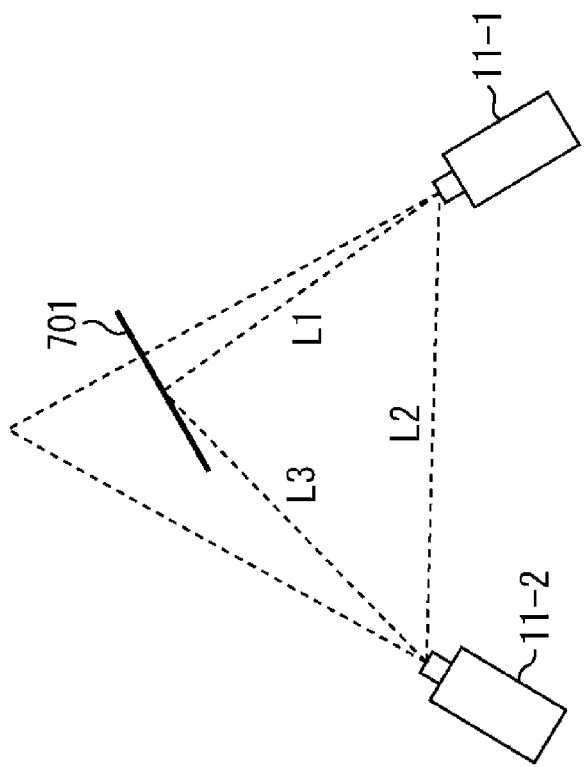

Here, as illustrated in FIG. 28B, only the imaging device 11-1 is considered. A width of the object 701 in the real space is W [m] and an angle of view of the imaging device 11-1 is θ. Furthermore, the width of the object 701 in the image imaged by the imaging device 11-1 is w [pixel], and a breadth of the entire image is p [pixel]. In the case of the above setting, a width P [m] of the field of view of the imaging device 11-1 at the distance where the object 701 is located is expressed by the following expression (13).

$$P=pW/w \qquad (13)$$

Using the width P [m] of the field of view of the imaging device 11-1 and the angle of view θ of the imaging device 11-1, a distance L [m] on the optical axis from the imaging device 11-1 to the object 701 is expressed by the following expression (14).

$$L=P/(2\tan(\theta/2)) \qquad (14)$$

Furthermore, a distance L' [m] between a center of the object 701 and the imaging device 11-1 is expressed by the following expression (15) using an angle β made by the object 701 and the optical axis of the imaging device 11-1.

$$L'=L/\cos\beta \qquad (15)$$

The distance L' is the distance of the side L1 in the real space (FIG. 28A). From this distance L', distances of the side L2 and the side L3 in the real space can be obtained. For example, in the case where the length of the side L1 when the relative position is obtained is L1, the length of the side L2 is L2, and the distance of the side L2 in the real space is L2', the relationship:

$$L1:L'=L2:L2'$$

is established, and thus the distance L2' can be obtained from this relational expression. In other words, the distance between the imaging device 11-1 and the imaging device 11-2 in the real space can be obtained.

FIG. 29 illustrates a configuration of an information processing apparatus 12h in the case of obtaining such a distance in the real space. FIG. 29 is a diagram illustrating a configuration example of the information processing apparatus 12h according to the seventh embodiment. The seventh embodiment can be applied in combination with any one of the first to sixth embodiments. Here, the description will be continued using a case of applying the seventh embodiment to the information processing apparatus 12b according to the second embodiment as an example.

The configuration of the information processing apparatus 12h according to the seventh embodiment is different from the configuration of the information processing apparatus 12b according to the second embodiment illustrated in FIG. 13 in that a characteristic point selection unit 711 and a distance calculation unit 712 are added, and other parts are similar.

The characteristic point selection unit 711 selects characteristic points detected from a predetermined position of a person from any one or a plurality of characteristic point accumulation units 201-1 to 201-3, and supplies the characteristic points to the distance calculation unit 712. The distance calculation unit 712 calculates a distance in the real space by the method described with reference to FIGS. 28A and 28B.

In the description with reference to FIGS. 28A and 28B, the width W of the object 701 is known, and the distance between the imaging devices 11 is calculated using the known width W. This object 701 is a person in the present embodiment. Therefore, the size of a person in the real space, the person being in the image for detecting the characteristic points used for calculating the parameters, needs to be acquired.

For example, information regarding lengths (distances) obtained from a person, such as the height of the person, the length from a fingertip of the left hand to a fingertip of the right hand when the hands are spread to the left and right, is acquired in the distance calculation unit 712 at the point of time before calculating the distance. For example, in the case of the height of a person, processing of measuring the height of a person in advance and inputting the height to the information processing apparatus 12h is performed. In other words, the information regarding W [m] in the above description has been input to the information processing apparatus 12h in advance.

In a case where the distance calculation unit 712 calculates the distance using the height of a person, the width w [pixel] of the object 701 in the image imaged by the imaging device 11 is calculated using a characteristic point detected from the head top of the person and a characteristic point detected from the foot of the person when the person stands upright.

Furthermore, in a case of calculating the distance using the length of when a person spreads the hands to the left and right, the width w [pixel] of the object 701 in the image imaged by the imaging device 11 is calculated using a characteristic point detected from the left hand of the person and a characteristic point detected from the right hand when the person spreads the hands to the left and right. The physical characteristic points necessary for specifying the size of a person are used in this manner to calculate the width w [pixel] of the object 701 in the image imaged by the imaging device 11.

Since joints of a person are detected as the characteristic points and the posture of the person can be estimated considering the relationship among the characteristic points, as described in the first embodiment, determination as to whether or not a person stands upright or whether or not a person spreads the hands to the left and right can be made using the estimation result.

The characteristic points required for calculating such a width w [pixel] are read from the characteristic points accumulated in the characteristic point accumulation unit 201 by the characteristic point selection unit 711. Note that a method specified by the user may be applied to the selection of the characteristic points by the characteristic point selection unit 711. For example, a desired characteristic point may be set by the user by specifying the head top and the foot or specifying the left hand and the right hand while viewing the imaged image.

An operation of the information processing apparatus 12h illustrated in FIG. 29 will be described with reference to the flowchart in FIG. 30.

Processing in steps S701 to S707 is similar to the processing in steps S201 to S207 of the flowchart illustrated in FIG. 14. In other words, the physical characteristic points of a person are detected from images imaged by the imaging devices 11, and a positional relationship between the imaging devices 11 is calculated. In step S708, the characteristic point selection unit 711 reads desired characteristic points from the characteristic points accumulated in the characteristic point accumulation unit 201. For example, in a case where the height of a person is set to be used when calculating the distance, the characteristic points respectively detected from the head top and the foot are selected. Further, for example, in a case where the length from a fingertip to a fingertip of when the hands are spread to the left and right is set to be used when calculating the distance, the characteristic points respectively detected from the fingertip of the left hand and the fingertip from the right hand are selected. Further, in the selection at this time, the characteristic points detected when the person is in a predetermined posture, for example, in a posture of standing upright or spreading the hands, are selected.

In step S709, the distance calculation unit 712 calculates the distance between the imaging devices 11 in the real space on the basis of the above-described method using the characteristic points selected by the characteristic point selection unit 711.

In this manner, the relative positional relationship between the imaging devices 11 and the distance between the imaging devices 11 in the real space can be obtained. The above description has been made on the assumption that the size of the object 701 is known when the distance between the imaging devices 11 is calculated.

In the above example, the description has been made on the assumption that the height of a person is measured in advance and the measured numerical value has been input. In a case where calculation of the distance with high accuracy is not necessary, for example, an average value may be input as the height of a person, and calculation of the distance may be performed using the input average value. For example, in a case of calculating the distance using the height of a person, the height of a person in the real space is set as 170 cm, and this value is used as the width W [m] of the object 701 in the real space in the above description.

Even in such a case, the error falls within about 6% even if the height of an actually captured person is 180 cm. Furthermore, the input value such as 170 cm is configured to be appropriately changed by the user, and when the user inputs a value close to the height of a person to be imaged, the error becomes small.

When high accuracy is required, the size of a person is accurately measured and the measurement value is used.

In a case where a rough distance is required, a preset value may be used.

The above-described calculation of the distance may be performed using one image or may be performed using a plurality of images.

FIG. 29 illustrates the configuration in which the characteristic point selection unit 711 selects the characteristic points from the characteristic point accumulation unit 201-1, and the distance calculation unit 712 calculates the distance. The characteristic point selection unit 711 and the distance calculation unit 712 may be provided in each of the characteristic point accumulation units 201-1 to 201-3, and the distance may be calculated using the images respectively imaged by the imaging devices 11-1 to 11-3. Then, in this case, the configuration is provided with three distance calculation units 712. Therefore, a final distance may be calculated by calculating an average value of the distances calculated by the three distance calculation units 712.

Furthermore, the distance may be calculated using a plurality of images captured at different timings. According to the above-described first to seventh embodiments, calibration of the imaging device is performed using the physical characteristics of a person. Therefore, a special calibration board such as a checker board is unnecessary. Calibration can be performed without preparing the special calibration board. Therefore, preparations and the like are unnecessary and troubles of the user at the calibration can be reduced. Furthermore, since calibration can be performed by capturing a person, calibration can be performed even if the rotation angles of the optical axes of a plurality of imaging devices are large.

Furthermore, according to the present technology, since calibration can be easily performed, another calibration can be easily performed after calibration is performed once. Furthermore, since calibration is performed using a captured image, calibration can be performed even during capturing.

Furthermore, according to the present technology, calibration of a plurality of imaging devices can be performed, and the calibration can be more easily and simply performed than a conventional calibration method.

<Recording Medium>

The above-described series of processing can be executed by hardware or software. In the case of executing the series of processing by software, a program that configures the software is installed in a computer. Here, the computer includes a computer incorporated in dedicated hardware, and a general-purpose personal computer and the like capable of executing various functions by installing various programs, for example.

A configuration example of hardware of the computer that executes the above-described series of processing by a program can be the information processing apparatus 12 illustrated in FIG. 3. The information processing apparatus 12 (personal computer) performs the above-described series of processing as the CPU 61 loads, for example, a program stored in the storage unit 68 into the RAM 63 and executes the program via the input/output interface 65 and the bus 64.

The program to be executed by the computer (CPU 61) can be recorded on the removable recording medium 71 as a package medium or the like, for example, and provided. Furthermore, the program can be provided via a wired or wireless transmission medium such as a local area network, the Internet, or digital satellite broadcast.

In the computer, the program can be installed to the storage unit 68 via the input/output interface 65 by attaching the removable recording medium 71 to the drive 70. Furthermore, the program can be received by the communication unit 69 via a wired or wireless transmission medium and installed in the storage unit 68. Other than the above method, the program can be installed in the ROM 62 or the storage unit 68 in advance.

Note that the program executed by the computer may be a program processed in chronological order according to the order described in the present specification or may be a program executed in parallel or at necessary timing such as when a call is made.

Furthermore, in the present specification, the system refers to an entire apparatus configured by a plurality of devices.

Note that the effects described in the present specification are merely examples and are not limited, and other effects may be exhibited.

Note that embodiments of the present technology are not limited to the above-described embodiments, and various modifications can be made without departing from the gist of the present technology.

Note that the present technology can also have the following configurations.

(1)
An information processing apparatus including:
a position detection unit configured to detect position information of a first imaging device and a second imaging device on the basis of corresponding characteristic points from a first characteristic point detected as a physical characteristic point regarding a subject imaged by the first imaging device, and a second characteristic point detected as a physical characteristic point regarding the subject imaged by the second imaging device.

(2)
The information processing apparatus according to (1), in which
the physical characteristic point is detected from a joint of the subject.

(3)
The information processing apparatus according to (2), in which
the joint of the subject is specified by posture estimation processing based on the physical characteristic point detected from the subject.

(4)
The information processing apparatus according to any one of (1) to (3), further including:
a first characteristic point detection unit configured to detect the first characteristic point; and
a second characteristic point detection unit configured to detect the second characteristic point.

(5)
The information processing apparatus according to any one of (1) to (4), further including:
a position integration unit configured to integrate position information based on first two imaging devices out of a plurality of imaging devices, the position information having been detected by the position detection unit, and position information based on second two imaging devices in which at least one imaging device is different from the first two imaging devices, the position information having been detected by the position detection unit, to specify position information of the plurality of imaging devices.

(6)
The information processing apparatus according to any one of (1) to (5), further including:
a position smoothing unit configured to smooth the position information detected by the position detection unit in a time direction.

(7)
The information processing apparatus according to any one of (1) to (6), in which
the position detection unit verifies the detected position information, using a characteristic point other than the characteristic points used for the detection of the position information.

(8)
The information processing apparatus according to any one of (1) to (7), further including:
a first characteristic point accumulation unit configured to accumulate the detected first characteristic point; and
a second characteristic point accumulation unit configured to accumulate the detected second characteristic point, in in which the position detection unit uses the characteristic points accumulated in the first characteristic point accumulation unit and the second characteristic point accumulation unit.

(9)
The information processing apparatus according to (8), in which
position detection by the position detection unit is performed, when the number of the characteristic points accumulated in the first characteristic point accumulation unit and the number of the characteristic points accumulated in the second characteristic point accumulation unit become a first threshold value or more, and an image imaged by each of the imaging devices is divided into a plurality of blocks, the number of the blocks where the characteristic point detected from the imaged image exists, out of the plurality of blocks, is cumulated, and a cumulative total in the each of the imaging devices becomes a second threshold value or more.

(10)
The information processing apparatus according to (5), in which
the position integration unit uses one imaging device of the plurality of imaging devices as a reference, and specifies the position information of the plurality of imaging devices according to a relative positional relationship with the reference imaging device.

(11)
The information processing apparatus according to (10), in which
the position information detected by the position detection unit is transformed into a relative position of the reference imaging device and is integrated.

(12)
The information processing apparatus according to (5), in which
the position integration unit performs the integration after multiplying the position information obtained from an imaging device arranged with a predetermined angle with respect to an imaging device that detects the position information by a predetermined weight coefficient.

(13)
The information processing apparatus according to any one of (1) to (12), in which
the position detection unit detects the position information, using a characteristic point detected from one subject out of a plurality of subjects.

(14)
The information processing apparatus according to (13), in which
the position detection unit verifies the detected position information, using a characteristic point detected from a subject other than the one subject used for the detection of the position information.

(15)
The information processing apparatus according to any one of (1) to (14), further including:
a coordinate system modification unit configured to modify a coordinate system set in the position detection unit to a coordinate system in a real space where the first imaging device is installed.

(16)
The information processing apparatus according to (15), in which
the coordinate system modification unit estimates a plane from distribution of characteristic points detected from a portion related to foot, of the physical characteristic points, and modifies the set coordinate system such that the plane becomes parallel to a plane corresponding to a floor surface in the coordinate system in the real space.

(17)

The information processing apparatus according to any one of (1) to (16), further including:
a distance calculation unit configured to calculate a distance between the first imaging device and the second imaging device in a real space where the first imaging device and the second imaging device are installed.

(18)

The information processing apparatus according to (17), in which
the distance calculation unit reads a characteristic point necessary for specifying a size of the subject, of the physical characteristic points, calculates the size of the subject in an image, and calculates the distance.

(19)

An information processing method including:
by an information processing apparatus that detects a position of an imaging device,
detecting position information of a first imaging device and a second imaging device on the basis of corresponding characteristic points from a first characteristic point detected as a physical characteristic point regarding a subject imaged by the first imaging device, and a second characteristic point detected as a physical characteristic point regarding the subject imaged by the second imaging device.

(20)

A program for causing a computer to execute processing of:
detecting position information of a first imaging device and a second imaging device on the basis of corresponding characteristic points from a first characteristic point detected as a physical characteristic point regarding a subject imaged by the first imaging device, and a second characteristic point detected as a physical characteristic point regarding the subject imaged by the second imaging device.

REFERENCE SIGNS LIST

11 Imaging device
12 Information processing apparatus
31 Lens system
32 Imaging element
33 DSP circuit
34 Frame memory
35 Display unit
36 Recording unit
37 Operation system
38 Power supply system
39 Communication unit
40 Bus line
41 CPU
61 CPU
62 ROM
63 RAM
64 Bus
65 Input/output interface
65 Input unit
66 Output unit
67 Storage unit
68 Communication unit
70 Drive
71 Removable recording medium
101 Imaging unit
102 Characteristic point detection unit
103 Communication control unit
121 Characteristic point input unit
122 Position detection unit
123 Position smoothing unit
124 Position integration unit
131 Image input unit
132 Characteristic point detection unit
201 Characteristic point accumulation unit
601 Characteristic point selection unit
602 Coordinate system modification unit
621 Distribution
701 Object
711 Characteristic point selection unit
712 Distance calculation unit

The invention claimed is:

1. An information processing apparatus comprising:
characteristic point detection circuitry configured to detect physical characteristic points of a subject imaged by a plurality of real imaging devices including a first real imaging device and a second real imaging device, and
position detection circuitry configured to, on a basis of the at least one of the physical characteristic points, determine a detected position information of the first real imaging device and the second real imaging device for a point in time,
wherein the position detection circuitry is configured to verify the detected position information for the point in time, using an other physical characteristic point of the subject from among the physical characteristic points other than the at least one of the physical characteristic points used to initially determine the detected position information.

2. The information processing apparatus according to claim 1,
wherein the at least one of the physical characteristic points used to determine the detected position information corresponds to a joint of the subject.

3. The information processing apparatus according to claim 2, wherein the joint of the subject is specified by posture estimation processing based on the at least one of the physical characteristic points detected from the subject.

4. The information processing apparatus according to claim 1, wherein the characteristic point detection circuitry comprises:
a first characteristic point detection unit configured to detect a first physical characteristic point on a basis of image data from the first real imaging device; and
a second characteristic point detection unit configured to detect a second physical characteristic point on a basis of image data from the second real imaging device,
wherein the first physical characteristic point and the second physical characteristic point correspond to a same point of the subject.

5. The information processing apparatus according to claim 1, wherein
the plurality of real imaging devices further includes at least a third real imaging device, and
the information processing apparatus further comprises position integration circuitry configured to integrate position information based on a first pair of real imaging devices out of the plurality of real imaging devices, and position information based on a second pair of real imaging devices in which at least one real imaging device is different from the first pair of real imaging devices, the position information having been detected by the position detection circuitry, to specify relative position information of the plurality of real imaging devices.

6. The information processing apparatus according to claim 1, further comprising:
position smoothing circuitry configured to smooth the position information detected by the position detection circuitry in a time direction.

7. The information processing apparatus according to claim 1, wherein
the physical characteristic points include a first physical characteristic point and a second physical characteristic point,
the information processing apparatus further comprises first characteristic point accumulation circuitry configured to accumulate the detected first physical characteristic point, and second characteristic point accumulation circuitry configured to accumulate the detected second physical characteristic point, and
the position detection circuitry uses the physical characteristic points accumulated in the first characteristic point accumulation circuitry and the second characteristic point accumulation circuitry.

8. The information processing apparatus according to claim 7, wherein
position detection by the position detection circuitry is performed, when the number of the physical characteristic points accumulated in the first characteristic point accumulation circuitry and the number of the physical characteristic points accumulated in the second characteristic point accumulation circuitry become a first threshold value or more, and an image imaged by each of the plurality of real imaging devices is divided into a plurality of blocks, the number of the blocks where the physical characteristic point detected from the imaged image exists, out of the plurality of blocks, is accumulated, and a cumulative total in the each of the plurality of real imaging devices becomes a second threshold value or more.

9. The information processing apparatus according to claim 5, wherein
the position integration circuitry uses one real imaging device of the plurality of real imaging devices as a reference real imaging device, and specifies the position information of the plurality of real imaging devices according to a relative positional relationship with the reference real imaging device.

10. The information processing apparatus according to claim 9, wherein
the position information detected by the position detection circuitry is transformed into a relative position of the reference real imaging device and is integrated.

11. The information processing apparatus according to claim 5, wherein
the position integration circuitry performs the integration after multiplying the position information obtained from the first real imaging device, that is arranged with a predetermined angle with respect to the second real imaging device, that detects the position information, by a predetermined weight coefficient.

12. The information processing apparatus according to claim 1, wherein
the position detection circuitry detects the position information, using a physical characteristic point detected from a first subject out of a plurality of subjects.

13. The information processing apparatus according to claim 12, wherein
the position detection circuitry verifies the detected position information, using a physical characteristic point detected from a second subject other than the first subject.

14. The information processing apparatus according to claim 1, further comprising:
coordinate system modification circuitry configured to modify a first coordinate system set in the position detection circuitry to a second coordinate system in a real space where the first real imaging device is installed.

15. The information processing apparatus according to claim 14, wherein
the coordinate system modification circuitry estimates a plane from distribution of physical characteristic points detected from a portion related to a foot, of the physical characteristic points, and modifies the first coordinate system such that the plane becomes parallel to a plane corresponding to a floor surface in the second coordinate system.

16. The information processing apparatus according to claim 1, further comprising:
distance calculation circuitry configured to calculate a distance between the first real imaging device and the second real imaging device in a real space where the first real imaging device and the second real imaging device are installed.

17. The information processing apparatus according to claim 16, wherein
the distance calculation circuitry reads a physical characteristic point necessary for specifying a size of the subject, of the physical characteristic points, calculates the size of the subject in an image, and calculates the distance.

18. An information processing method comprising:
by an information processing apparatus that detects a position of a plurality of real imaging devices including a first real imaging device and a second real imaging device,
detecting physical characteristic points of a subject imaged by the plurality of real imaging devices; and
detecting, for a point in time, position information of the first real imaging device and the second real imaging device on a basis of corresponding characteristic points from a first physical characteristic point regarding a subject imaged by the first real imaging device, and a second physical characteristic point regarding the subject imaged by the second real imaging device,
wherein detecting the position information includes verifying the detected position information for the point in time, using an other physical characteristic point among the physical characteristic points other than the first and second physical characteristic points used to initially determine the detected position information.

19. A non-transitory computer-readable medium storing instructions that, when executed by a processor of a computer, cause the computer to execute processing of operations comprising:
detecting physical characteristic points of a subject imaged by a plurality of real imaging devices including a first real imaging device and a second real imaging device; and
detecting, for a point in time, position information of the first real imaging device and the second real imaging device on a basis of corresponding characteristic points from a first physical characteristic point regarding a subject imaged by the first real imaging device, and a second physical characteristic point regarding the subject imaged by the second real imaging device, wherein detecting the position information includes verifying the detected position information for the point in time, using an other physical characteristic point among the physical characteristic points other than the first and second physical characteristic points used to initially determine the detected position information.

* * * * *